United States Patent [19]
Komiya et al.

[11] Patent Number: 5,588,092
[45] Date of Patent: Dec. 24, 1996

[54] PRINTER CONTROL CIRCUIT AND THE PRINTER CONTROLLED THEREBY

[75] Inventors: Hirofumi Komiya, Hirakata; Keita Sakai, Neyagawa; Kazumine Koshi, Neyagawa; Noriyuki Saito, Neyagawa, all of Japan

[73] Assignee: Matsushita Electric Industrial Co., Ltd., Osaka, Japan

[21] Appl. No.: 67,744

[22] Filed: May 26, 1993

[30] Foreign Application Priority Data

May 26, 1992 [JP] Japan ................... 4-133314

[51] Int. Cl.$^6$ ................................................. G06K 15/00
[52] U.S. Cl. ................................................. 395/109; 395/108
[58] Field of Search ........................... 395/109, 104, 395/101, 108, 112, 114; 358/503; 347/194, 189, 188; 400/120.14, 120.09

[56] References Cited

U.S. PATENT DOCUMENTS

| | | | |
|---|---|---|---|
| 3,938,641 | 2/1976 | Fulton | 400/62 |
| 4,113,391 | 9/1978 | Minowa | 400/120 |
| 4,602,880 | 7/1986 | Oba | 395/108 |
| 4,663,734 | 5/1987 | Berry | 400/120 X |
| 4,688,051 | 8/1987 | Kawakami et al. | |
| 4,834,562 | 5/1989 | Shikanai et al. | 400/54 |
| 5,167,014 | 11/1992 | Shimomura | 395/101 |
| 5,255,011 | 10/1993 | Minowa | 347/196 |
| 5,365,257 | 11/1994 | Minowa et al. | 347/189 |
| 5,398,305 | 3/1995 | Yawata et al. | 395/101 |

*Primary Examiner*—Edward L. Coles, Sr.
*Assistant Examiner*—Tracy M. Legree
*Attorney, Agent, or Firm*—Ratner & Prestia

[57] ABSTRACT

A printer controller for use with a thermal printer. A thermal printer used as a computer terminal printer requires a high printing speed and high print-quality in addition to reducing the load on the computer terminal. The printer controller of the present invention integrates the complicated control functions of the electrical components of a thermal printer, (i.e. thermal-head, motor, and various sensors) into an integrated circuit or a one-chip IC. Printers incorporating this controller attain highly improved and simplified operability and miniaturized dimensions. The printer controller includes a host-interface to receive communication data transmitted from a system including a host-computer, a receiver controller for receiving the output of the host-interface inputted through a data-bus and for controlling the communication data to be supplied to the thermal-head, a head driving data controller which controls the driving data to be supplied to the thermal-head which is controlled according to the temperature and the supply voltage, a motor controller for controlling the paper-feeding motor, a total controller for controlling all of the controllers including the receiver and controller, head driving data controller, and the motor controller through respective dedicated control lines, a memory for storing at least one of the controller procedures, and a printer interface for outputting various signals necessary to drive various devices mounted in the printer.

17 Claims, 48 Drawing Sheets

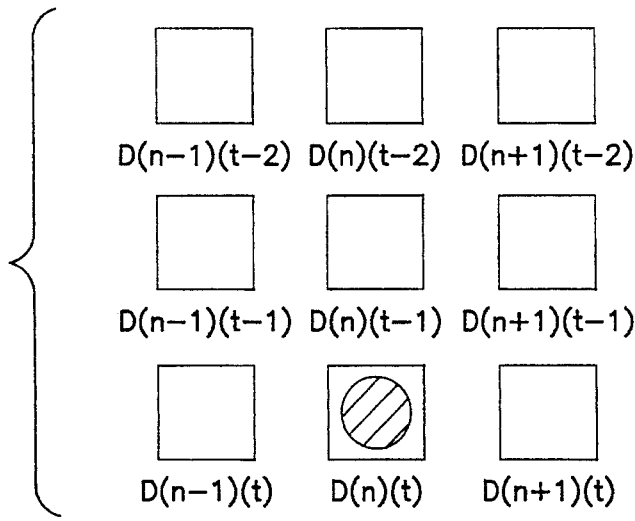
FIG. 6
| | WEIGHTING FACTOR |
|---|---|
| D(n)(t−1) | 70 |
| D(n)(t−2) | 40 |
| D(n+1)(t), D(n−1)(t) | 30 |
| D(n+1)(t−1), D(n−1)(t−1) | 20 |
| D(n+1)(t−2), D(n−1)(t−2) | 10 |
FIG. 7
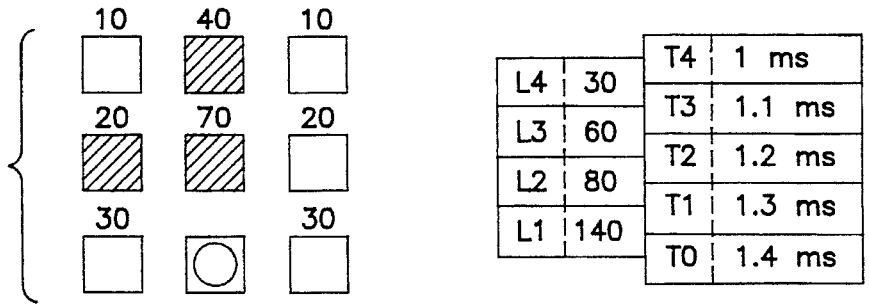
FIG. 8(a)     FIG. 8(b)
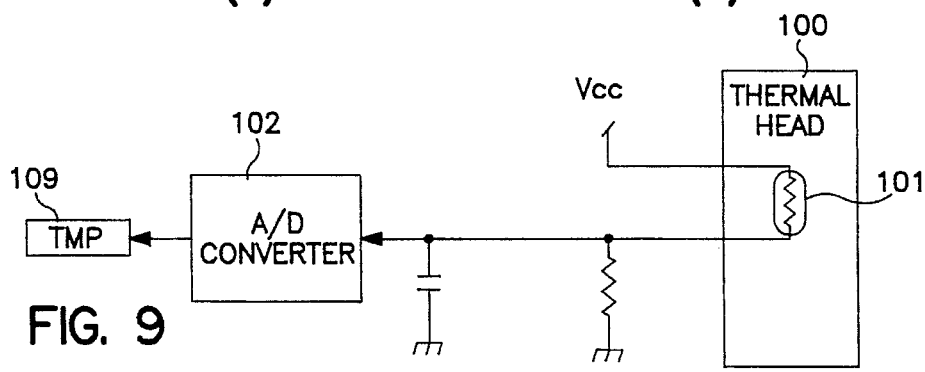
FIG. 9

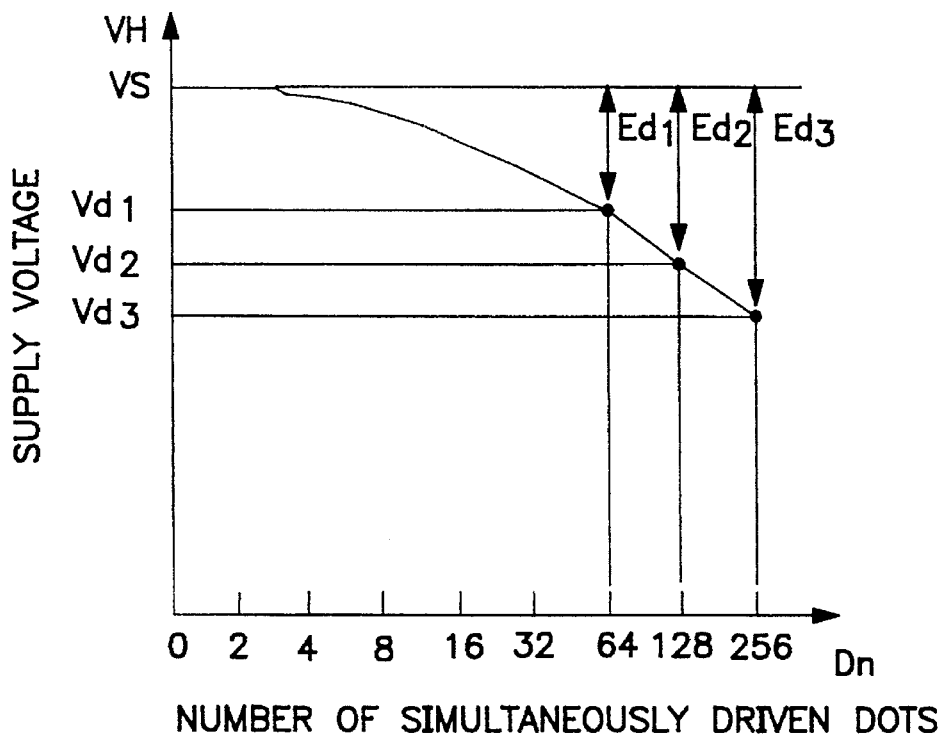
FIG. 24
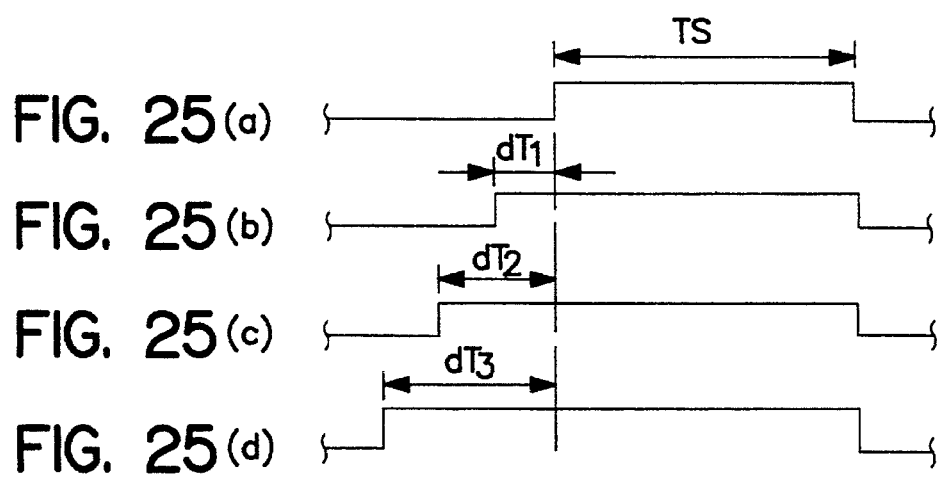
FIG. 25(a)
FIG. 25(b)
FIG. 25(c)
FIG. 25(d)

| LINE NO. | Dn | Sn | MSK MASK | COMPENSATION dT | DRIVING PULSE |
|---|---|---|---|---|---|
| 1 | 24 | 24 | 0 0 0 | $dT_1 (=0)$ | $T_s$ |
| 2 | 24 | 48 | 0 0 0 | $dT_1 (=0)$ | $T_s$ |
| 158 | 24 | 2225 | | | |
| 159 | 24 | 2232 | b11 b10 b9 | | |
| 160 | 24 | 2239 | 1 0 0  (=4) | $dT_5$ | $T_s - dT_5$ |
| 238 | 0 | 1243 | | | |
| 239 | 0 | 1234 | b11 b10 b9 | | |
| 240 | 0 | 1225 | 0 1 0  (=2) | $dT_3$ | $T_s - dT_3$ |
| 398 | 24 | 2581 | | | |
| 399 | 24 | 2585 | b11 b10 b9 | | |
| 400 | 24 | 2589 | 1 0 1  (=5) | $dT_6$ | $T_s - dT_6$ |
| 478 | 0 | 1433 | | | |
| 479 | 0 | 1422 | b11 b10 b9 | | |
| 480 | 0 | 1411 | 0 1 0  (=2) | $dT_3$ | $T_s - dT_3$ |

FIG. 33

| I/O DATA | INPUT | | | OUTPUT | | |
|---|---|---|---|---|---|---|
| COMP. PROC. | ADDH (b8 b7 b6) | ADDL (b5 b4 b3 b2 b1 b0) | | CMP | UP-CNT | CONTENT OF DivDT (Div1 Div2 Div3 Div4 Div5 Div6 Div7) |
| 1st STROBE | 0 0 1 | 0 0 0 0 0 0 | | — | — | 0 – – – – – – |
| 2nd STROBE | 0 0 1 | 1 1 0 0 1 0 | | 0 | 0 | 0 0 – – – – – |
| 3rd STROBE | 0 1 0 | 0 1 1 0 1 0 | | 0 | 0 | 0 1 0 – – – – |
| 4th STROBE | 0 1 0 | 0 1 1 0 1 0 | | 1 | 1 | 0 1 1 0 – – – |
| 5th STROBE | 0 0 0 | 0 1 1 0 1 0 | | 1 | 2 | 0 1 1 0 0 0 0 |
| | | | | 0 | 2 | → SELECT COMP. VALUE dT 3 |

COMPARISON ↔ MAXDOT 0 1 0

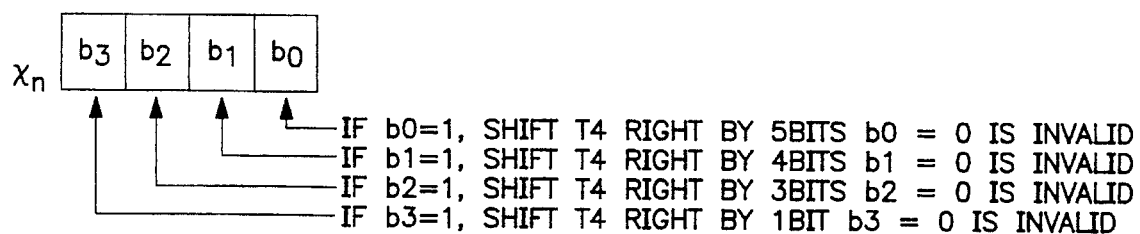
FIG. 37
| $X_n$ | b3 | b2 | b1 | b0 | DIVISION RATE (%) |
|---|---|---|---|---|---|
| | 0 | 0 | 0 | 0 | 0 |
| | 0 | 0 | 0 | 1 | 3.125 |
| | 0 | 0 | 1 | 0 | 6.25 |
| | 0 | 0 | 1 | 1 | 9.375 |
| | 0 | 1 | 0 | 0 | 12.5 |
| | 0 | 1 | 0 | 1 | 15.625 |
| | 0 | 1 | 1 | 0 | 18.75 |
| | 0 | 1 | 1 | 1 | 21.875 |
| | 1 | 0 | 0 | 0 | 25 |
| | 1 | 0 | 0 | 1 | 28.125 |
| | 1 | 0 | 1 | 0 | 31.25 |
| | 1 | 0 | 1 | 1 | 34.375 |
| | 1 | 1 | 0 | 0 | 37.5 |
| | 1 | 1 | 0 | 1 | 40.625 |
| | 1 | 1 | 1 | 0 | 43.75 |
| | 1 | 1 | 1 | 1 | 46.875 |
FIG. 38
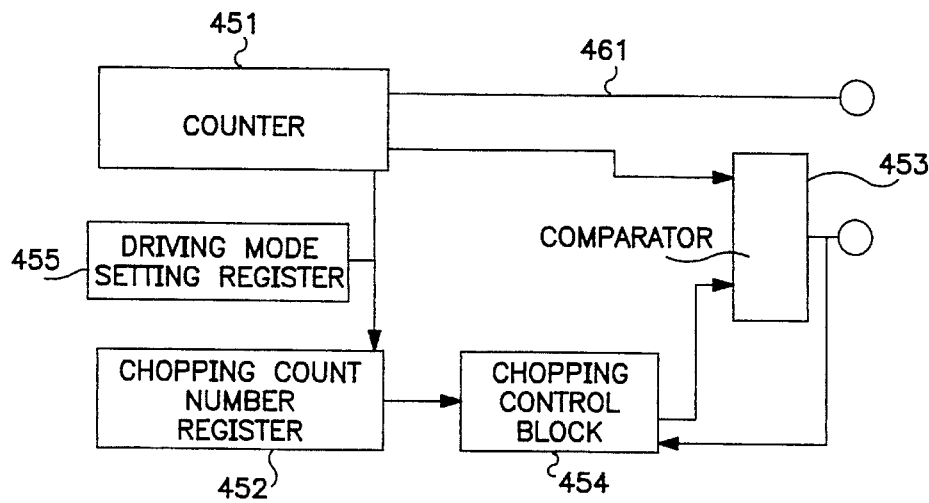
FIG. 39

PRINTER CONTROL CIRCUIT AND THE PRINTER CONTROLLED THEREBY

BACKGROUND OF THE INVENTION

This invention relates to a thermal-printer operated by the thermal printing principle, using a thermal-head which is now extensively used in various information devices in order to record the information.

The types of thermal-printer are divided into a line type thermal printer incorporating a line type thermal-head in which a number of minute heating elements are disposed in a line along the width direction of recording paper, and a serial type thermal printer in which a thermal-head with a limited number of heating elements travels repeatedly along the width direction of paper.

Since the line type thermal-head is equipped with a number of heating elements disposed in a line, the driving of these individual heating elements requires not only highly complicated controls of those, but controls of feed motor and the transfer of head driving data.

As a control device of such, a general-purpose control board having a function of either the parallel or serial control function, or such has been used.

However, in accordance with the expanding and diversifying printer market in these days, the printer functions had to be diversified also according to the purposes. For instance, the computer terminal printer should have high-speed and high-quality printing functions in addition to the lighter load to the driving circuit.

On the other hand, the printer for portable equipment has to be of low cost and compact design, and these can not be satisfied by a general-purpose control board, and the printer controller satisfying these requirements has to be developed.

SUMMARY OF THE INVENTION

The present invention is to offer a new printer controller and the printer incorporating this controller, satisfying the above-described requirements. This is attained by combining a thermal-head which is an essential electrical component with a motor and various sensors which are essential controller elements, and by implementing the control functions of these into a chip which can be controlled by a simple procedure.

The printer control circuit of the invention consists of;

host interface means to receive communication-data transmitted from a system including a host-computer;

receiving control means to which the output of said host interface means is inputted through a data-bus in order to control said communication-data given to a thermal-head disposed in a printer;

driving-data control means by which thermal-head driving data outputted from said communication-data control means are controlled according to both the external temperature and the power supply voltage to the printer;

motor control means to which the output of said host interface means is inputted through the data-bus to control a paper feed motor of the printer;

a total control means connected to said host interface means through the data-bus to control said communication data control means, driving-data control means, and motor control means through dedicated control lines;

memory means to store at least a part of the control-data of said communication-data control means, driving data control means, motor control means, and total control means;

and a printer interface means to which the output of said driving-data control means and motor control means are inputted in order to output various signals necessary to drive said thermal-head, motor, and various sensors of the printer;

wherein all of these means are controlled by said host-computer system.

By using the printer control circuit of above construction, the printer can be controlled automatically against any changes in the external temperature and the supply voltage by means of the driving-data control means;

and the printer is properly controlled according to the control data which are transmitted from the host system and are received by the receiving control means, and are stored in the memory means.

Therefore, the printer control load to the host computer can be substantially relieved. Since these control means can be realized by circuits of simple construction, and can be connected each other by dedicated control lines, the data therein can be processed at high-speed and can be implemented into a chip. Thus, compact and low-cost printers having higher functions can be realized.

BRIEF DESCRIPTION OF THE DRAWINGS

FIG. 6 is to show a method to compensate the driving history of the thermal-head.

FIG. 7 is a table of threshold value and weighting factor.

FIG. 8(a) is a table to show the weighting factor (coefficients) of the printer shown in FIG. 6, and FIG. 8(b) shows a relationship between the threshold-level and the driving pulse duration of thermal-head.

FIG. 9 is to show a circuit to compensate the temperature of printer, which is an embodiment of the invention.

FIG. 24 shows a relationship between the number of simultaneously driven heating elements and the thermal-head supply voltage.

FIGS. 25(a)–25(d) are schematic diagrams showing the change in the driving pulse duration produced by the compensation of the number of simultaneously driven heating elements.

FIG. 33 is schematic diagram showing the transition of the operation of dynamic group-division compensation.

FIG. 37 is a bit-shift correspondence table.

FIG. 38 is a divisional rate correspondence table.

FIG. 39 is a printer-motor driving circuit of an embodiment of the invention.

DETAILED DESCRIPTION OF THE INVENTION

Embodiment-1

One of the embodiments of printer of the invention is explained below by referring the attached drawings.

Figure 1:
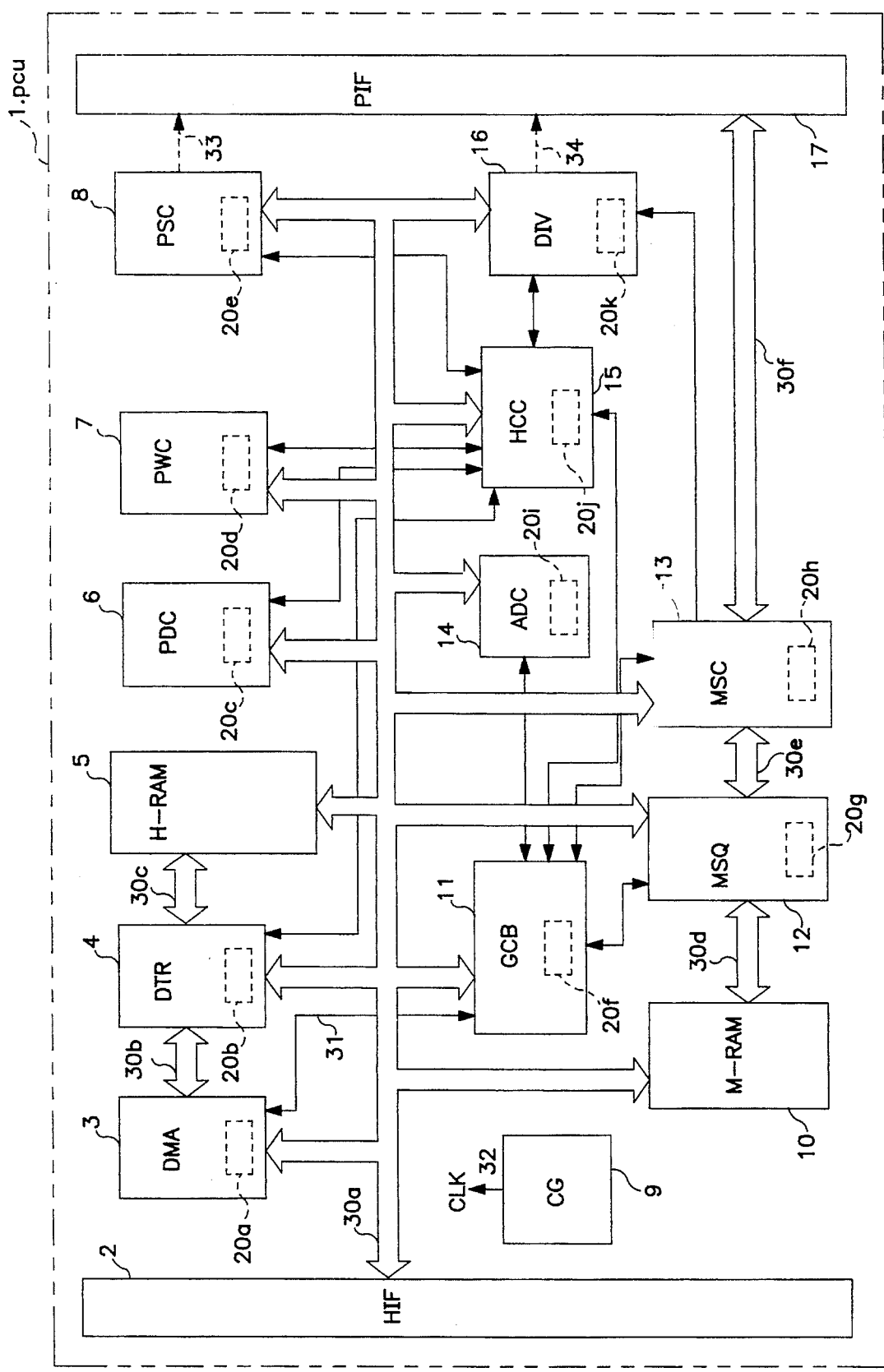
FIG. 1 is a block diagram showing the fundamental construction of the integrated printer control circuit which is an embodiment of the invention.

A block diagram showing the fundamental construction of the integrated printer control circuit of an embodiment of the invention is shown in FIG. 1, wherein 1 is a one-chip printer-control integrating circuit (PCU) to which the below-shown function blocks are integrated.

2 is a host interface (HIF) by which the input/output operations of data, chip selection, read, write, and other signals, address decoding, and other information necessary to be connected to the host system are executed in order to secure the operation of PCU 1.

3 is a direct memory access controller (DMA) by which the high-speed reception of the printer driving data transmitted from the host system by the direct memory access means, is made possible.

5 is a memory (H-RAM) which is a part of the memory means provided to store the driving data received by DMA 3 and to execute various compensation processes, and 4 is a data-transfer controller (DTR) to transfer the data received from DMA 3 to an address of H-RAM 5.

6 is a processor to compensate the driving-data history (PDC), and high-quality print can be obtained by this according to the driving-data history stored in H-RAM 5, 7 is a pulse duration processor (PWC) by which the optimum driving pulse duration is derived from the results of the driving data history compensating process conducted by PDC 6.

8 is a parallel-serial conversion controller (PSC) by which the parallel driving data stored in H-RAM 5 is converted into a serial data to heat a line-type thermal-head. 9 is a clock generator (CG) by which a fundamental clock signal 32 necessary to execute the control processing in PCU 1 is generated.

10 is a program memory (M-RAM) constituting a part of the memory means, in which the program to define the motor and sensor driving procedures are stored, 12 is a mechanical sequencer (MSQ) by which the program data stored in M-RAM are analyzed, and the motor and the sensors are driven accordingly. The processing of the head driving data, and the control of the timing synchronization are performed by this.

13 is a motor and sensor controller (MSC) delivering the motor driving data, and performing the synchronization of switching and the processing of the input/output of the sensor.

14 is an analog-to-digital converter (ADC) by which the analog signal of the printer environment temperature and the printer supply voltage necessary to determine the pulse duration are determined and converted into digital data. 15 is a driving cycle controller (HCC), and this controls a series of driving cycle including the process to compensate the driving-data history conducted by PDC 6, process to derive the pulse duration conducted by PWC 7, and the process to transfer the driving data from PSC 8 to the thermal-head.

16 is a divisional driving controller (DIV), which controls the timing of the drive permission signal and the driving cycle when the divisional printing is conducted according to the printing data and the physical condition of the thermal head. 11 is a general controller which controls the overall process-orders of the before-mentioned controllers.

17 is a printer interface (PIF) which connects various signal lines necessary to drive the thermal-head, motor, and sensors to be controlled, and conducts the input/output processes thereof. 20a to 20k are a part of said memory means, and are registers to store those data necessary to execute the processes at each controller, and the contents of these are updated kept by the host system.

Furthermore, 30a to 30f are data-buses necessary to transfer the various data between the controllers in PCU 1, memories, and externally connected devices and to conduct the address assignments, and these are shown by a broad line. 31 is control signals exchanged between the GCB 11 and each controller to inform the starting and ending of operation, status change, errors, etc., and these are transmitted through the dedicated control lines shown by solid lines.

33 and 34 are signals to control the thermal-head, and is shown by a broken line, and among these, the head control signals 33 are outputted from PSC 8, including the serial driving data, driving-data transfer clock, and the data latch signal. The head control signal 34 is outputted from DIV 16 including the drive permitting signal, etc.

Then, the construction of the host system incorporated in the printer of the invention is explained in the following by referring FIG. 2 wherein 40 is a microprocessor acting as a host computer controlling the host system.

42 is a system memory necessary to execute various processes to be conducted by the host system, wherein the driving data to be transmitted to the printer are stored. 41 is a DMA controller which transfers the data from the system memory 42 to external peripheral devices such as the printer by means of DMA means at high-speed.

43 is a system-bus to transfer the various data in the host system, addresses, control data, etc. 44 is a signal to control the read/write operations between the host system and PCU 1. 45 is an address data signal necessary to perform the read/write operations for PCU 1. 46 is a data-bus to perform read/write operations of various data between the PCU 1 and the host system.

47 is an informing signal, by which the status of PCU 1 is informed to the host CPU 40. 48 is a DMA control signal which is indispensable to PCU 1 to receive the DMA from the host system.

Figure 2:
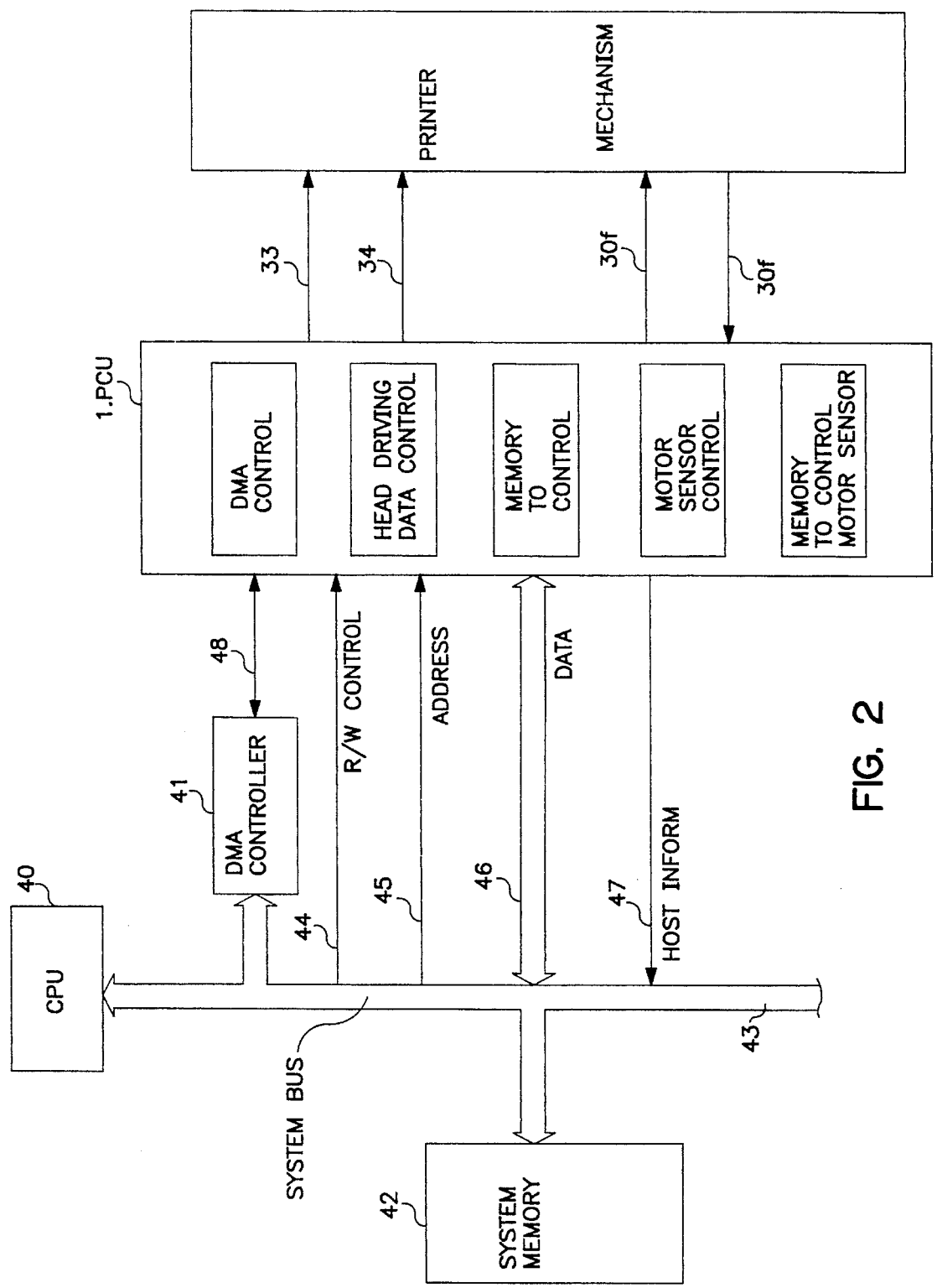
FIG. 2 is a schematic diagram showing a construction of the host system to operate a printer of the invention.

As seen from FIG. 2, the control of the printer mechanism is now possible by connecting PCU 1 of an embodiment of the printer controller of the invention to the system-bus 43 of the host system.

Figure 3:
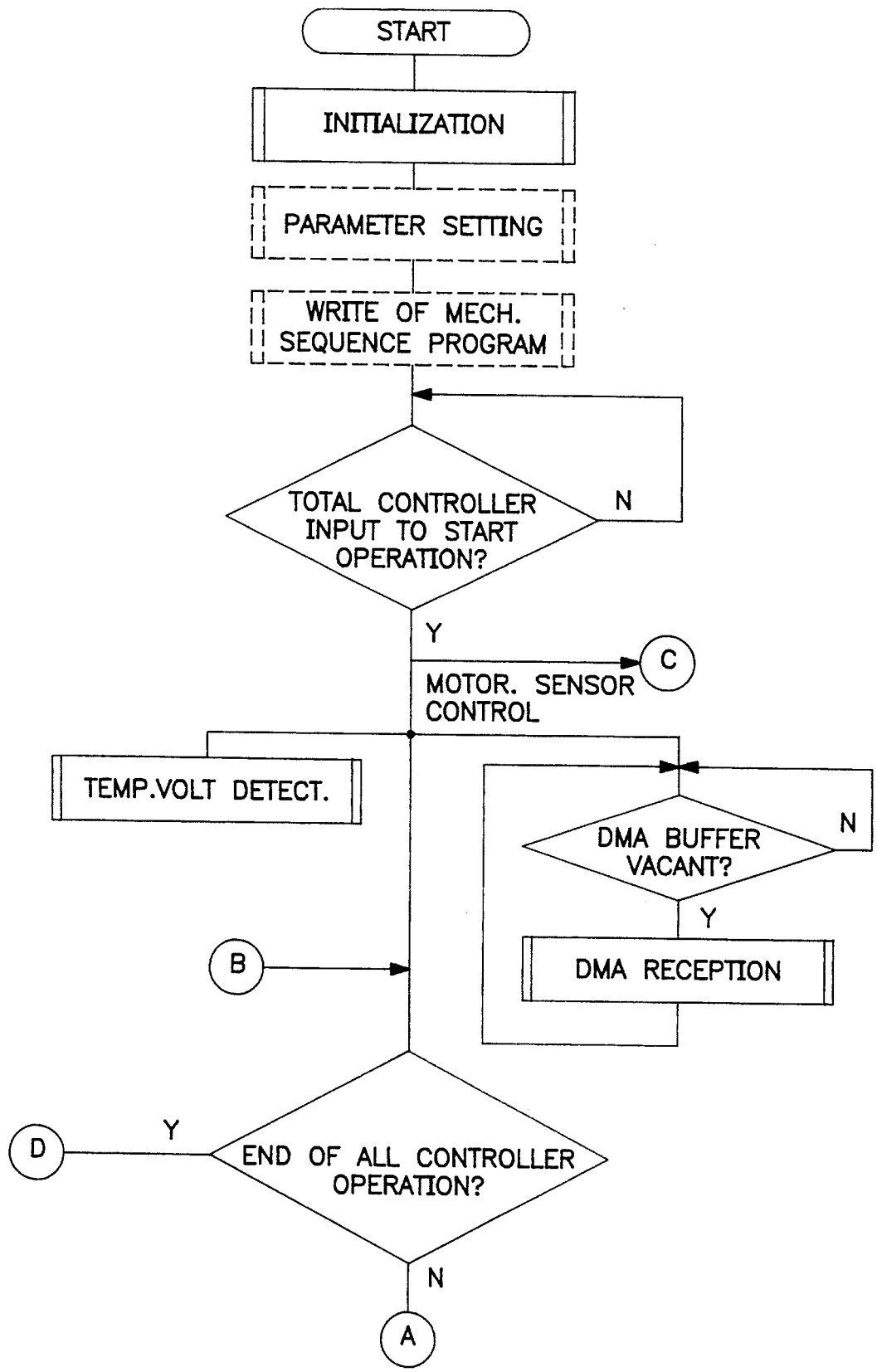
FIG. 3 is a flow-chart showing the fundamental operations of the integrated printer control circuit of the invention.
Figure 4:
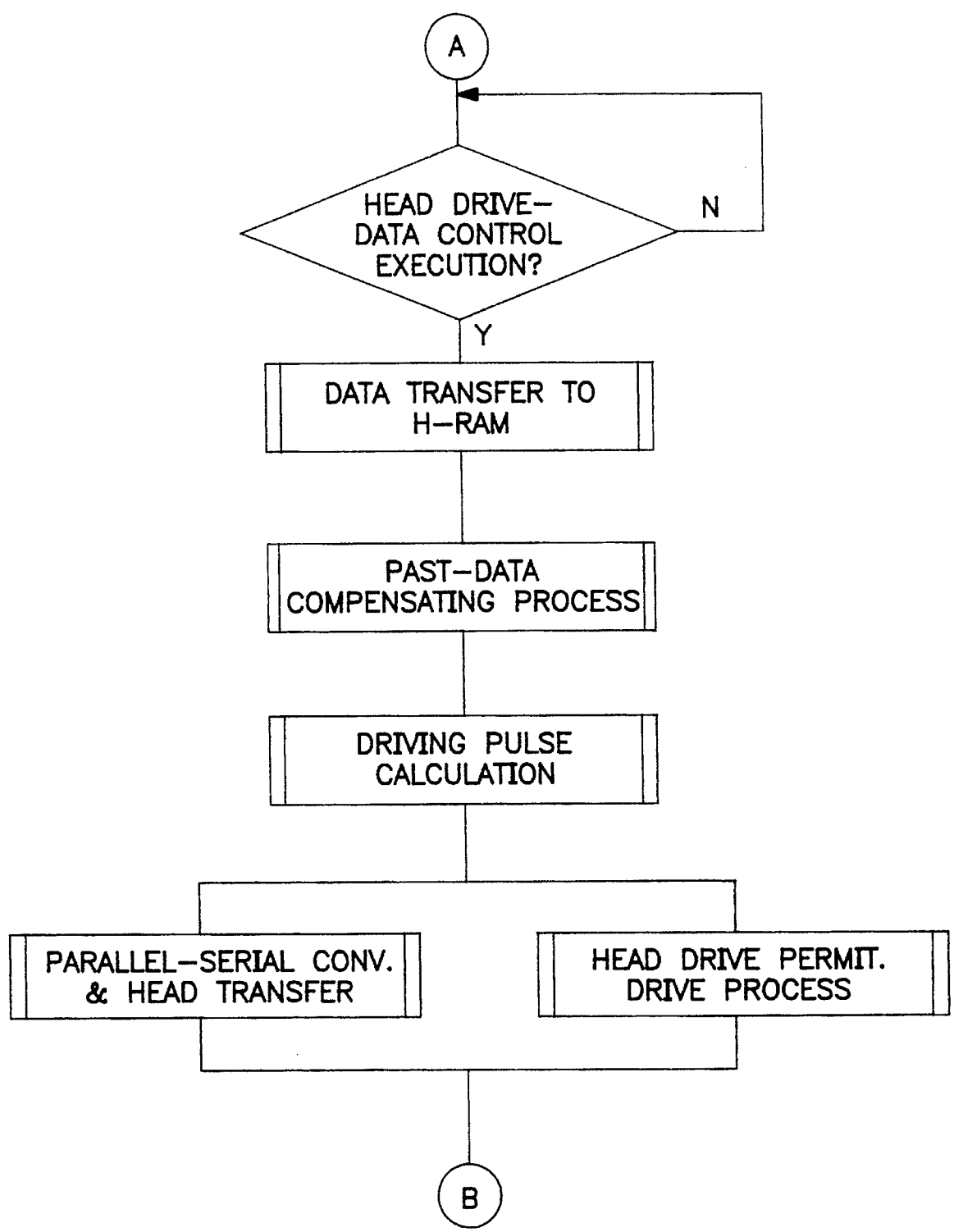
FIG. 4 is another flow-chart showing the fundamental operations of the integrated printer control circuit of the invention.
Figure 5:
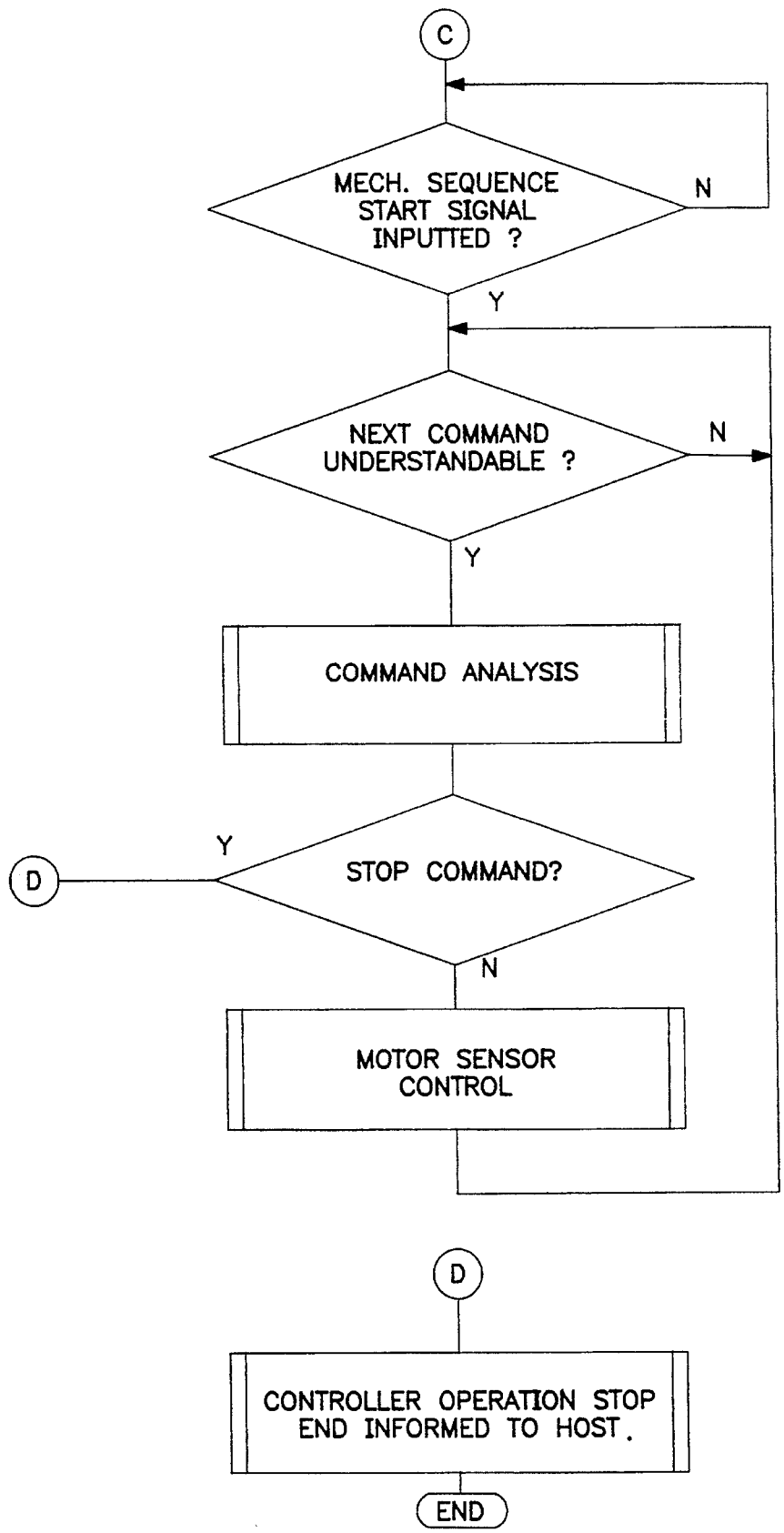
FIG. 5 is still another flow-chart showing the fundamental operations of the integrated printer control circuit of the invention.

Then, the fundamental operations of PCU 1 is explained below by referring FIGS. 1 and 2, and FIGS. 3 to 5, which are flow-charts showing the fundamental operations of PCU 1. In FIGS. 3 to 5, the processes shown by solid-lines are carried out by PCU 1 and the ones shown by broken lines are carried out by CPU 40 disposed at the host.

After the power is turned on, PCU 1 conducts a series of initializing processes such as cutting off the head control signals 33 and 34 and the motor control signal on the data bus 30f, and stopping the operations of the R/W control signal 44 and DMA control signal 48, and the operations of the controllers 3 to 16 shown in FIG. 1.

During this initialization process, host CPU 40 is informed by host informing signal 47 that PCU 1 is in an inaccessible state. While, host CPU 40 is informed by means of host informing signal 47 that PCU 1 is in an accessible state after the initializing process.

Then, from host CPU 40, the data such as the various parameters necessary to set the desired operation mode and the driving data history compensation processes are distributed to registers 20a to 29k, and are set in there, and at the same time, the program data to define the motor and sensor driving modes are registered in M-RAM 10. As shown in above, the memory means employed here are rewritable by means of the host computer.

After this, by sending a signal to start the operation to GCB 11 from host CPU 40, the head driving-data control and the motor and sensor controls are executed.

Since the head driving-data control and the the motor and sensor controls are simultaneously processed in parallel, the flow of the head driving data control is explained first, and the flows of the the motor and sensor controls are explained in next.

As a buffer memory to store the head driving data for one line is provided in DMA 3, GCB 11 inquires first if there exists any vacancy in the buffer, and requests data transfer to DMA controller 41 of the host system if there were a vacancy in the buffer.

After transferring a one-line DMA data from DMA controller 41 of the host system to DMA 3 of PCU 1, GCB 11 confirms if the execution of the processes to control the head driving data such as the process to compensate the driving data and the process to determine the pulse duration are completed.

If the above process is in a suspended condition, DMA controller 41 instructs HCC 15 the execution of a sequence of head driving data processes, and after the execution of these, HCC 15 informs the DMA controller of the completion thereof to GCB 11.

In this process, HCC 15 instructs DTR 4 to transfer the driving data from the buffer of DMA 3 to H-RAM 5, and after the completion of this data transfer, DTR 4 informs HCC 15 that the buffer of DMA 3 is vacant.

Then, receiving an instruction from HCC 15, PDC 6 executes the process to compensate the driving-data history of the individual heating elements, dealing particularly the previous driving data and the driving data before the previous data, according to the past head-driving data stored in H-RAM 5, and rewrites the H-RAM 5 accordingly.

After this, HCC 15 instructs PWC 7 to derive the driving pulse duration optimum to the individual heating elements according to the result of the driving-data history compensation, and to the environmental temperature, and the supply voltage.

In this case, under an instruction of GCB 11 to ADC 14, the detections of environmental temperature and supply voltage are executed by ADC 14 in parallel to the process to control the head driving data conducted by PDC 6.

After the execution of the above by PWC 7, HCC 15 instructs PSC 8 the data transfer to the thermal-head. Then, PSC 8 reads out the result of the driving-data history compensating process stored in H-RAM 5, converts this into a serial data, and transfers this to the thermal-head.

At the same time, HCC 15 instructs DIV 16 to execute the printing, and by this, DIV 16 activates the head-driving permission signal for a period of the driving pulse in synchronous with the timing to switch the motor driving data from MSC 13.

After the execution of a series of the head driving-data control process of above, HCC 15 stops its operation until an instruction to re-execute the above is received, and informs GCB 11 that HCC is executing a driving-data control process during the process of driving data control.

The flows of the motor and sensor control processes are now explained in the following. When an instruction to start the operation is given to MSQ 12 from the host CPU 4, MSQ 12 reads out the program data (hereinafter this is called as command) defining the driving procedures of the motor and the sensors stored in M-RAM 10 one-by-one, and analyzes the commands.

There are 12 command types, and these are executed according to the given commands. This may include the setting of the motor driving data in the output register storing the motor driving-data, and the setting of the motor switching cycle to the timer which controls the timing to switch the motor driving-data.

These 12 types of commands are programmable, and the programmable commands include the commands such as the starting, driving at a constant speed, stop of the paper-feed motor, motor driving speed, and the number of driving steps. By storing the defined commands in M-RAM 10, a series of the motor and sensor operations essential to the printer operation can be controlled by PCU 1 automatically without the assistance made by the host CPU 40.

Furthermore, MSC 13 transmits a signal to MSQ 12 to suspend the execution of the succeeding command until the end of motor driving period in order to synchronize the operation with the head driving-data processing, and transmits the permission timing of the permission signal to permit the driving of the head to DIV 16.

By executing the stop command defining the conclusion of the operations provided at the end of the program, MSQ 12 informs GCB 11 that the series of the motor and sensor control operations are completed. GCB 11 maintains its suspension of operation to the controllers of PCU 1, and informs the host CPU 40 completion of the serial printer operations.

The transfer of the driving data from the host system to PCU 1 can be carried out by not only the DMA means but the normal writing means operational by the R/W control signal 44 or the address control signal 45, like the case of data write to the registers of controller and M-RAM 10.

Embodiment-2

The compensation of driving-data history conducted by PDC 6 which is a part of the driving-data control means in a printer controller of the invention is explained below by referring FIGS. 6 to 8.

FIG. 6 shows a part of the colored dots recorded by a line-type head wherein the heating elements are disposed along the width direction of paper. One of the two recorded dot rows along the paper feed direction is made by the previous printing operation and the other is made by the printing operation two step before.

This embodiment shows a method to control neighboring heat elements, and the driving history of the heating elements covering two previous printing steps.

In FIG. 6, whereas the dots to be colored is shown by $D(n).(t)$, two neighboring dots are shown by $D(n-1).(t)$ and $D(n+1).(t)$.

Likewise, the previously colored dots are shown by $D(n).(t-1)$, $D(n-1).(t-1)$ and $D(n+1).(t-1)$, and the dots colored by the printing two-step before are shown by $D(n).(t-2)$, $D(n-1).(t-2)$ and $D(n+1).(t-2)$.

FIG. 7 shows a table of threshold values allocated to the previously colored dots, and a total of the weighting factor (weighting coefficients) shown in FIG. 7 is applied to a heating element to be driven. The same weighting coefficients are applied to the dots having a same positional relationship to the dots to be colored.

FIG. 8(*a*) shows an application of the weighting coefficients derived from the threshold table in FIG. 7. In this example, the effects of the colored does shown by hatched lines on the dots to be colored is expressed by the totaled weighting coefficients of the colored dots, that $$70+40+20=130.$$

Applying this result to the table shown in FIG. 8(*b*), this value is in between 80 in L2 and 140 in L1. Since this corresponds to T1, the driving pulse duration of 1.3 ms shown in the right column of the threshold-value table is determined.

Thus, the total thermal effects to the heating element to be driven can be evaluated by the above-described method, and a printing energy to yield proper printing result, determined by this is supplied to the heating element realizing a proper printing compensation.

Although the weighting coefficients, threshold values, and the driving pulse duration are fixed in this example, these are variable by means of program or other method, yielding the same result.

Embodiment-3

A temperature compensation circuit which is a part of driving data-control means of the printer controller explained in Embodiment-1 is now explained in the following by referring FIGS. 9 and 10.

In FIG. 9, 100 is a thermal-head of the printer, 101 is a sensor to measure the substrate temperature of thermal-head 100, 102 is an A/D converter to convert the analog voltage outputted from the temperature sensor into a digital signal (hereinafter, this is referred to as A/D converter circuit). 109 is a memory to store the above-referred digital signal outputted from the A/D converter 102 (which is referred to as the AD converted value).

Figure 10:
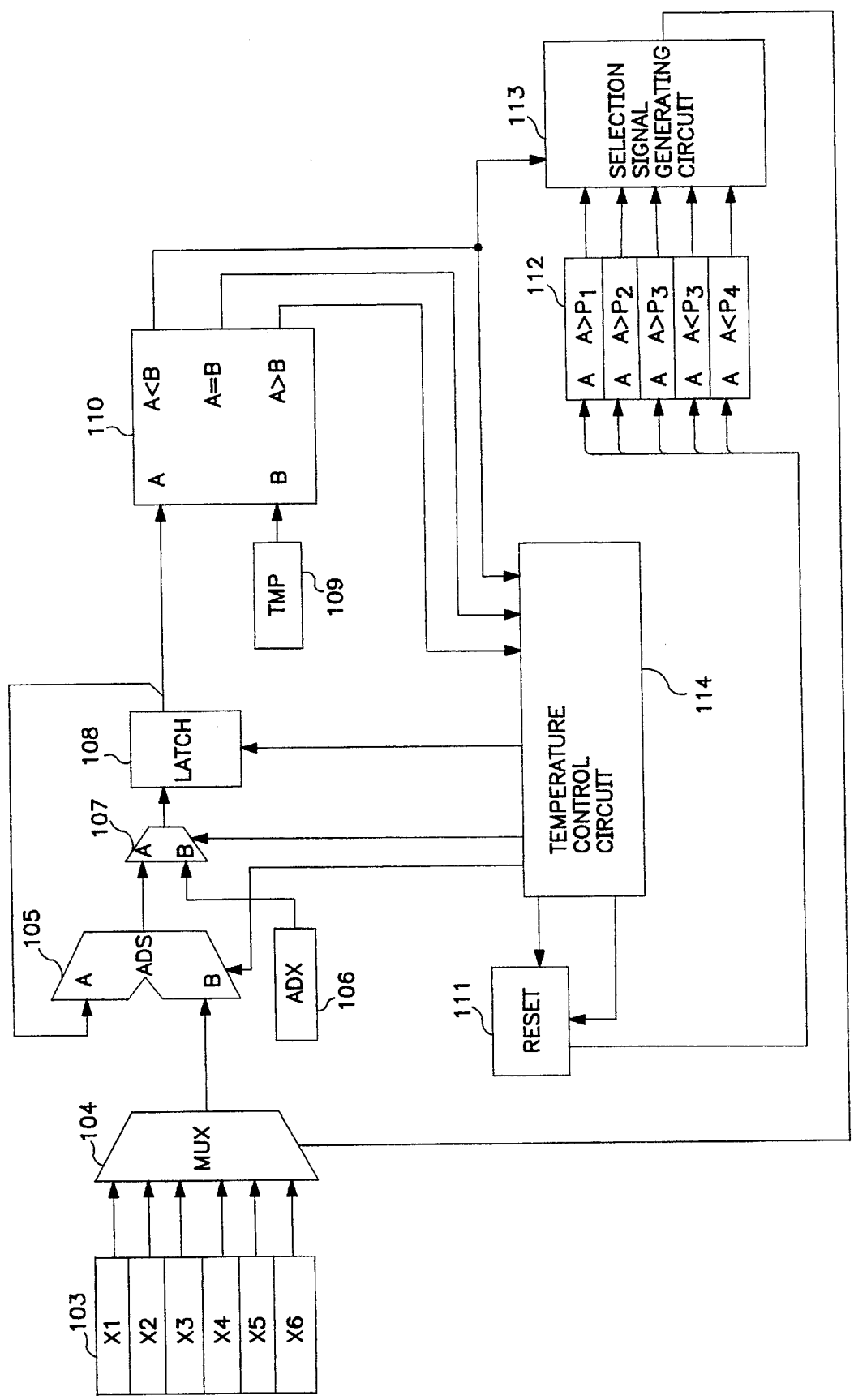
FIG. 10 illustrates a temperature compensation circuit.
Figure 12:
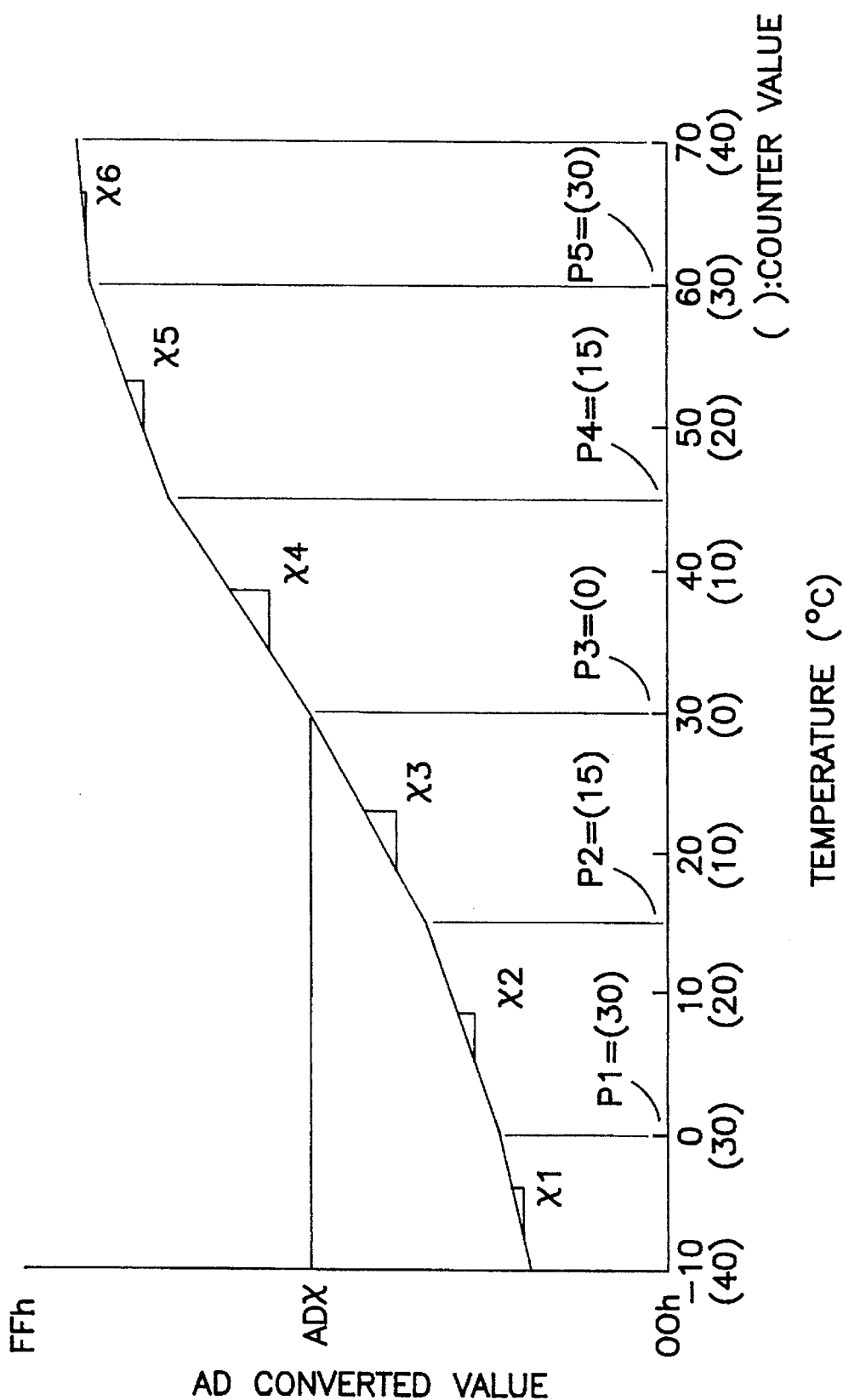
FIG. 12 shows a characteristics of the temperature vs. AD converted values of the printer, approximated by a kinked line shown in there.

In FIG. 10, 103 is a conversion coefficient applied to the AD converted values obtained for a temperature range. 104 is a memory to store the gradients of the slopes, X1 to X6, (increments of the AD converted values per one degree) shown in FIG. 12 which shows a relationship between the AD converted values and the temperature of the substrate.

104 is a data selection circuit selecting one of the data consisted of several bytes, outputted from the memory 103, 105 is an adder/subtracter to add an input-A to an input-B (A+B) or to subtract the input-A from the input-B (A−B), 106 is a memory to store an AD converted value (ADX) obtained at the center of printer operation temperature (in this case, this is 30° C.).

107 is a data selection circuit to select and output one of the data of the inputs-A and -B, 108 is a data holding circuit to hold the data outputted from the data selection circuit 107 therein, 110 is a data comparator to compare A and B and to determine the state of either A<B, A=B, or A>B, 111 is a counter to count the number of arithmetic operations conducted in adder/subtracter 105, and 112 is a data comparator to determine if the input-A is in a relationship of either A>P1, A>P2, A>P3, A>P4, or A>P5 wherein P1 to P5 are the above-mentioned ADX values.

113 is a selection signal generating circuit to derive a selection signal to be supplied to the data selection circuit 104 from the data outputted from the data comparators 112 and 110, 114 is a temperature control circuit by which a selection signal determining if adding or subtraction should be conducted in the adder/subtracter 105, a selection signal to the data selection circuit 107, and a storage signal to the data holding circuit 108 are outputted, and the information outputted from the data comparator 110 are analyzed, and a clock signal to the counter 111 for a number of add or subtraction operations conducted in the adder/subtracter 105 is supplied.

Figure 11:
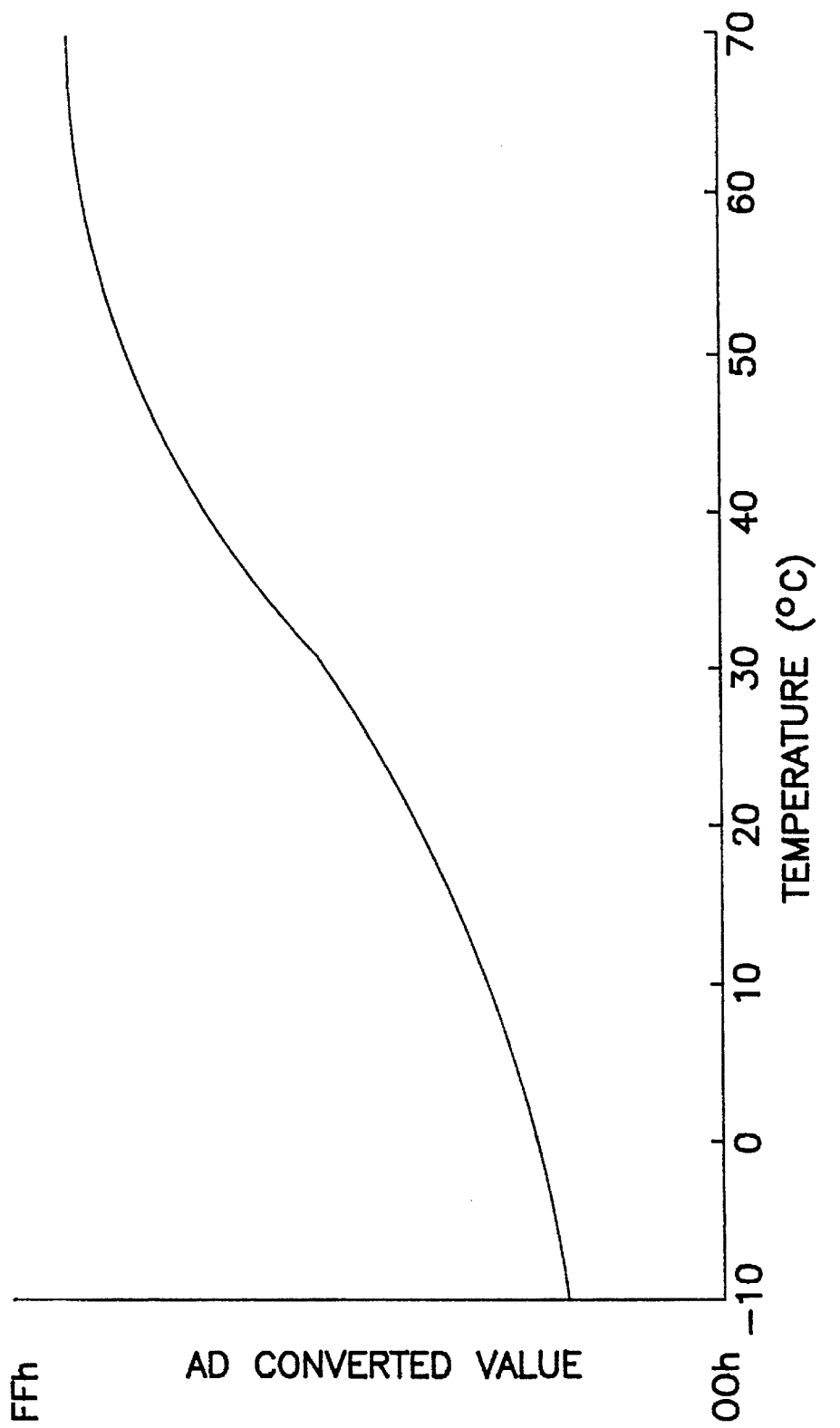
FIG. 11 shows an idealistic characteristics of the temperature vs. AD converted values of the printer.

The operation of the temperature compensation circuit of which circuit construction is shown by FIGS. 9 and 10, an idealistic temperature vs. AD converted value characteristics shown in FIG. 11, and the approximated characteristics of the same expressed by a kinked line in FIG. 12, is explained in next.

In this example, by assuming an operational temperature ranges of the thermal-head which is in a range from −10° C. to 70° C., and by assuming six temperature ranges including the ranges from −10° C. to 0° C., 0° to 15°, 15° to 30°, 30° to 45°, 45° to 60° and 60° C. to 70° C., and a method to obtain the approximated temperature characteristics expressed by the linked line in FIG. 11 is explained.

Expressing the boundary points between these temperature ranges in the output form of counter 111, as shown in FIG. 12, those are; P1=30, P2=15, P3=0, P4=15, and P5=30.

The circuit operation is started with conversion of thermal-head temperature into a digital signal by means of the AD converter 102, and the signal is transferred to the memory 109. Then, the AD converted value (ADX) is transferred to input-A of data comparator circuit 110 through data-selection circuit 107 and data-holding circuit 108.

In data-comparator circuit 110, the input-A and the input-B to which the digital value at the current temperature stored in memory 109 is transferred, are compared to determine if those are in a relative condition of either A<B, A=B, or A>B.

In this case, if the inputs -A and -B are in a relative condition of A=B, counter 111 would take an initial value, i.e., 0. This condition indicates the output value of counter 111 shown in FIG. 12 when the operational temperature is divided as shown before. When the center of the printer operational temperature is set at 30° C., and this is equivalent to the counted value of counter 111 which is zero, the current temperature is judged to be 30° C. in this case.

Furthermore, if the inputs -A and -B are in a relative condition of A<B, the current temperature is judged to be more than 30° C., and temperature control circuit 114 is controlled to select the adding operation of the adder/subtracter 105.

Then, a selection signal generated by selection signal generating circuit 113 is outputted to data selection circuit 104. As shown in FIG. 12, the data selected in this case is X4 stored in memory 103. The data of X4 is then transmitted to memory 106 through adder/subtracter 105, data selection circuit 107, and data holding circuit 108, and is added to the AD converted value (ADX) stored in memory 106.

In this operation, the number of the adding operations is counted by counter 111, and the conditions of the input data-A and P1 to P5 are compared by means of data comparator 112 in order to derive an output data. By means of the output data transmitted to data-selection circuit 104 through the selection-signal generator selects either the data X-5 or the data X-6 stored in memory 103.

When the current operating temperature is 50° C. and the initial value of counter 111 is 0 (printer operating temperature of 30° C.), the data X4 stored in memory 103 is added to the AD converted value (ADX) stored in memory 106 for fifteen times to advance the counter to 15.

Since the condition of A>P4 is no longer valid in data comparison circuit 112, the data X5 stored in memory 103 is selected by means of selection circuit 104 through selection signal generating circuit 113, and the data X5 is added to the data stored in data holding circuit 108 for five times.

At this point, data comparison circuit determines the condition of A=B or A>B, and the completion of the temperature compensation procedure is recognized by temperature control circuit 114. Since the count of counter 111 is 20 at this time, the printer operating temperature can be recognized as 50° C.

When the printer operating temperature is less than 30 C, the operations same as the above-described ones except that subtraction is selected for adder/subtracter circuit 105, can be utilized to determine the current printer operating temperature.

In addition to the above, although the printer operating temperature range is divided into six ranges, but the division of the temperature range into this number is not essential.

In order to determine the thermal-head temperature during the printer operation, the temperature of the thermal-head substrate is conventionally converted into a voltage signal which is further converted into a digital signal which is proportional to the temperature.

However, because of the nonlinear or the exponential function relationship between the temperature and the resistance or the AD converted resistance of thermister (see FIG. 11) which is a typical temperature sensor to measure the thermal-head substrate, the relationship between the temperature and the AD converted resistance, divided for every one degree has to be memorized in a memory, and the temperature has to be derived from the AD converted value read from the memory.

Although the memory load would be extremely large in this case because a large number of data have to be stored in the memory, the temperature can be determined from the AD converted value stored in a small memory of several bytes incorporated in the temperature compensation circuit.

Therefore, the efficiency of memory utilization is high, and this can be attained by a smaller and lower cost circuit.

Embodiment-4

A thermal-head resistance rank compensation circuit which is a part of the driving data control means incorporated in an embodiment of printer of the invention explained in Embodiment-1 is explained below by referring the attached drawings.

Now the rank of thermal-head resistance is explained below here. Since the thermal-head consists usually of plural heating elements corresponding to the dots colored by the driven elements, a variation of the resistances of these heating elements is inevitably produced during its manufacturing process.

The range of the resistance variation covering from the maximum to the minimum resistance values is divided into several resistance ranges to which the resistances of the heating elements are allocated according, so that the head resistances are divided into several ranks.

Thus, the driving pulse-duration applied to each of the heating elements has to be exactly controlled according to the rank of the respective resistance in order to compensate the change in the printing energy brought by the variation of resistance and to secure high print quality.

Figure 13:
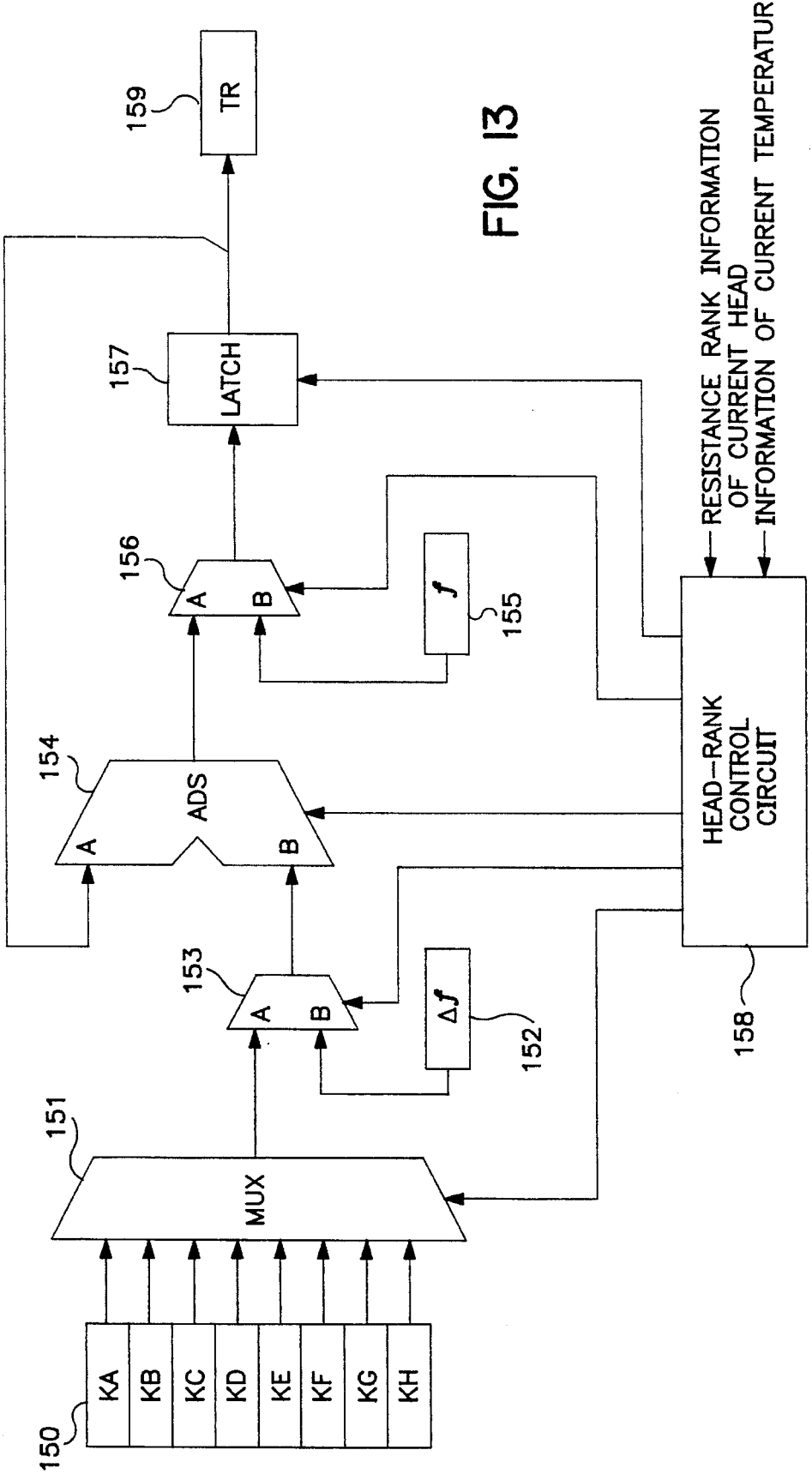
FIG. 13 is a circuit to compensate the ranks of the heating element resistances of thermal-head.

FIG. 13 is a block diagram of embodiment of the invention. In FIG. 13, 150 is a memory to store the conversion coefficients (gradient KA to KH) applied to the relationships between the printer operating temperatures and the driving pulse duration determined for head resistance ranks shown in FIG. 14.

151 is a data selection circuit to select and output several bit data outputted from memory 150, 152 is a memory to store the differences (Δf) in the driving pulse durations existing between the head resistance ranks, determined at the center of the printer operating temperature range (in this case, this is 30° C.).

153 is a data selection circuit to select and output either the input data-A outputted from data-selection circuit 151 or the input data-B outputted from memory 152, 154 is an adder/subtracter which adds the input data-B outputted from data selection circuit 153 to the input data-A outputted from later shown data-holding circuit 157, (A+B), or subtracts the input data-B from the input data-A, (A−B).

155 is a memory to store the driving pulse duration (f) determined at the center of the printer operating temperature ranges.

156 is a data-selection circuit which selects either the input data-A from adder/subtracter 154 or the input data-B from memory 155, 157 is a data-holding circuit to hold the input data from data-selection circuit 156, 158 is a head-rank control circuit which outputs respective selection signals to data-selection circuits 151, 153, and 156 according to the externally inputted information of head-ranks, and a selection signal to instruct either the adding or the subtraction operation at adder/subtracter 154, and a data-holding signal to data-holding circuit 157.

159 is a memory to store the driving pulse duration suitable to the current printer operating temperature obtained by a thermal-head in the current resistance rank.

Figure 14:
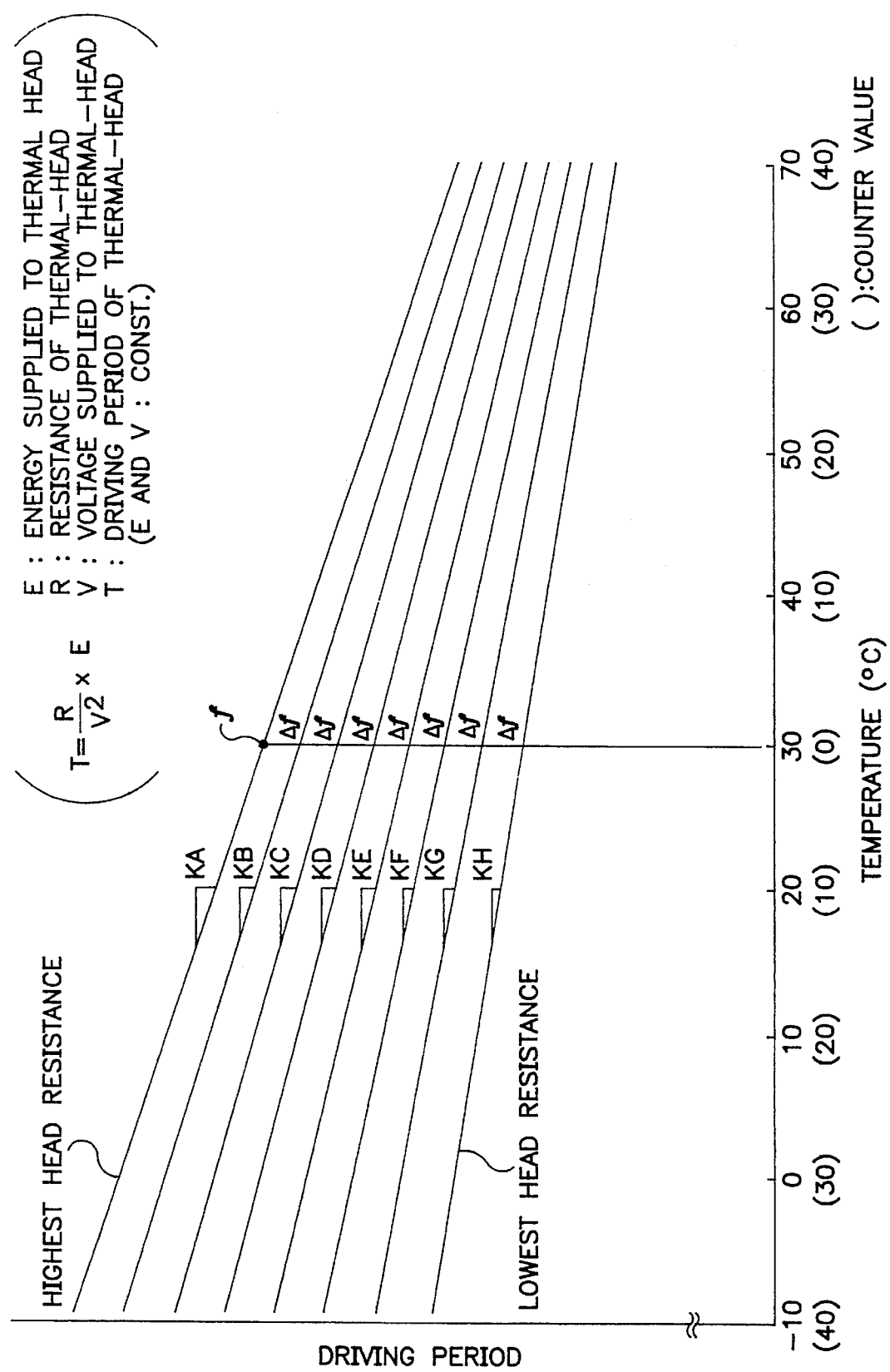
FIG. 14 is a characteristics of the temperature vs. driving pulse duration of thermal-head.

The operation of the head resistance rank compensation circuit having a construction shown in the above is now explained by referring FIG. 13 which shows a circuit construction and FIG. 14 which shows a characteristics between the temperature and the driving-pulse duration.

In this embodiment of the invention, the printer operating temperature range of the thermal-head is assumed to be a range from −10° to 70° C., and six head-resistance ranks are assumed to be eight ranks including the ranks of A to H. Among these ranks, the rank having a highest resistance rank is specified as rank-A, while the one having a lowest resistance rank is specified as rank-H.

The driving pulse duration f which is a data stored in the memory 155 is transferred to the input-A of adder/subtracter 154 through data selecting circuit 156 and data holding circuit 157. Then, the driving pulse-duration difference between the head resistance ranks at an operating temperature of 30° C., which is stored in memory 152 is transferred to the input-B of adder/subtracter 154 through data-selection circuit 153.

In parallel with this process, based on the rank of the head resistance to be examined, the head resistance is compared with the head-resistance rank A by means of head-rank control circuit 158 in order to determine the magnitude of rank difference.

If the difference is found to be n-ranks by this process, the input data-B is subtracted from the input data-A to said adder/subtracter 154 for n-times, and the result of this is stored in data holding circuit 157. Thus, at this point, the driving time or driving pulse duration proper to the thermal head at the rank of head resistance and at the center of the printer operating temperature (in this case, this is 30° C.) is stored in data holding circuit 157.

Based on the rank of the head resistance then, one of the data, KA to KH, stored in memory 150 is selected by data selection circuit 151. If the head resistance rank is G-rank, the data KG stored in memory 150 is selected.

Then, based on the present temperature information, (the difference from the center of printer operating temperature range in degree), either the adding or the subtracting operation to be conducted in the adder/subtracter 154 is determined. More concretely describing, if the printer operating temperature is more than 30° C., subtraction is selected, and adding is selected if it is less than 30 C.

As shown before, the data-KG stored in memory 150 is selected by data-selection circuit 151, and the data-KG is transferred to the input-B of adder/subtracter 154 through data-selection circuit 153.

The thermal-head driving pulse duration at the head resistance rank determined at the center of printer operating temperature (30° C. in this case) stored in data holding circuit 157 is transferred to the input-A of adder/subtracter 154.

For an instance, if the present printer operating temperature is 50 C, subtraction in adder/subtracter 154 is selected, and the data of input-B is subtracted from the input-A for the number of temperature information. Since 50° C. is 20° C. off from 30° C., the presently employed temperature information is 20.

The result of this is transferred to memory 159 through data-selection circuit 156 and data holding circuit 157. The transferred data is the thermal head driving pulse duration proper to the present printer operating temperature (50° C.) at the present head resistance rank (rank-G).

Although a case where the printer operating temperature is more than 30° C. is explained so far, the head driving pulse-duration proper to the printer operating temperature at the present head resistance rank can be selected in a case where the operating temperature is less than 30° C. by using the above-described operations except the adding process is selected in the adder/subtracter 154.

The above-described explanation is just for an embodiment of the invention where the printer operating temperature range is set in a range covering from −10° C. to 70° C., but this is not necessarily be limited within this temperature range. Moreover, though eight head resistance ranks are employed in here, this is not necessarily be limited within this rank range.

The necessity of the adjustment of head driving pulse duration depending on the thermal-head resistance rank is explained at the beginning of this section.

One of the methods to realizing this is to store a number of tables defining the relationship between the driving pulse duration-proper to the printer operating temperature and the head resistance in advance in a memory. However, this requires a large number of data tables to be stored in the memory, and thus a considerably heavy load to the memory.

For example, if the head resistances are divided into eight ranks and the printer operating temperature range is set from −10° C. to 70° C. (data for 81° C.), the number of the necessary tables would be 8×81=648. If the printer operating temperature range from −10° C. to 70° C. is divided into an equal interval of 5° C., the total number of the tables would be more than 100.

In contrast to the above, by using the head-resistance rank compensation circuit of the present invention, the driving pulse duration proper to the printer operating temperature for every head resistance rank can be established by providing only a memory of several bytes.

Furthermore, since a substantially higher efficiency of memory utilization can be realized, a substantial reduction of the circuit scale and costs can be realized also. Moreover, by applying the output of the temperature compensation circuit shown in Embodiment-3 to the present temperature information (see FIG. 13), a substantial increase of data processing speed can be realized in addition to the substantial reduction of the circuit scale and costs.

Embodiment-5

An embodiment of voltage compensation circuit constituting a part of the driving-data control means incorporated in the printer controller explained in Embodiment-1 of the invention, is now explained below by referring the attached drawings.

Figure 15:
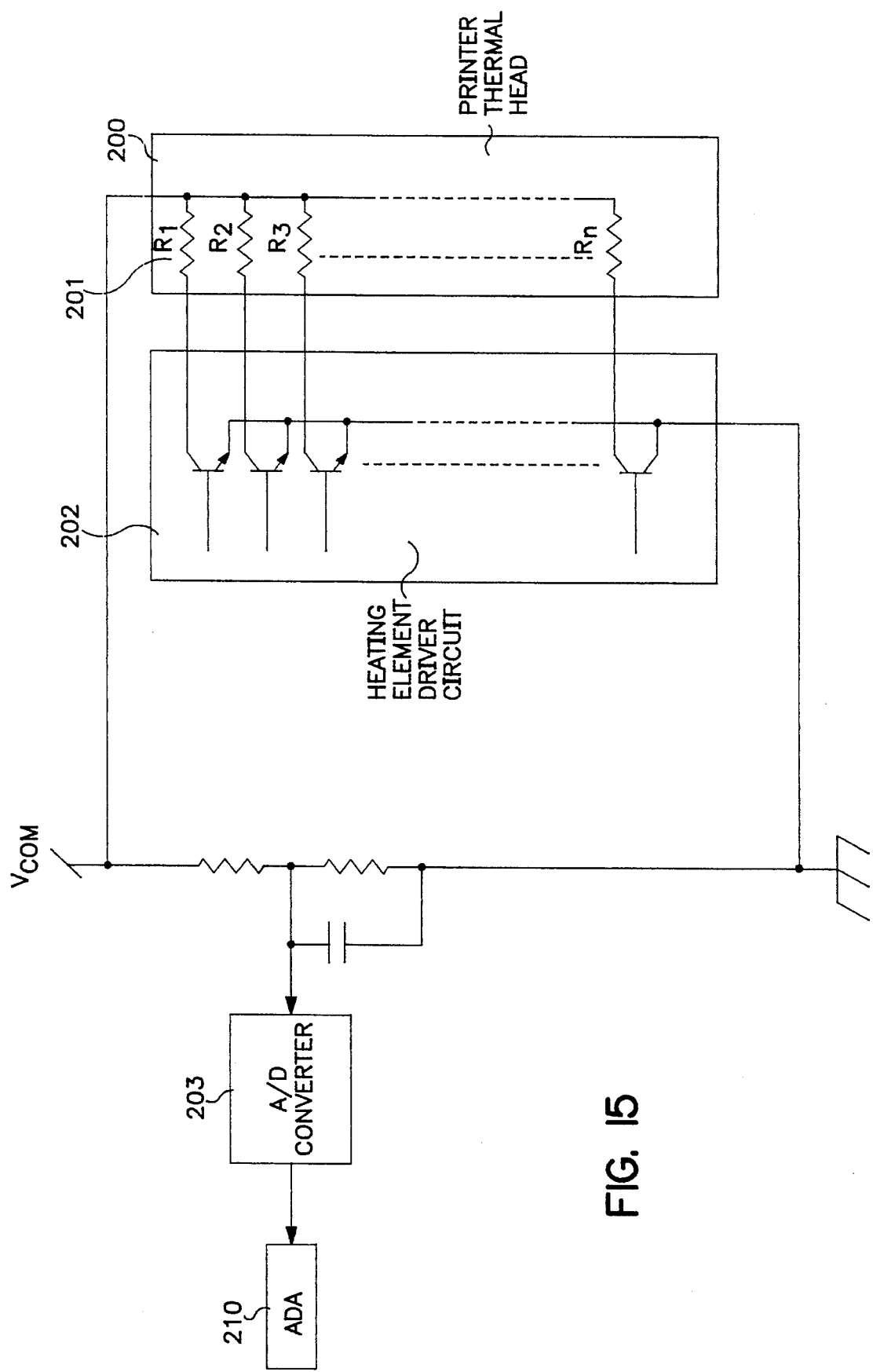
FIG. 15 is a circuit to compensate the supply voltage of printer of the invention.
Figure 16:
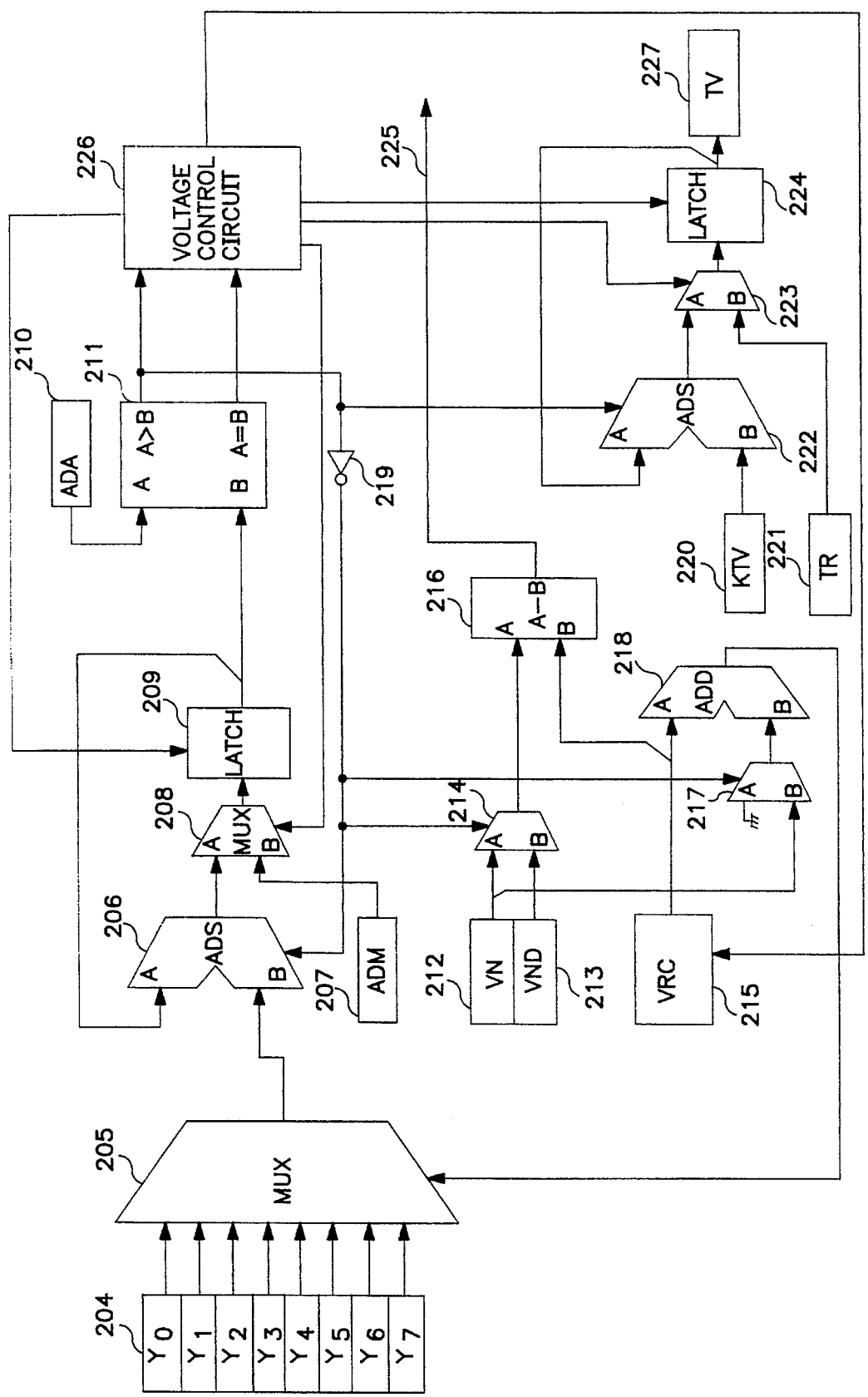
FIG. 16 is another circuit to compensate the supply voltage of printer of the invention.

FIGS. 15 and 16 show constructions of a voltage compensation circuit of the invention, where 200 is a printer thermal-head, 201 are heating-elements of thermal-head 200, 202 a circuit to drive heating-elements 201, 203 is an analog/digital converter (hereinafter this is called as AD converter) to convert an inputted analog value into a digital value.

204 is a memory to store the analog/digital converted values Y0 to Y7 which represent a resolution of the voltage compensation steps, 205 is a data selection circuit selecting one of the data outputted from memory 204, 206 is an adder/subtracter which conducts either adding operation, (A+B), or subtracting operation, (A−B), between the input data-A from data-selection circuit 205 and the later-explained input data-B from data-holding circuit 209.

207 is a memory to store the printer reference voltages or the AD converted values (ADM) of the reference voltages applicable to the thermal-head. 208 is a data-selection circuit to select the input-data from memory 207 and adder/subtracter 206, and 209 is a data-holding circuit to hold the data outputted from data-selection circuit 208.

210 is a memory to store the AD converted values (ADA) of the current printer voltage, and 211 is a data-comparison circuit to compare the magnitude of the input data-A from memory 210 and the input data from data-holding circuit 209.

212 is a memory to store the compensation steps (VN) available to compensate the voltage supplied to the thermal-head when it exceeds the printer reference voltage, 213 is a memory to store the compensation steps (VND) to compensate the voltage when it is less than the printer reference voltage.

214 is a data selection circuit to select one of the inputted data from memories 212 and 213. 215 is a counter (VRC) to count the number of voltage compensation steps, and 216 is a data-coincidence circuit to determine the coincidence between the input data-A from data selection circuit 214 and the input data-B from memory 215.

217 is a data selection circuit to select either the input data from memory 212 and the GND data, 218 is an adder to add the input data from data selection circuit 217 and the input-data from counter 215, 219 is an inverter to invert the input signal from data-comparison circuit 211, 220 is a memory to store the driving pulse durations (KTV) to compensate the printer voltage.

221 is a memory to store the driving-pulse durations (TR) before the compensation of the printer voltage is made, 222 is an adder/subtracter which conducts either adding operation, (A+B), or subtracting-operation, (A−B), between the input data-B from memory 220 and the later-explained input data-A from data-holding circuit 224.

223 is a data-selection circuit to select either the input data from memory 221 or the input data from adder/subtracter 222, 224 is a data-holding circuit to hold the data outputted from data-selection circuit 223, and 225 is an output of data-coincidence circuit 216 and is a signal informing that the printer voltage is at a permissible limit of the voltage compensation range.

226 is a voltage control circuit which controls data holding circuits 209 and 224, data-selection circuits 208 and 223, and counter 215. 227 is a memory to store the driving pulse durations suitable to the current printer voltage.

Figure 17:
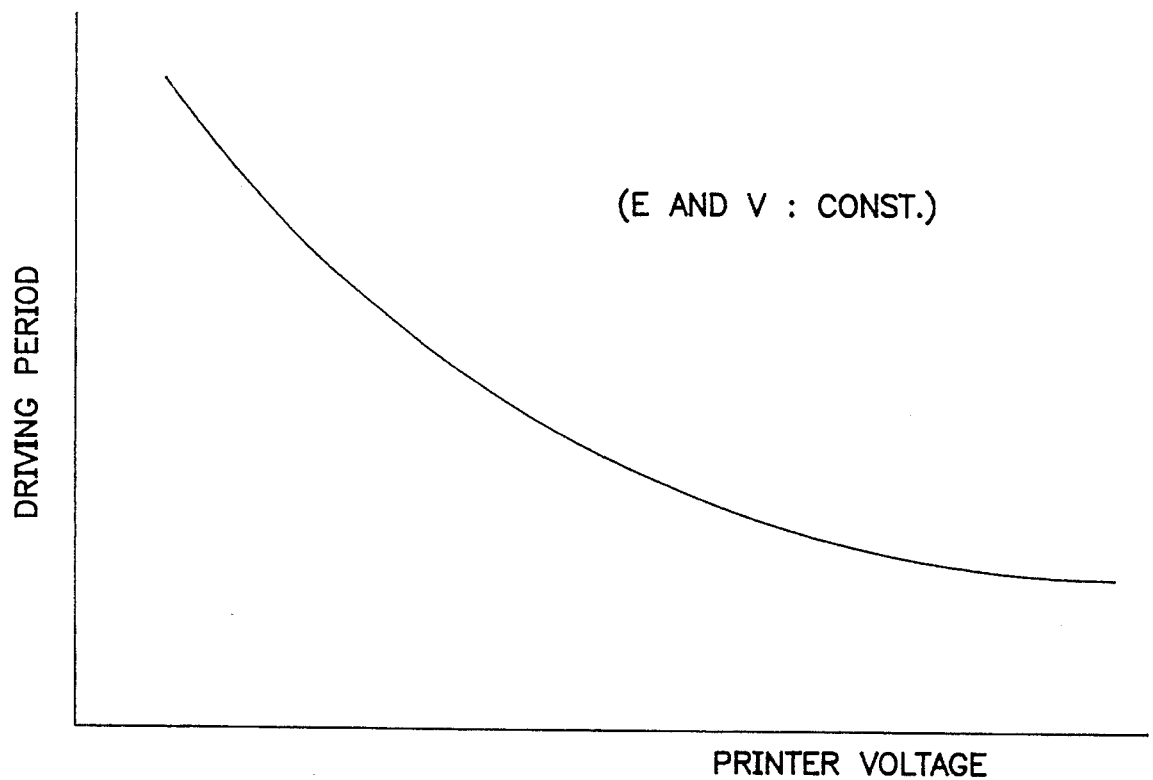
FIG. 17 is a characteristics of the printer voltage vs. driving pulse duration of thermal-head.
Figure 18:
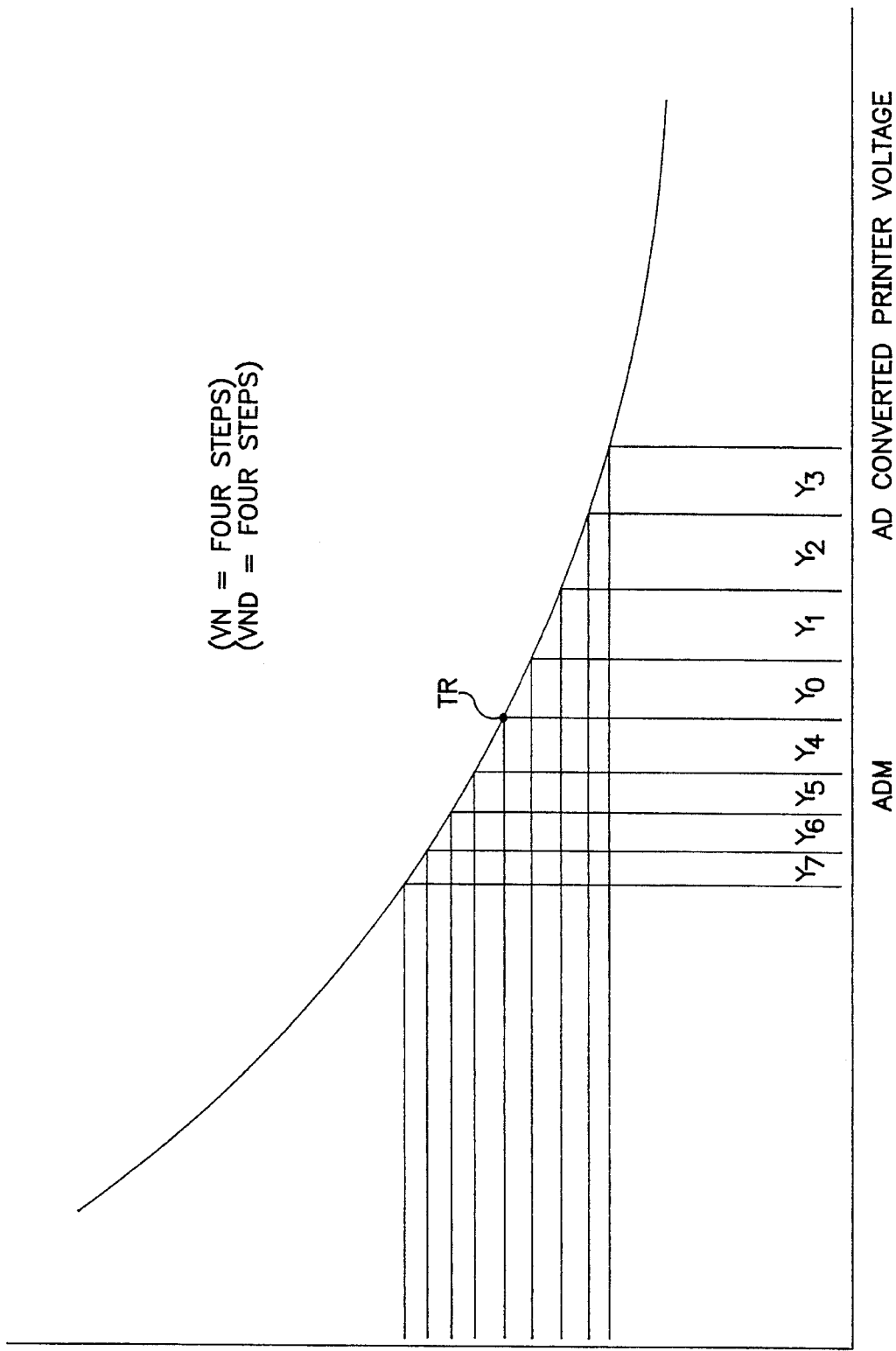
FIG. 18 is a characteristics of the AD converted printer voltage vs. driving pulse duration of thermal-head.

The operation of the voltage compensation circuit of which circuit construction is shown in FIGS. 15 and 16, is now explained by referring the relationship between the driving-pulse duration vs. printer voltage shown in FIG. 17 and the relationship between the driving-pulse duration vs. AD converted values of the printer voltages shown in FIG. 18.

In this embodiment of the invention, an eight-step printer voltage compensation, a four-step voltage compensation (VN=4) performed to the printer voltages higher than the reference voltage, and a four-step voltage compensation (VND=4) performed to the voltage lower than the reference voltage, are assumed in the printer operation process.

At first, the data in memory 207 and the printer reference voltages, or the reference voltages to the thermal-head voltages are transferred to the input-B of data comparison circuit 211 through data-selection circuit 208 and data-holding circuit 209. Then, the data in memory 210 and the AD converted values (ADA) of the current printer voltage are transferred to the input-A of data comparison circuit 211 in order to determine if A>B or A=B.

When data-comparison circuit 211 found a condition of A=B, this means that the printer reference voltage is equal to the current printer voltage. Thus, the data in memory 221 and the driving-pulse duration (TR) of the uncompensated thermal-head 200 controlled by voltage-control circuit 226 are transferred to memory 227 through data selection circuit 223 and data-holding circuit 224. Therefore, the driving pulse duration obtained at the printer reference voltage is stored in memory 227.

When data-comparison circuit 211 found a condition of A>B, this means that the current printer-voltage is larger than the printer reference voltage. Thus, the input to inverter 219 is "1" and the output thereof is "0". Thus, by this signal, a GND data "0" is selected for the input-A in data-selection circuit 217, and the data of counter 215 and the GND data are added together in adder 218 (result of this adding is zero).

According to this adding process, data Y0 stored in memory 204 is selected by data-selection circuit 205, and by adding data Y0 outputted from data selection circuit 205 to the data ADM stored in data-holding circuit 209 in adder/subtracter 206, counter 215 is incremented accordingly.

In parallel with the above-shown process, the data stored in memory 220, or the compensated driving-pulse duration (KTV) is subtracted from the data (TR) stored in data holding-circuit 224 by means of adder/subtracter 222, that is, (A−B), and the result of this is stored in data-holding circuit 224 by means of data-selection circuit 223.

Then, the data outputted from adder/subtracter 206 is transferred to data-comparison circuit 211 through data selection circuit 208 and data holding circuit 209 in order to judge if A>B or A=B against the data ADA stored in memory 210. This means a test to confirm the AD converted value of current printer-voltage within the Y0 section shown in FIG. 18 is conducted.

If a condition of A=B is confirmed by the above, the AD converted value is within the Y0 section, and if A>B is confirmed, it is higher than the value within the Y0 section. Furthermore, if A>B is confirmed, data Y1 stored in memory 204 is selected and the comparison same as above is conducted.

This voltage compensating process is continued until a condition of A=B or A>B is confirmed by data-comparison circuit 205, and at this point, the data stored in data-holding circuit 224 is transferred to memory 227.

For instance, when data up to the data Y3 stored in memory 204 are selected for various processing, the data in counter 215 would be "4", and the data stored in data-holding circuit 224 would equal to TR−(4×KTV). At that time, voltage compensation-limit informing signal 225 is outputted simultaneously, and this signal may be used to stop the printer operation or protect the printer if necessary.

If a condition of A<B is found by data-comparison circuit 211, this means that the current printer-voltage is less than the printer reference voltage. In this case, the driving-pulse duration proper to the current printer-voltage can be determined by taking the procedures same as above except that a subtraction is selected by adder/subtracter 206 and an adding is selected by adder/subtracter 222.

Although a case employing eight voltage compensation steps is explained so far, the number of steps other than eight can be used as well.

The print density obtained by a thermal printer is determined primarily by the printer-voltage (the supply voltage to the thermal-head), driving pulse duration and the thermal-head resistance. However, the print density depends primarily on the printer voltage.

The voltage compensation for thermal-head is generally determined by solving the following approximation equation, $T=E\cdot(R/V^2)$, where T is driving pulse duration, V is supply voltage, R is thermal-head resistance, and E is printing energy. However, this process requires the functions of multiplication and division which can be obtained only by a large-scale circuit and increased costs.

In contrast to the above, the voltage compensation circuit of this invention can be realized by a small-scale and low cost circuit provided with a small memory of several bytes, and by this, the driving pulse duration proper to the printer voltage can be determined.

Embodiment-6

In this embodiment of the invention, a simultaneous coloring-rate compensation mean, constituting a part of the driving-data control means of the invention, is explained.

Figure 19:
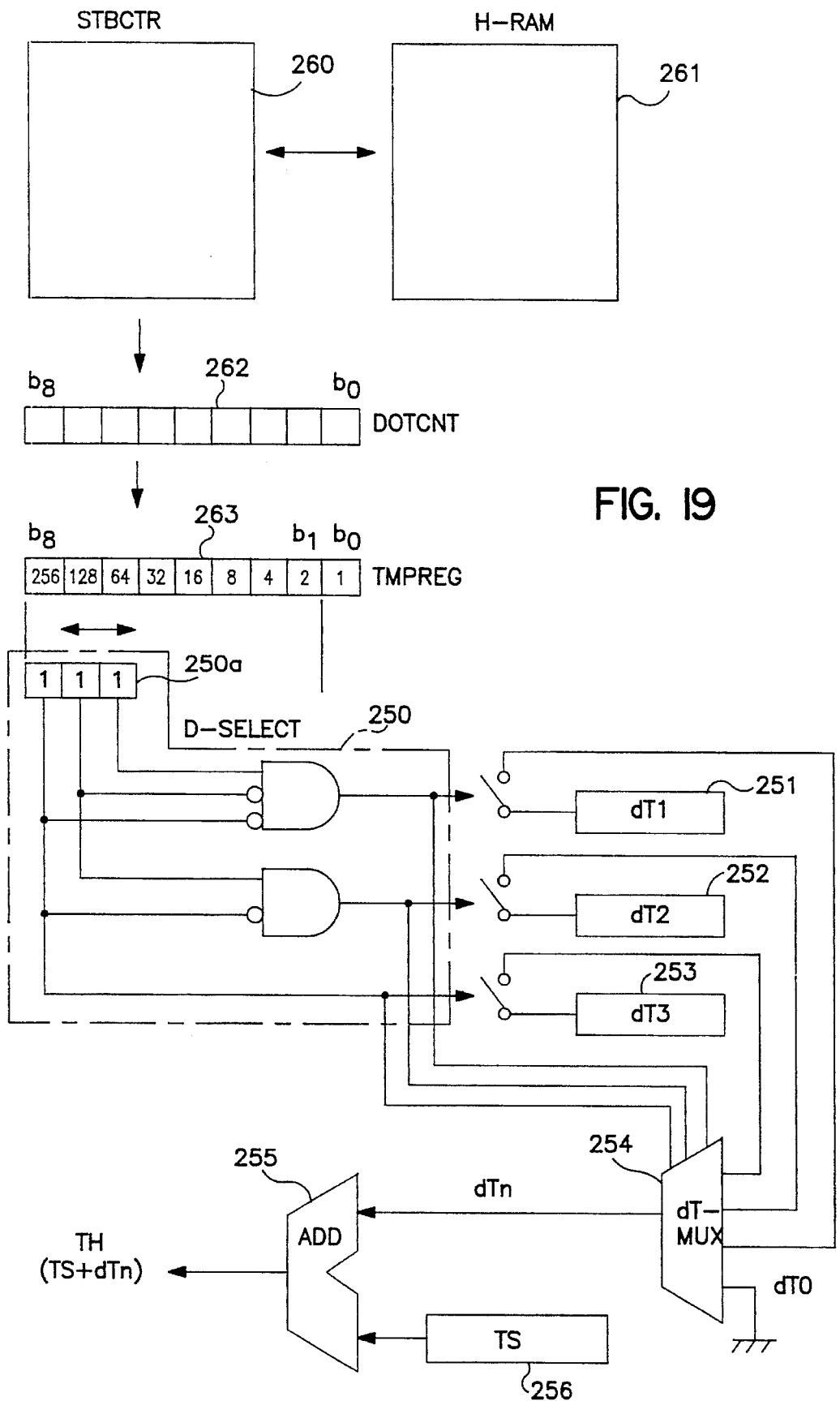
FIG. 19 is a block diagram showing the fundamental construction of the circuit to compensate the number of simultaneously driven heating elements of thermal-head.

FIG. 19 is a block diagram of fundamental circuit to compensate the simultaneous coloring-rate of the driving data control circuit. In FIG. 19, 250 is a circuit to select the number of dots (D-SELCT) by which the number of simultaneously driven dots is determined, 251–253 are compensation durations (dT1 to dT3), 254 is a compensation duration selecting circuit (dT-MUX) selecting one of the compensation durations, dT1 to dT3, 256 is a driving-pulse duration (Ts) determined when the reference voltage is applied.

255 is an adder to add either one of dT1, dT2, or dT3 to Ts, 260 is a strobe-controller (STBCTR) to count the number of simultaneously driven dots within a physical block of thermal-head, 261 is a memory (H-RAM) to store the thermal head driving-data, and 262 is a register (DOTCNT) to store the number of driven dots counted in an unit of physical block.

263 is a temporary register (TMPREG) to store the values same as those stored in DOTCNT 262, and this is used for the compensation of this invention. 250a is a constituting element of D-SELCT 250, and this is a mask register to mask an arbitrarily continuous three bits within a range from bit-1 (b1) to bit-8 (b8) of TMPREG 26.

In addition to the above, detailed constructions of STBCTR 260, H-RAM 261, and DOTCNT 262 are explained below by referring FIGS. 20, 21, 22, and 23.

Figure 20:
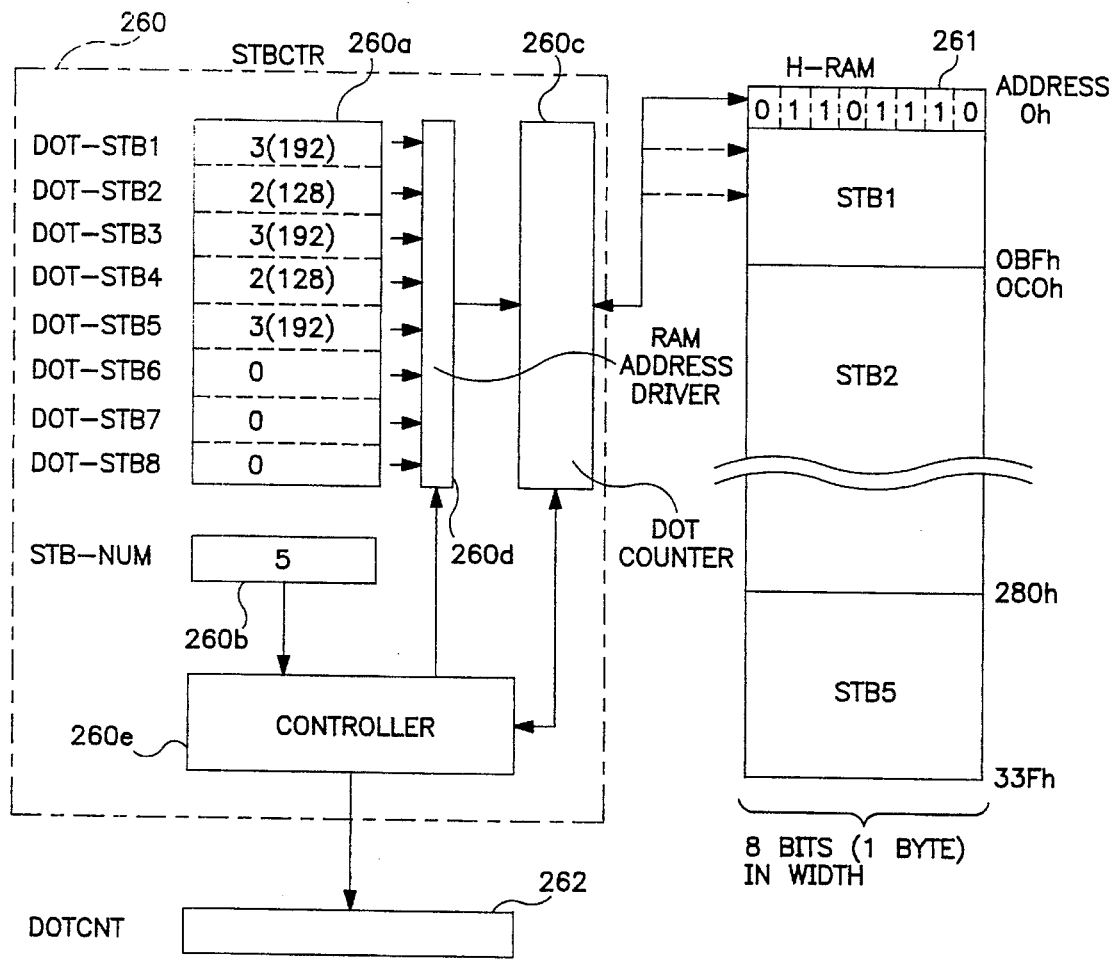
FIG. 20 is a block diagram showing the fundamental construction of the circuit to count the number of simultaneously driven heating elements provided within a physical block of thermal-head.

In FIG. 20, 260a is a register (DOT_STB) consisted of eight registers (DOT_STB1 to DOT_STB8) storing each number of strobe-dots determined in an unit of physical block of thermal head, 260b is a register to store the number of strobes, or the number of physical blocks in a thermal-head, 260c is a dot-counter to count the number of driven heat elements existing in a one-byte data read from an arbitrary address in H-RAM 261, 260d is a RAM address deriving circuit to derive the information of addresses which are accessible by dot-counter 260c by the information of DOT STB 260a and STB NUM 260b, and 260e is a controller to control each of constituting elements 260a to 260d.

Figure 21:
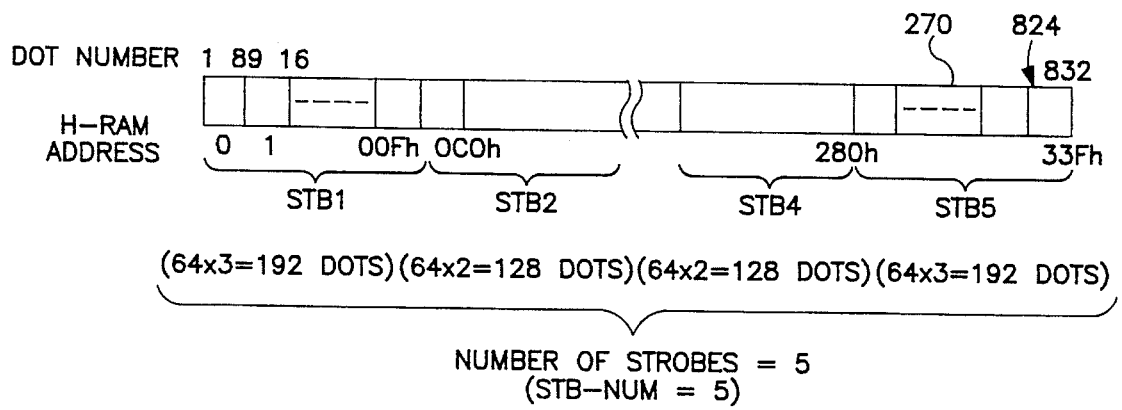
FIG. 21 is a schematic diagram showing the relationship between the physical block of thermal-head and the driving data memory.

In FIG. 21, 270 is a thermal-head comprised of five physical blocks (strobes), and the numbers of constituting dots in physical blocks are, as shown by physical block 260a in FIG. 20, those are 128, 192, 128, and 192 dots counting from the left. According to the driving-data stored in H-RAM 261, the eight dots or, No. 1 to No. 8 dots, correspond to address-0, the eight dots or No. 9 to No. 16 dots correspond to address-1, and-so-on . . . , and the eight dots or No. 824 to No. 832 dots correspond to address-33Fh.

In a case of thermal-head shown in FIG. 21, the method to count the number of driven dots for each physical block is now explained below.

In order to show that five strobes are provided in STB_NUM in FIG. 20, a numeral, or five, is set in there. Though DOT_STB 260a is able to deal with eight strobes at maximum, the numbers of dots are set in DOT_STB1–DOT_STB5 in an unit of strobe since the number of strobes in this case is only five. The number set in DOT_STB 260a is provided in an unit of 64 dots in order to save the register size.

Figure 22:
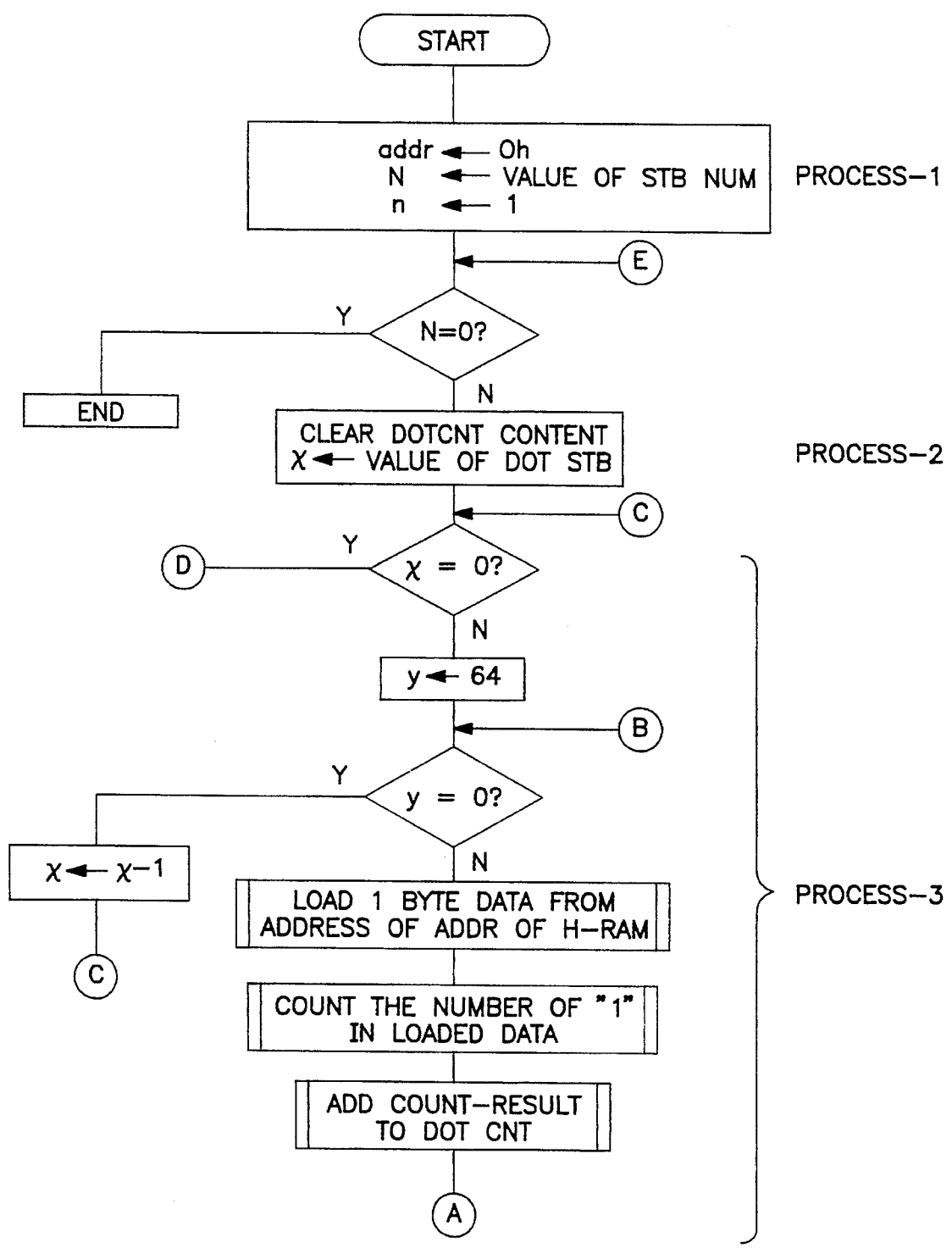
FIG. 22 is a flow-chart showing the process to count the number of driven heat elements within a physical block of thermal-head.
Figure 23:
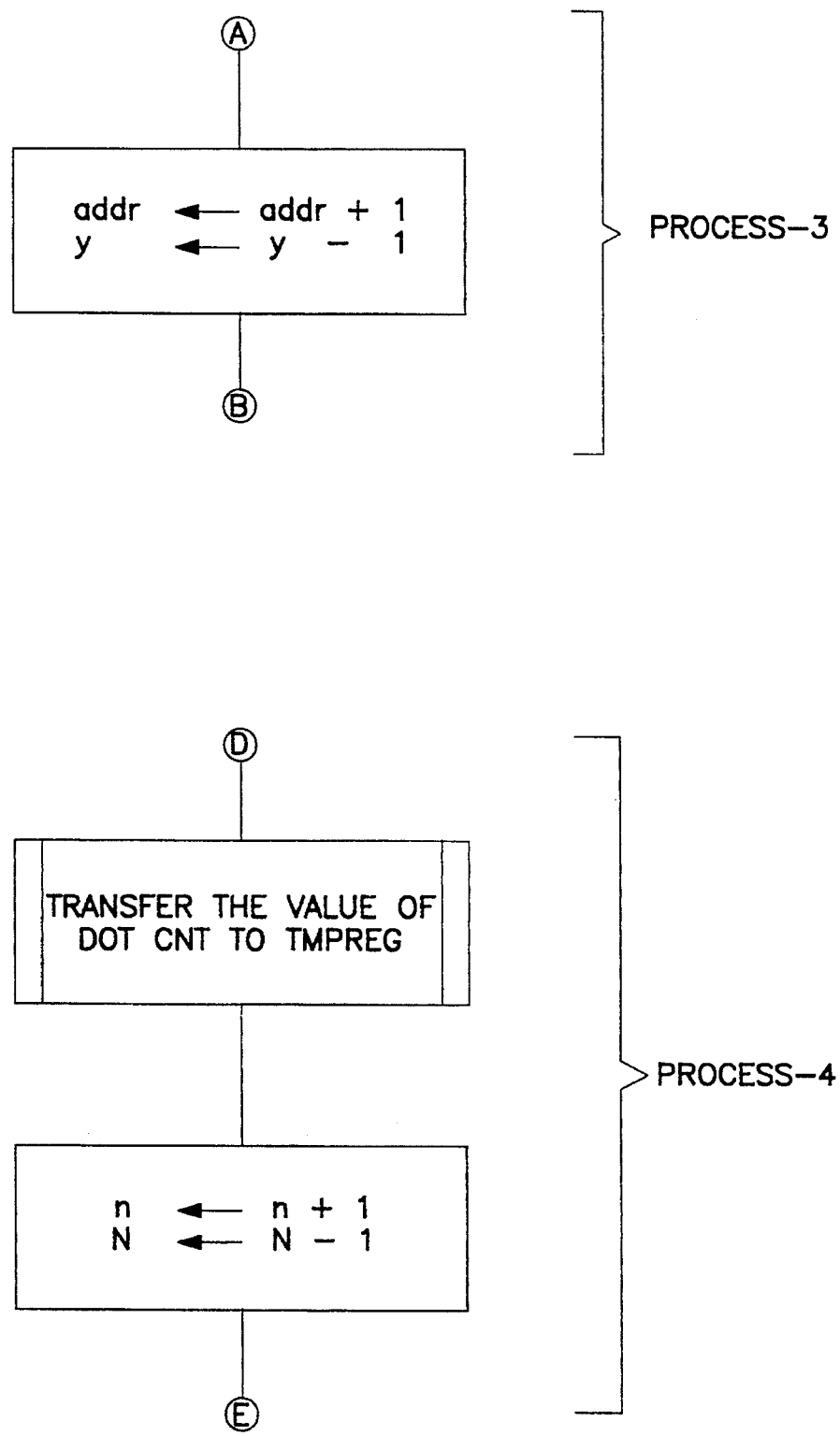
FIG. 23 is a flow-chart showing the process to count the number of driven heating elements within a physical block of thermal-head.

The flow of the processes is now explained by referring FIGS. 22 and 23. The processing is began with various initializing processes including the determination of the top address of driving data stored in H-RAM 261, loading of the contents of STB-NUM 260b, and the determination of the number of strobes (Process-1).

Then, DOTCNT 26 is cleared and the number of dots within the first strobe is loaded in order to count the number of the driven dots in the first strobe (Process-2).

Hereafter, the processes of the loading of data from H-RAM 261, counting of the driven dot number, adding of the counting result to DOTCNT, and updating of the address by which H-RAM 261 can be accessed, are repeated until the end of the counting of driven dot number (Process-3).

By the time the counting of the driven dots in the first strobe is completed, the entire content of DOTCNT 262 is transferred to TMPREG 263 (Process-4).

Hereafter, Process-2 to Process-4 are repeated in order to count the number of driven dots in the second to fifth strobes.

The operation of thus constructed thermal-head driving-data processes is now explained below by referring FIG. 19.

As shown before, TMPREG 263 shows the number of simultaneously driven dots for each strobe. Thus, by means of both TMPREG 263 and D-SELCT 250 equipped with a mask register 250a, either one of the driving pulse compensation durations, dT1, dT2, or dT3, is selected. This selected duration is so added to the reference driving pulse duration that the driving pulse duration TH compensating the supply voltage drop caused by the simultaneous dot driving, is obtained.

In an example shown in FIG. 19, since b6 to b8 are selected for mask-register 250a, dT1, dT2, and dT3 are the pulse durations for compensating the voltage drops caused by the simultaneous driving of 64, 128, and 256 dots respectively, and the relationship in this case is illustrated in FIG. 24.

In addition to the above, FIGS. 25(a) to 25(d) show the driving-pulse durations compensated by the number of simultaneously driven dots. FIG. 25(a) shows the duration without the compensation, and FIGS. 25(b) to 25(d) show the driving pulse durations compensated by dT1, dT2, and dT3 respectively.

As above-described, by providing a mean to count the number of driving dots in a physical block of thermal-head, a selector to determine the number of simultaneously driven dots, and a compensation mean to compensate the driving pulse duration according to the number of simultaneously driven dots, the voltage drop caused by simultaneous driving of plural dots can be compensated, and thus, the deterioration of print quality can be prevented.

Embodiment-7

An example of the printing-rate compensation means which constitutes a part of the driving-data control means of the invented printer control means is illustrated in the following.

Figure 26:
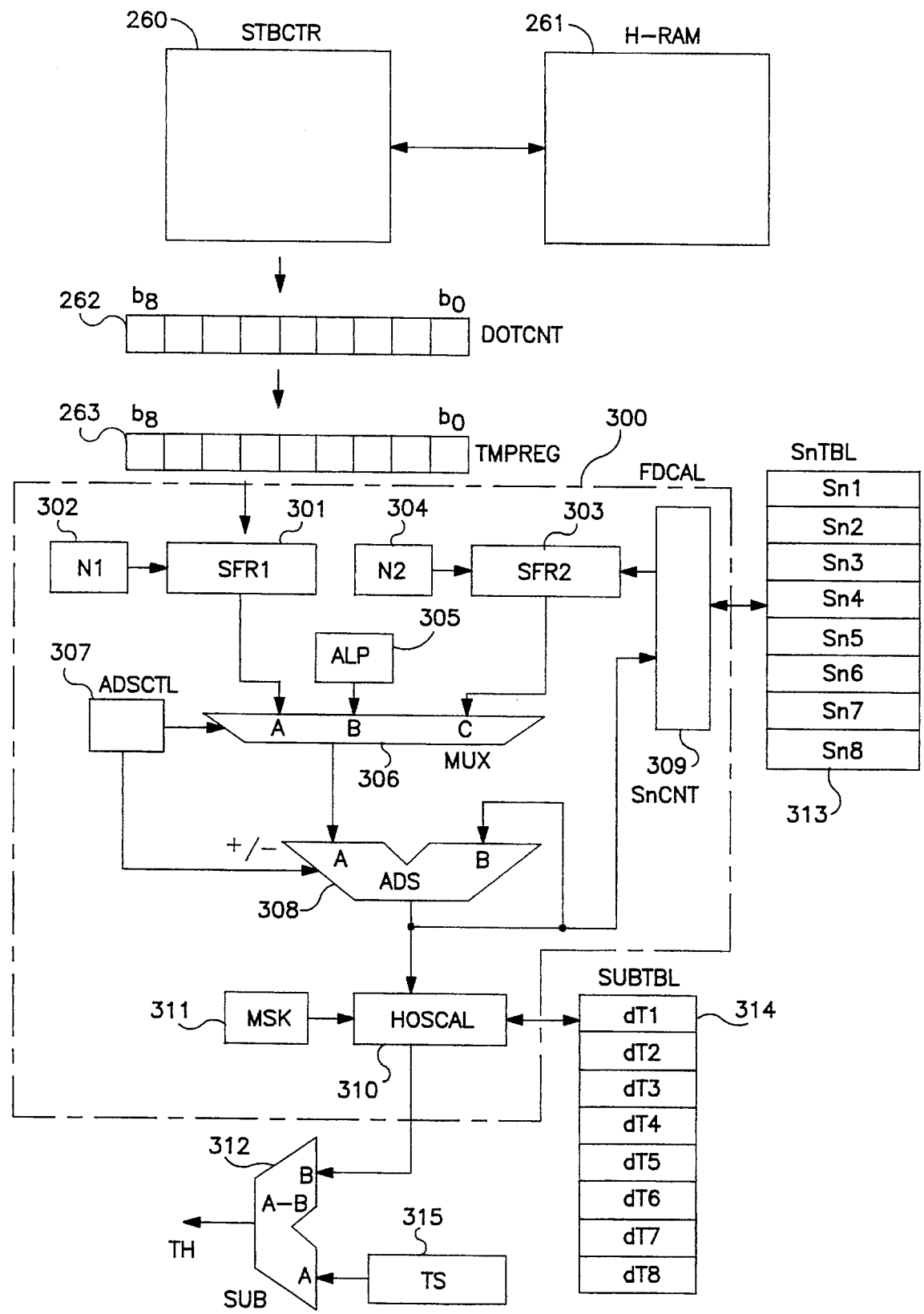
FIG. 26 is a block diagram showing the fundamental construction of the circuit to compensate the printing rate employed in an embodiment of the invention.

FIG. 26 is a block diagram illustrating a circuit to compensate the fundamental thermal-head printing-rate. In FIG. 26, 260 is a strobe controller (STBCTR) to count the number of driven dots in a physical block unit of thermal-head, 261 is a memory (H-RAM) to store the driving-data of thermal-head, 262 is a register (DOTCNT) to hold the number of driven dots counted in a physical block unit, and 263 is a temporary register (TMPREG) to hold contents same as the one in DOTCNT 262 in order to utilize these to this compensation processing.

Since the means explained in Embodiment-6 can be utilized as the means 260 to 263, no further illustration for these are described here.

300 is a printing-rate compensation circuit (FDCAL) which is a main circuit element of the invention, and the arithmetic operation of the below-shown equation is conducted by this.

$$S_n = S_{n-1} + D_n/2^{N1} - S_{n-1}/2^{N2} + \alpha \qquad \text{Eq. 1}$$

where Sn is a printing-rate data of the currently printed line, Dn is the number of driven dots of the currently printed line, Sn−1 is a printing-rate data accumulated by the time of the previously printed line, N1 is a printing-rate coefficient, N2 is a blank printing-rate coefficient, and α is a compensation parameter.

The derivation of the printing-rate shown in Eq. 1 and the compensation thereby are to be conducted in a physical block unit also.

301 to 311 are main constituting element of FDCAL 300, 301 is a shift-register (SFR(1)) to compute $D_n/2^{N1}$ of Eq. 1, 302 is a printing-rate coefficient (N1) shown in Eq. 1, and this can be arbitrarily set at any value from 3 to 6. 303 is a shift register (SFR(2)) to compute $S_{n-1}/2^{N2}$, 304 is a blank printing-rate coefficient (N2) of Eq. 1, and this can be arbitrarily set at any value from 4 to 7.

305 is a circuit to determine the compensation parameter (ALP) by which the compensation parameter (α) is determined, and this can be any value from 0 to 7. 306 is a selector (MUX) to select one of the inputs A, B, and C, 307 is a controller (ADSCTL) to control the order of calculation processes of adder/subtracter (ADS) 308 necessary to process MUX 306 and Eq. 1.

Adder/subtracter controller 307 sets the selection of MUX 306 in an order of A to B to C, and instructs ADS 308 to operate as an adder when the computation result of SFR(1) 301 and the data of ALP 305 is inputted into ADS 308, and instructs ADS 308 also to operate as a subtracter when the computation result of SFR(2) 303 is inputted into the above-mentioned computation result thereafter.

Moreover, 313 is a printing-rate data table (SnTBL) storing the accumulated printing-rate data for every physical block (strobe), and this table can be provided in a memory.

309 is a printing-rate data controller (SnCNT) to control the loading/storing of the data of SnTBL 313 in order to load the past accumulated printing-rate data from SnTBL 313, and to store the the previous printing-rate data as an accumulated printing-rate data therein in the computation process of Eq. 1.

314 is a compensation duration table (SUBTBL) showing the driving pulse duration compensated according to the printing-rate computation result. Whereas the subtraction durations to be subtracted from the driving pulse durations are stored therein, the determined durations to be subtracted are larger in an order of dT1 to dT8.

Figure 27:
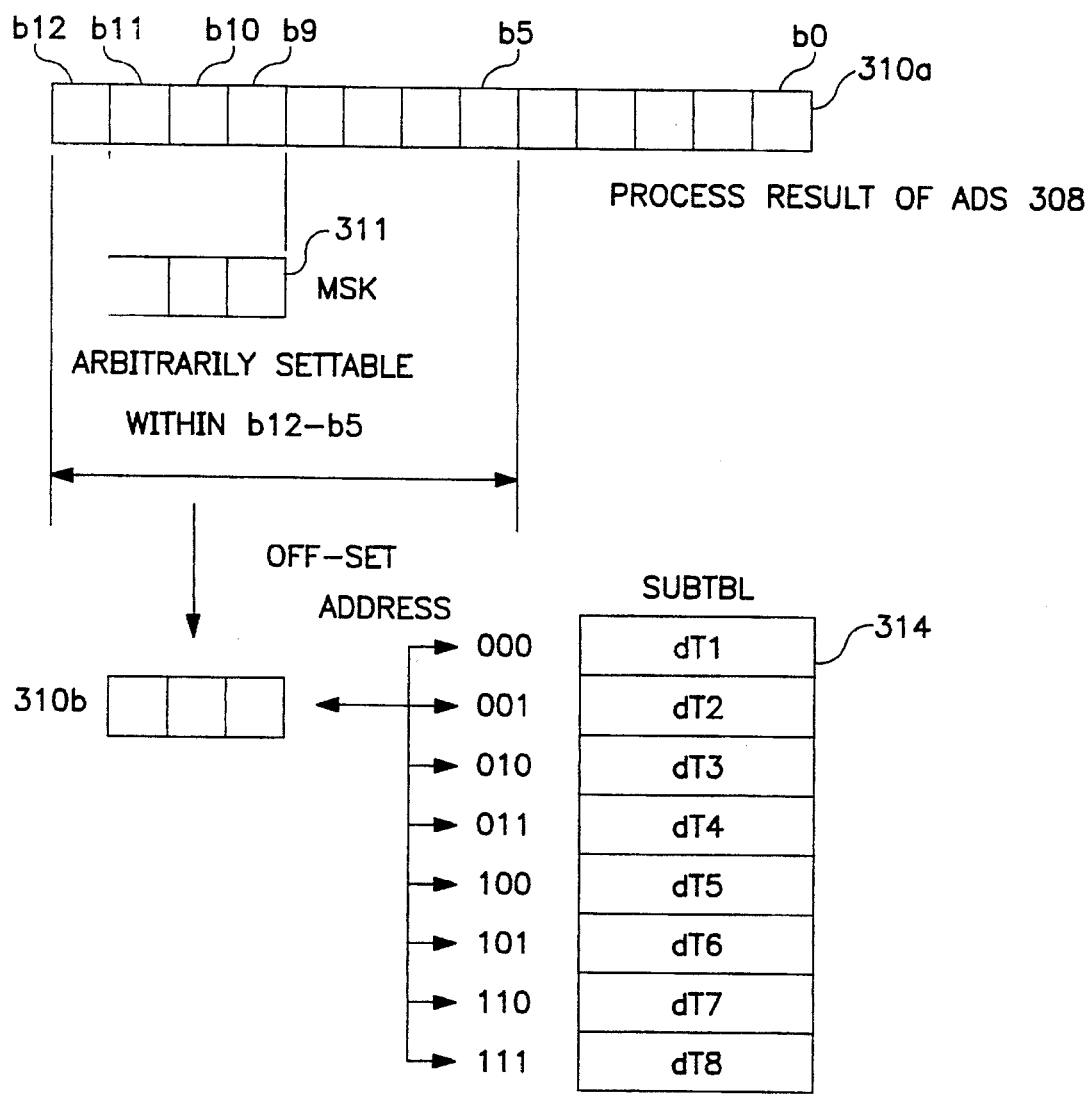
FIG. 27 is a schematic diagram showing the procedure to determine the compensating period conducted in the compensation period processor.

Beside the later-given detailed explanations for 310 and 311 by referring FIG. 27, 310 is a compensation duration calculator (HOSCAL) to select and load a proper compensation duration from SUBTBL 314, and 311 is a mask-register (MSK) necessary to derive the load-address to SUBTBL 314 in HOSCAL 310.

312 is a subtracter (SUB) to subtract a compensation duration from the reference driving pulse duration 315 (Ts) in order to obtain a proper driving pulse duration according to the printing-rate computation result.

As above-described, the computation of Eq. 1 for the printing-rate computation is executed by printing-rate compensation circuit (FDCAL) 300.

Compensation duration calculator 310 and mask-register 311 are now explained in next by referring FIG. 27 wherein 310a is a register storing the adding/subtracting results of ADS 308 incorporated in HOSCAL 310.

The register may have a size of 13 bits, so that MSK 11 can be set at any place in arbitrarily continuous three bits within a range of 8 bits covering from the bit-5 (b5) to bit-12 (b12) of register 310a. MSK 311 is a mask-register of register 310a, and the content of 3-bit set in MSK 311 can be a 3-bit binary data 310b selected from register 310a. By showing the off-set address of SUBTBL 314, data 310b can be durations to be subtracted, determined according to the printing-rate calculation.

Figures 28A, 28B:
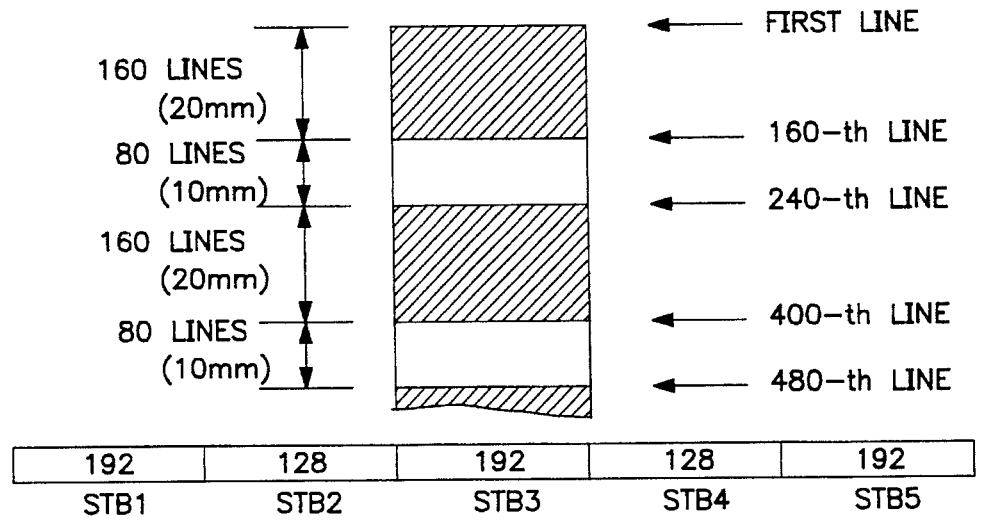
FIG. 28(a) a thermal-head construction and FIG. 28(b) shows a printing-rate compensation procedure.

The performance of the printing-rate compensation calculation of Eq. 1 is shown in next by referring FIG. 28(a) which shows a construction of thermal-head and a pattern printed thereby. The thermal-head in this case, consists of five strobes, and the number of dots in each strobe is 192 dots for the first strobe, 128 dots for the second strobe, 192 dots for the third strobe, 128 dots for the fourth strobe, and 192 dots for the fifth strobe.

When a pattern printed by the third strobe consists of repeated 20 mm wide solid prints and 10 mm wide blank prints, and this is printed by a thermal-head having a resolution of 8 dots per millimeter, the solid print part consists of 160 lines, and the blank part consists of 80 lines.

FIG. 28(b) shows a result of compensation calculation of Eq. 1 conducted for the above-shown print pattern.

When the solid printing is continuously performed, the line printing-rate data, Sn, becomes large, and the driving pulse duration becomes smaller because of the increased subtraction compensation value. When a blank print is inserted between the solid lines, on the contrary, the printing rate compensation level increased by that time is inversely decreased, and the subtraction compensation value becomes smaller, and the driving pulse duration is back to the original reference duration.

Figure 29A:
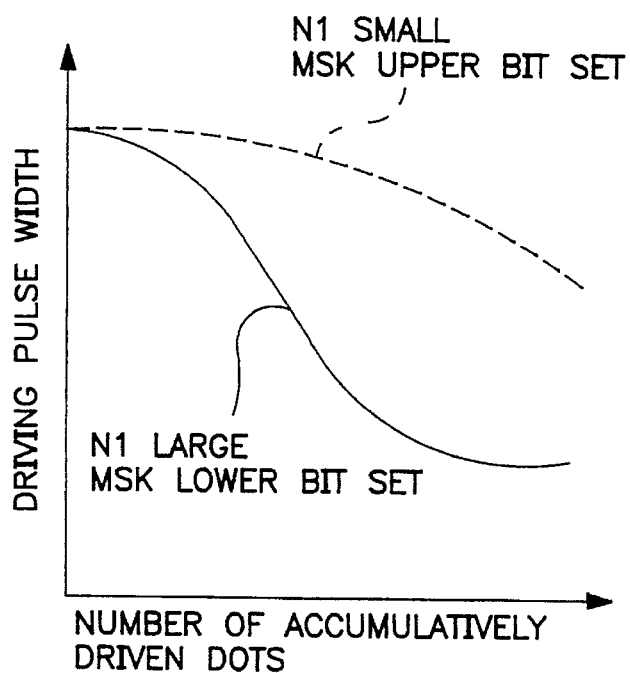
FIGS. 29(a) and 29(b) are to show the compensations conducted in respect of each of the parameters employed in the processes to compensate the printing-rate.

When the values of coefficients N1 and N2, and the setting location of MSK 311 are varied as shown in FIG. 29(a), for instance, when a larger N1 is set or MSK 311 is set at a lower bit, the gradient of the subtraction characteristics of driving pulse duration determined by the printing-rate compensation, becomes larger. On the other hand, when a smaller N1 is set, or MSK 311 is set at an upper bit, the gradient of the subtraction characteristics becomes smaller.

Figure 29B:
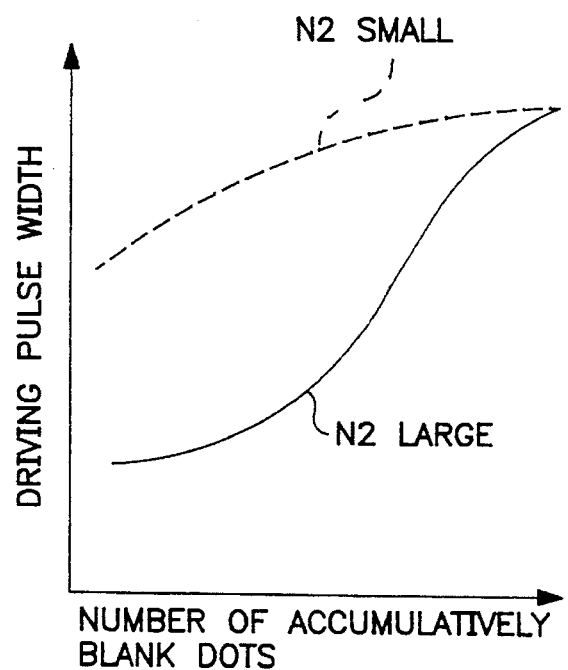

Moreover, when a larger N2 is set as shown in FIG. 29(b), the gradient of the returning characteristics of the driving pulse duration caused by the increased rate of blank printing, becomes larger. When a smaller N2 is set, the gradient of the return characteristics of the driving pulse duration becomes smaller.

Since the parameters in Eq. 1 can be set at an arbitrary value, the printing-rate compensation matched to the thermal-head characteristics and the printing condition, can be obtained, and therefore, this method can be generally applied.

As above-described, the driving-pulse duration can be controlled exactly according to the printing-rates in the past by providing; means to count the number of driving dots in a physical block of thermal-head, dot-number selector to determine the number of simultaneously driven dots in a physical block unit, means to count both the number of accumulated driving-dots in the past and the number of blank-printed dots, and a means to control the driving pulse duration according to the accumulated number of driven dots and the number of blank printed dots. Therefore, poor print quality such as the spread of colored dots caused by heat accumulation, and the blurred print caused by excessive compensation against heat accumulation can be prevented, and high print quality can be secured consistently by employing this circuit of simple construction.

Embodiment-8

A dynamic divisional compensation means which constitutes a part of printer driving-data control means of the invention is explained in the following.

Figure 30:
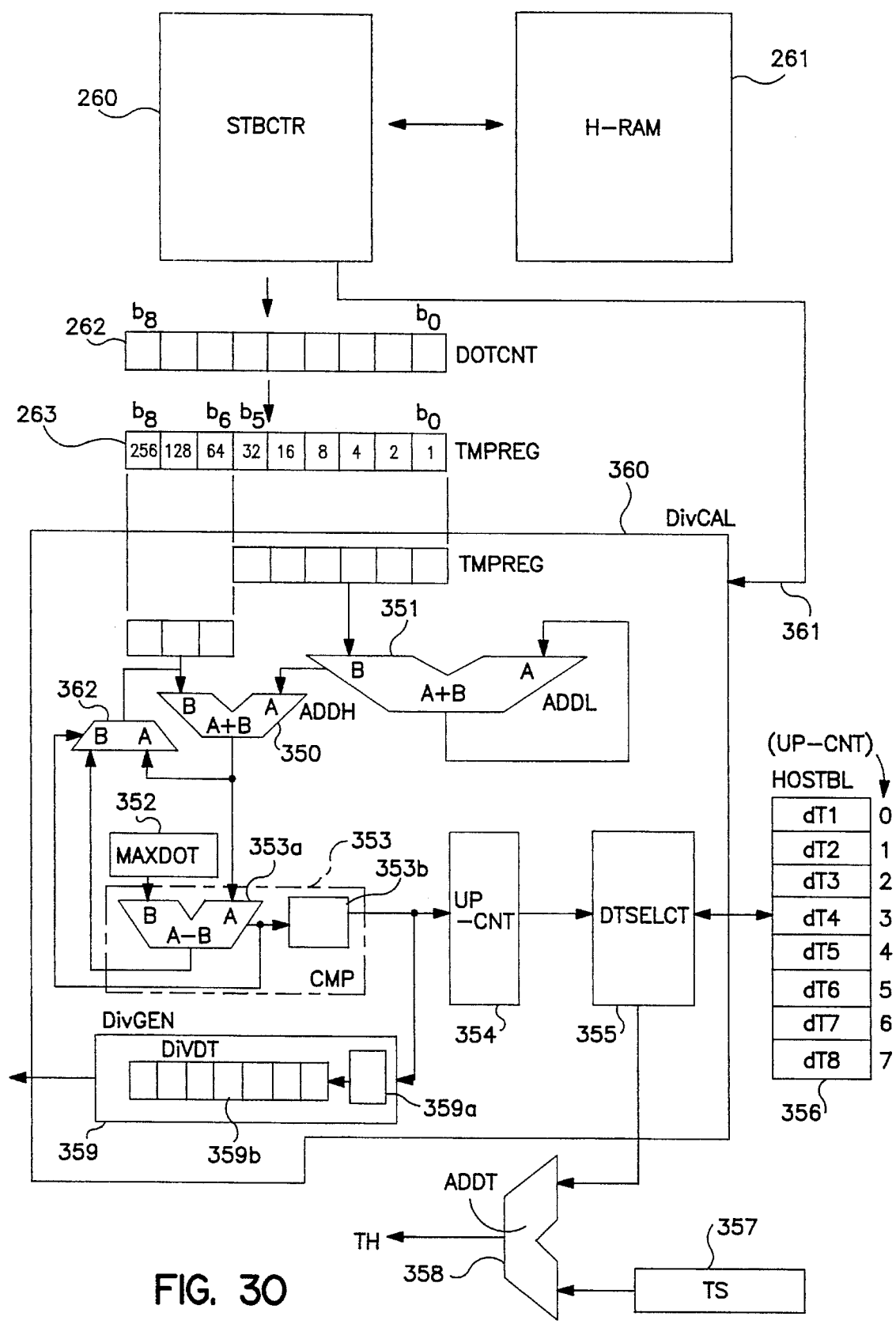
FIG. 30 shows a fundamental construction of the dynamic divisional driving circuit employed in an embodiment of the invention.

FIG. 30 shows a block diagram of fundamental dynamic divisional compensation circuit incorporated in the printer driving-data controller of the invention. In FIG. 30, 260 is a strobe controller (STBCTR) to count the number of driven dots in an physical block unit of thermal-head, 261 is a memory (H-RAM) to store the driving-data of thermal-head, and 262 is a register (DOTCNT) to hold the number of driven dots which is counted in an physical block (strobe) unit of thermal-head.

263 is a temporary register (TMPREG) to temporarily store the counted number stored in DOTCNT 262 in order to utilize those to the compensation processing. Since means explained previously in Embodiments 6 and 7 can be used for 260 to 263, detailed explanations for those are omitted here.

350 is an adder (ADDH) to add the upper 3 bits (input-B) of b6–b8 of TMPREG 263 to the carry (input-A) of later-explained adder 351, 351 is an adder (ADDL) to add the lower 6 bits (input-B) of b0–b5 of TMPREG 263 to the result (input-A) of itself, and 352 is a register (MAXDOT) to set a maximum number of simultaneously drivable dots, and this can be set within a range from 0 to 7 counted in an unit of 64 dots.

353 is a comparator (CMP) to compare the output of ADDH 350 and the output of MAXDOT 352 which is the maximum number of simultaneously drivable dots, and outputs "1" when the value of ADDH 350 is larger than or equals to the output of the latter, or outputs "0" when the value of ADDH 350 is less than the output of the latter.

353a and 353b are main constituting elements of CMP 353. 353a is a subtracter to which output (input-A) of ADDH 350 and the output (input-B) of MAXDOT 352 are inputted to conduct a process of (A–B). 353b is a comparison data output circuit which outputs "1" when (A–B) is larger than or equals to 0, and transfers this result to ADDH 350, and a selector 362 outputs a control signal to select the input-B. On the other hand, when (A–B) is less than 0, 353b outputs "0" and outputs a control signal to selector 362 which selects the input-A by this, and by this the output of ADDH 350 is transferred to 353b itself.

354 is an up-counter (UP-CNT) which increments its count by one whenever data "1" is outputted from CMP 353, and its initial value is set at 0.

356 is a table (HOSTBL) to show the driving-pulse duration compensation data applied to divisional driving, wherein the compensation durations such as dT1 . . . dT8 to be added to the driving pulse duration in order to make the thermal-head driving energy constant according to the number of head divisions. In this case, dT1 . . . dT8 are the compensation durations, and dT1 is for the non-divisional driving and is set at 0, dT2 is for the two-divisional driving, . . . dT8 is for the eight divisional driving.

355 is a compensation value selector (DTSELECT) in which the compensation duration from HOSTBL 356 are loaded using the value of UP-CNT 354 as an off-set address data. In its operation, dT1 is loaded when the value of UP-CNT 354 is 0, dT2 is loaded when the value of UP-CNT 354 is 1, . . . and dT8 is loaded when the value of UP-CNT 354 is 7.

357 is a reference driving-pulse duration (Ts) when no divisional driving is employed, 358 is an adder (ADDT) to add a compensation data to Ts to derive the optimum driving pulse duration.

359 is a divisional information generator (DIVGEN) provided to deal with divisional driving up to eight divisions. 359a and 359b are main constituting elements of DIVGEN 359. 359b is a divisional information data (DIVDT), and each bit of DIVDT defines the location of thermal-head strobe. Thus, the bit at which data "1" is set means the division by the corresponding strobe, and the strobes corresponding to the bits at which "0" are set, means that these can be driven simultaneously as a group up to the strobe corresponding to the bit at which "1" is set.

Figure 31:
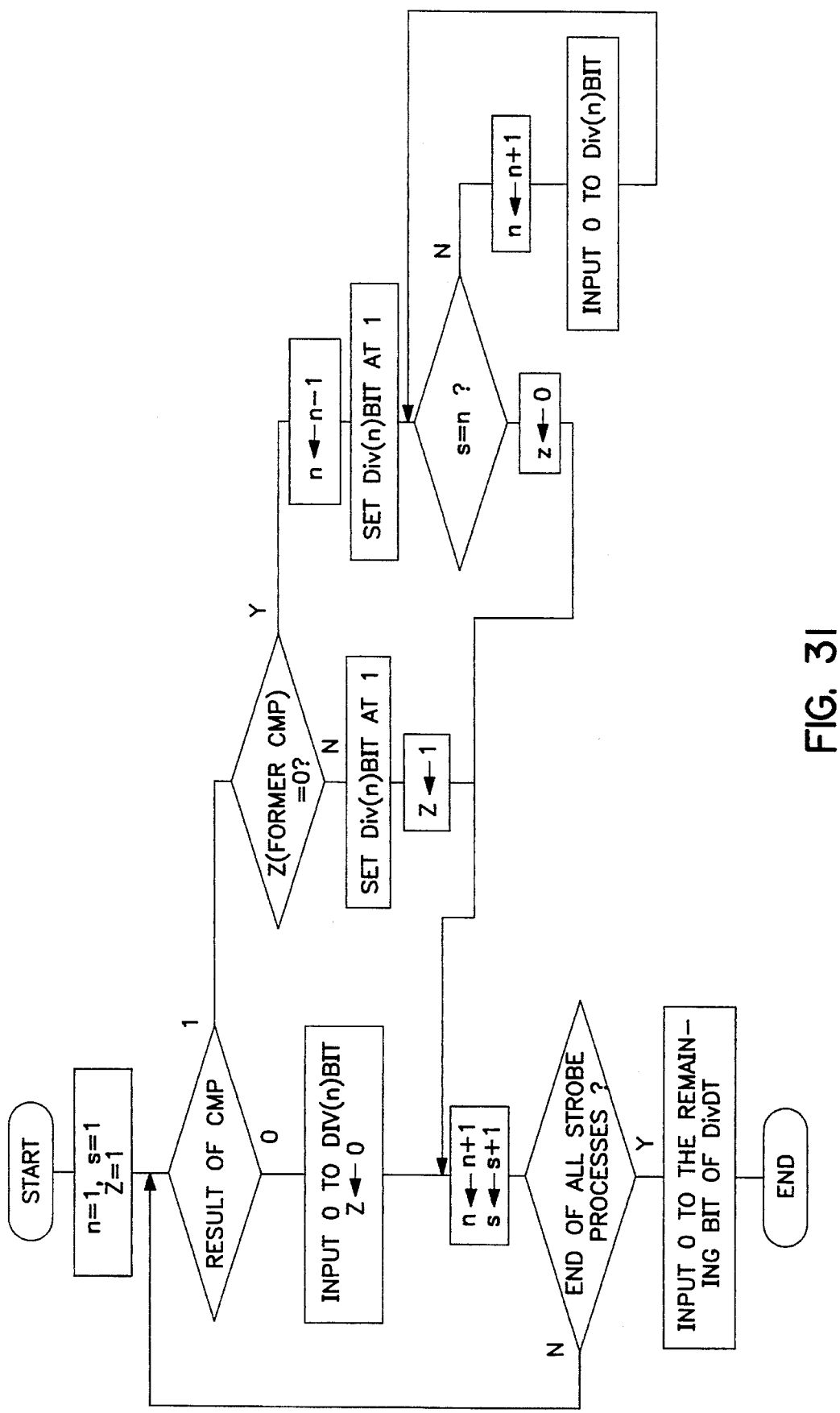
FIG. 31 is a flow-chart of the processes to provide the divisional data.

359a is a divisional data setter by which "1" is set by the output of "1" of CMP 353 at the bit corresponding to the strobe to which the compensation processing of DIVDT 359b is executed, and "0" is set by the output of "0" of CMP 353 at the bit corresponding to the strobe to which the compensation processing of DIVDT 359b is executed. These processes are illustrated in the flow-chart shown in FIG. 31.

360 is a dynamic divisional compensation calculator (DIVCAL) which is a main constituting element of the present invention, 361 is a control signal outputted from before-mentioned STBCTR 260, to tell the timing of strobe switching, and this is used as a timing control signal to start the operation of DIVCAL 360.

The operation of thus constructed dynamic divisional compensation calculator is now explained below by referring FIGS. 32(a)–32(d), 33, 34(a) and 34(b).

Figure 32A:
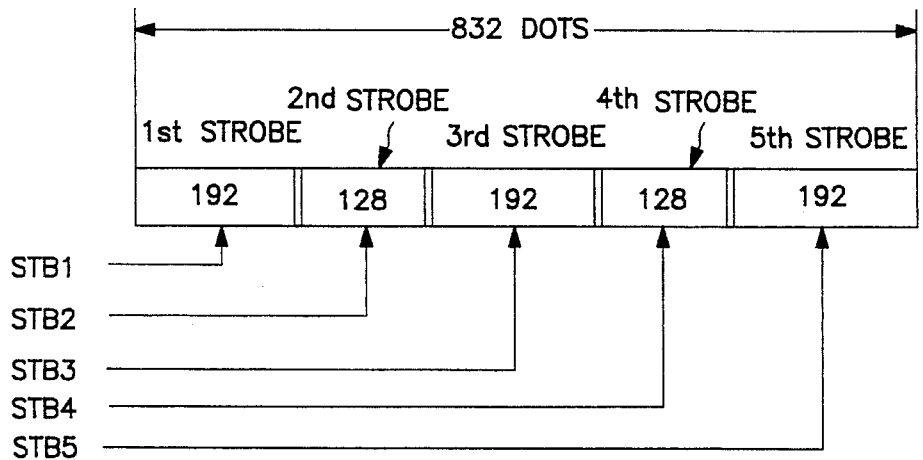
FIGS. 32(a), 32(b), 32(c), and 32(d) are schematic diagrams showing a construction of thermal-head, correspondence between the group divisional information and the physical block, dynamic divisional driving of the group, and others.

FIG. 32(a) shows a construction of typical line-type thermal-head constituted of plural physical blocks. The physical block (or strobe) consists usually of an integral number of units of minimum 64 dots. FIG. 32(a) in this case shows a thermal-head consisted of 832 dots in total which are divided into five physical blocks, and the drive permission signals STB1 to STB5 are connected to the first to the fifth strobes respectively.

Figure 32B:
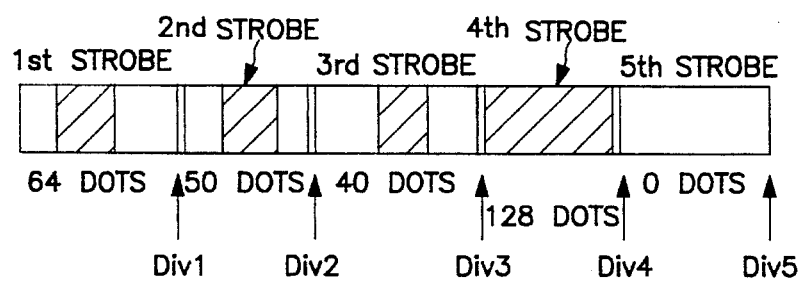

FIG. 32(b) shows a distribution of the driving data of thermal-head, and shows that 64 driven dots are in the first strobe, 50 dots in the second strobe, 40 dots in the third strobe, 128 dots in the fourth strobe, and none of the dots are driven in the fifth strobe. Furthermore, as for the number of maximum simultaneously drivable dots (MAXDOT) 352 shown in FIG. 30, 2 strobes, that is, 128 dots are allocated here.

Figure 32C:
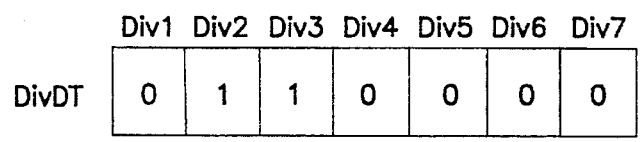
Figure 32D:
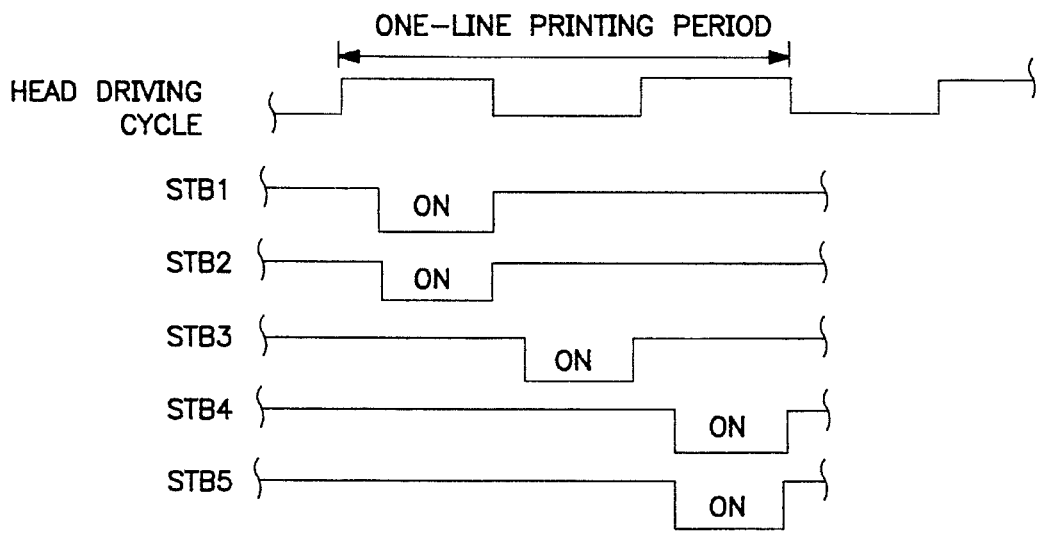

FIG. 32(c) shows the content of the divisional information data DIVDT 350b in the case shown in FIG. 32(b), and this means that the information data are divided into strobes in which data "1" is set at each bit within DIV-1–DIV-7. That means that, in the case shown in FIG. 32(b), a division between the second and the third strobes, and a division between the third and the fourth strobes. Based on this divisional information data, as shown in FIG. 32(d), three-divisional driving wherein five strobes are divided into three groups can be obtained by dividing STB1–STB5 according to the head driving cycle.

The above clearly shows a divisional driving to make the number of simultaneously driven dots is less than the value set by MAXDOR 352, conducted for every printing line.

FIG. 33 is to explain the transition of the operations of DIVCAL 360 shown in FIG. 30. This shows the transition of the compensation calculation for every strobe and the final contents of DIVDT 359 and UP-CNT 354 in a case of driving-data distribution in FIG. 32(b).

Figure 34A:
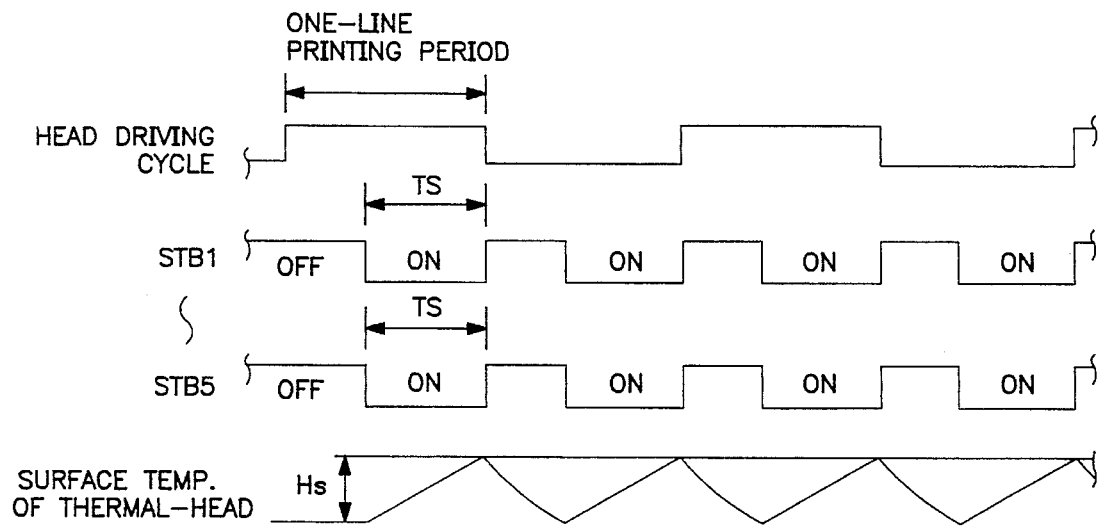
FIGS. 34(a) and 34(b) are schematic diagrams showing compensations of driving pulse duration conducted in the dynamic group-division compensation process.
Figure 34B:
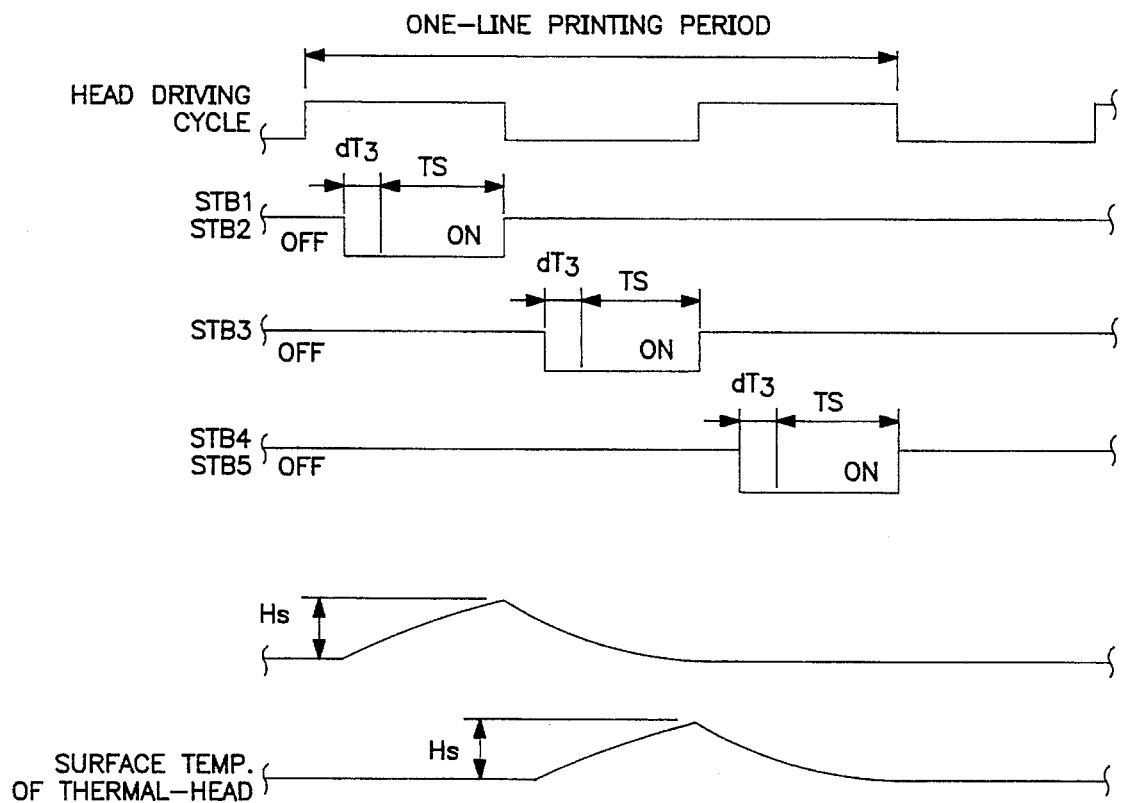

FIGS. 34(a) and 34(b) are to illustrate the compensations of driving pulse durations conducted for non-divisional driving and three-division driving. In a case shown in FIG. 34(a), the driving pulse duration is same as the reference driving pulse duration (Ts). In a case shown in FIG. 34(b), since the value of UP-CNT 354 shown in FIG. 30 is two as shown in FIG. 33, DTSELCT 355 selects the compensation pulse duration dT3 which compensates the three divisional driving from HOSTBL 356, and this is added to the reference driving pulse duration Ts by ADDT 358.

As shown in FIGS. 34(a) and 34(b), since the pulse duration at each strobe for the divisional driving is tend to be longer than that for the non-divisional driving, the effects of heat accumulation is less. Therefore, when the driving pulse duration for none-divisional driving is taken as the reference driving pulse duration, the pulse duration has to be compensated according to the number of strobes. By means of the dynamic divisional compensation of the invention, the driving pulse duration is compensated to its optimum according to the number of divisions.

As above-described, the number of the divisions of thermal-head is made dynamically variable according to the driving data and the compensation of driving pulse duration according to the number of divisions are new possible by providing means to count the number of driven dots in a physical block unit of thermal-head, means to determine the number of simultaneously driven dots in a physical block unit, means to arbitrarily set the maximum number of simultaneously drivable dots, means to divide the physical block of thermal-head into groups in order to make the number of driven dots is less than the maximum number of simultaneously drivable dots, and means to compensate the driving pulse duration according to the number of driving divisions, Thus, high-speed driving is possible by employing a none divisional driving when the number of simultaneously driven dots is relatively small, while the thermal-head power can be saved by increasing the number of divisions when the number of driven dots is large so that a power supply of smaller capacity can be used in addition to the advantage of consistently high print-quality realized by the divisional driving method.

Embodiment-9

A means to compensate the division-rate, constituting a part of the driving-data control means of the invention is now explained below.

Figure 35:
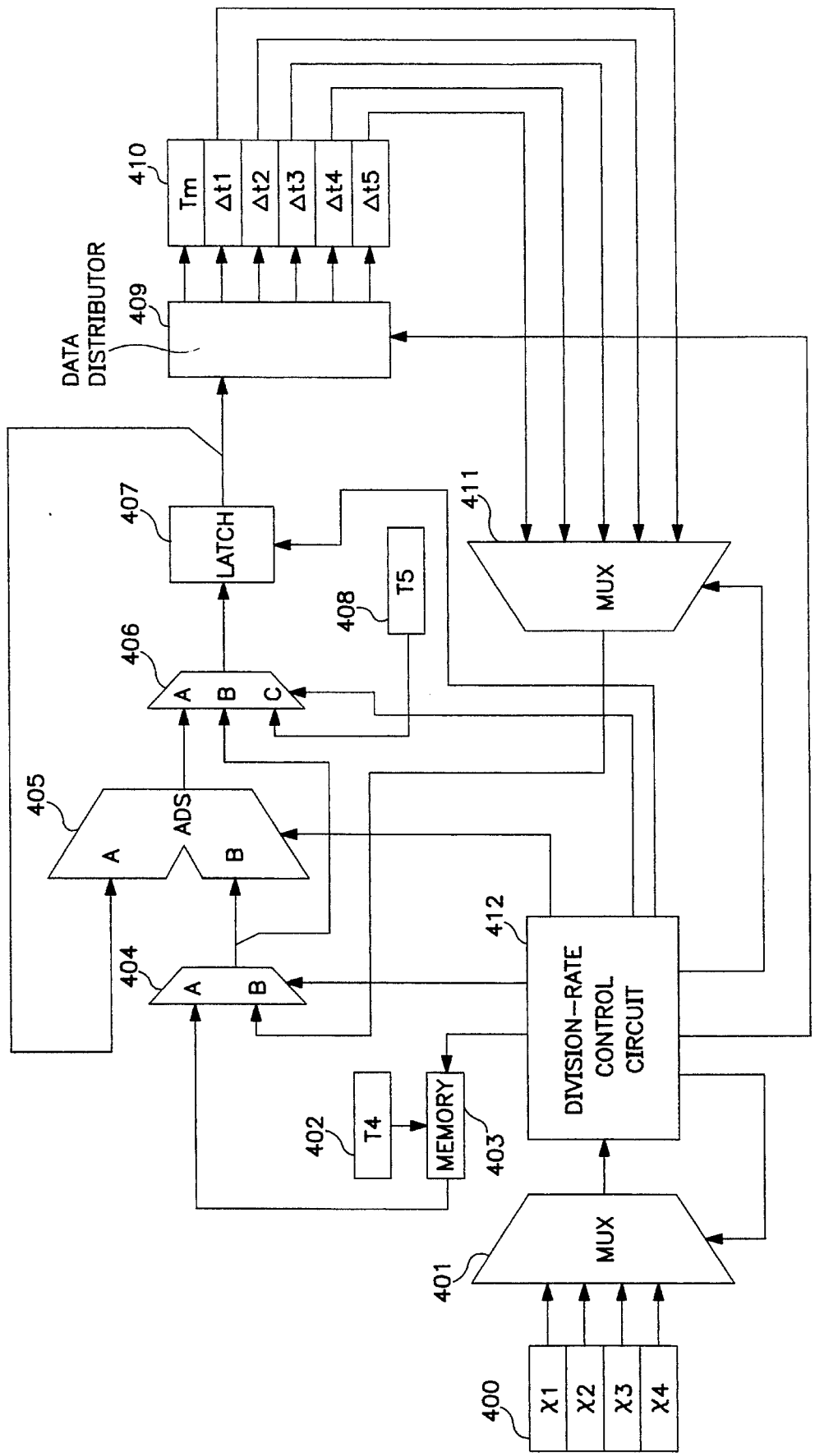
FIG. 35 is a circuit to compensate the divisional rate of an embodiment of the invention.

A construction of the division-rate compensation circuit of the embodiment is shown in FIG. 35 where 400 is a memory to determine the division-rate of driving pulse, 401 is a data selection circuit to select the data inputted from memory 400, 402 is a memory to bit-shift the data stored in memory 402, 404 is a data selection circuit to select the data inputted from memory 403 and the data inputted from later-described data-selection circuit 411, and 405 is an adder/subtracter by which an adding operation (A+B) or a subtracting operation (A–B) between the data A inputted from data selection circuit 404 and the data-B inputted from the later-shown data holding circuit 407 are conducted.

406 is a data selection circuit to select either the data inputted from adder/subtracter 405, data stored in the later-described memory 408, and data inputted from data selection circuit 404, 407 is a data holding circuit to hold the data outputted from data selection circuit 406, 408 is a memory to set one printing period T5, 409 is a data distribution circuit to distribute the data outputted from data holding circuit 407 to the later-shown memory 410, 410 is a memory to store the driving pulse duration compensated by division-rate, 411 is a data selection circuit to select the data outputted from memory 410, and 412 is a division-rate control circuit to control data selection circuits 401, 404, 406, and 411, adder/subtracter 405, data holding circuit 407, memory 403, and data-distribution circuit 409.

Figure 36A:
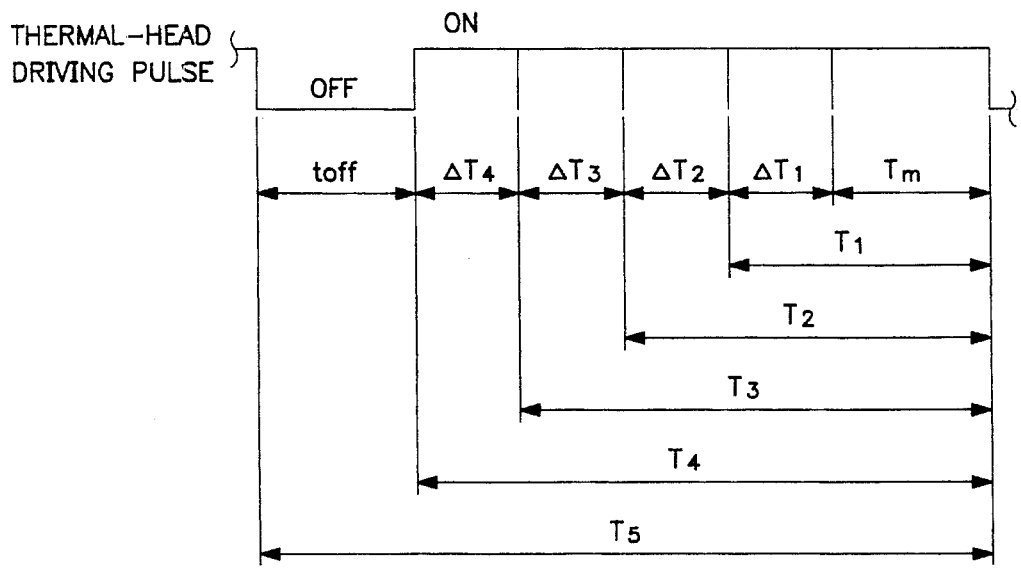
FIGS. 36(a)–36(c) are models of the thermal-head driving pulse.
Figures 36B, 36C:
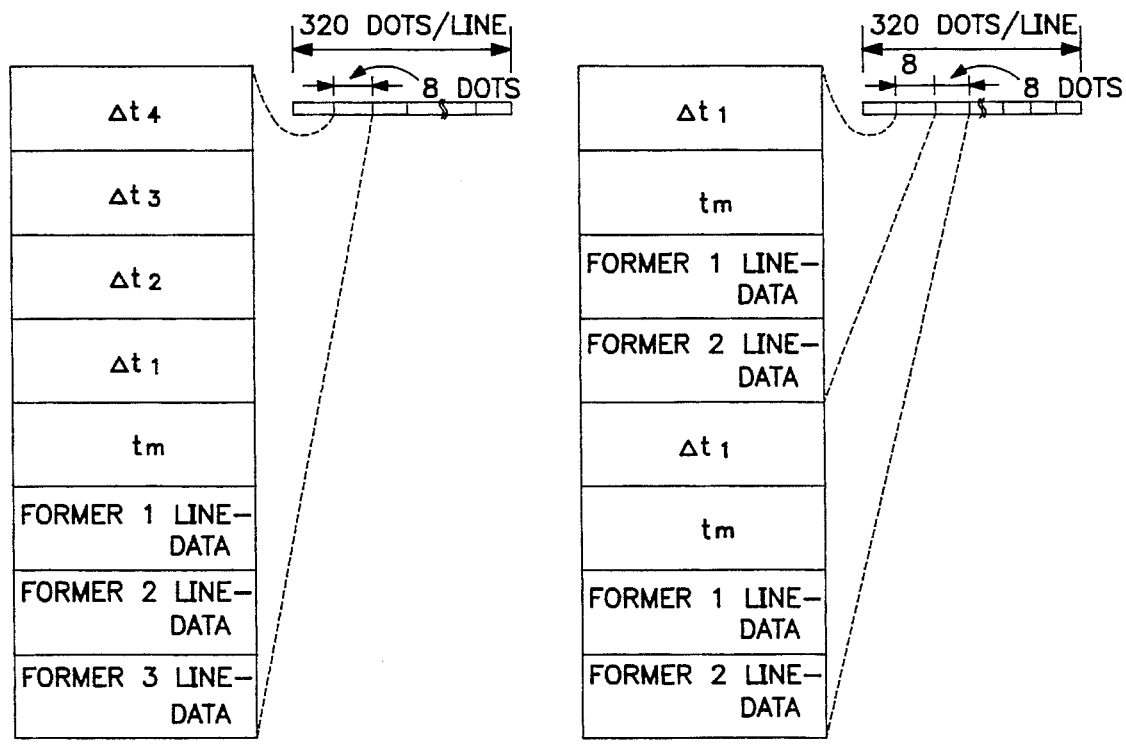

The operation of the above-constructed division-rate compensation circuit is explained in the following by referring FIG. 35 showing a circuit construction, FIGS. 36(a)–36(c) showing the content of the memory storing driving pulse duration compensated by division-rate, and a model of driving pulse, FIG. 37 which is a bit-shift correspondence table, and FIG. 38 showing a division-rate correspondence table. In this embodiment of the invention, the division-rate is set by using 4 bits, and the thermal-head driving pulse is divided into five.

The operation is began with a transfer of one printing period T5 stored in memory 408 to the input-A of adder/subtracter 405 through data selection circuit 406 and data holding circuit 407. The total driving duration T4 of thermal-head stored in memory 402 is transferred to the input-B of adder/sub-tractor 405 through memory 403 and data selection circuit 404 in order to conduct an operation of (A−B) there, and the result of this is then transferred to the t-off part of memory 410 through data-selection circuit 406, data-holding circuit 407, and data-distribution circuit 409. Thus the time value of t-off equals to T5−T4 (see FIG. 36(a)).

In the second step, the data X4 stored in memory 400 is selected by means of data selection circuit 401, and the bit-shift of data is conducted according to the bit-shift corresponding table shown in FIG. 37. As an example, a case where the all of the bits of data X-4 take "1" is explained below.

The data T-4 stored in memory 400 is transferred to memory 403 and this is bit-shifted by five bits toward right, and this bit-shifted data are transferred to the input-A of adder/subtracter 405 through data-selection circuits 404 and 406 and data-holding circuit 407.

Then, data bit-shifted toward right by four bits is produced in memory 403, and this is transferred to the input-B of adder/subtracter 405 through data selection circuits 404 in order conduct an adding process of (A+B) there. The result of this is then transferred to the input-A of adder/subtracter 405 through data-selection circuit 406 and data-holding circuit 407.

Then, data bit-shifted toward right by three bits is produced in memory 403, and this is transferred to the input-B of adder/subtracter 405 through data-selection circuits 404 in order conduct an adding process of (A+B) there. The result of this is then transferred to the input-A of adder/subtracter 405 through data-selection circuit 406 and data-holding circuit 407.

Then, data bit-shifted toward right by two bits is produced in memory 403, and this is transferred to the input-B of adder/subtracter 405 through data-selection circuits 404 in order conduct an adding process of (A+B) there. The result of this is then transferred to Δt4 part of memory 410 through data-selection circuit 406 data-holding circuit 407, and data-distribution circuit 409.

In the third step, as for the data X3–X1 stored in memory 400, the data processing same as the one conducted in above is performed, and the results of this are transferred to Δt3, Δt2, and Δt1 parts of memory 410 respectively. In this case the driving pulse durations are transferred according to the division-rate correspondence table shown in FIG. 38.

At the final step, the main driving pulse duration Tm has to be derived. The data T5 stored in memory 408 is transferred to the input-A of adder/subtracter 405 through data-selection circuit 406 and data-holding circuit 407. Then, the data t-off stored in memory 410 is selected by means of data-selection circuit 411, and this is transferred to the input-B of adder/subtracter 405 through data-selection circuit 404 in order to conduct a subtraction of (A−B) there. The result of this operation is then transferred to the input-A of adder/subtracter 405 through data-selection circuit 406 and data-holding circuit 407.

The data t4 stored in memory 410 is then selected and transferred to the input-B of adder/subtracter 405 through data-selection circuit 404 in order conduct a subtraction there. The result of this operation is transferred again to the input-A of adder/subtracter 405. This operation is repeatedly applied to-data t-off-Δt1, and the results of this are transferred to the Tm part of memory 410 through data-distribution circuit 409. At this point, the division-rate compensation is completed and the durations of the thermal-head driving pulse model is determined as shown in FIG. 36(a), and this is stored in memory 410 as shown in FIG. 36(b).

In this embodiment of the invention, a case where the setting of the division rate is 4 bits, and the driving pulse duration divided into five is explained, but the division of thermal-head driving pulse need not be five.

A control based on the thermal history of thermal-head is usually conducted in thermal-printer in order to improve the printing quality. A typical means of such is to divide the driving pulse into several pulses, and to control the duration of the divided pulses according to the thermal history.

In the conventional method, the setting of the divided pulse is performed by preparing a table in which the divided pulse proper for every operating temperature are memorized or by computing the proper divided pulse by using an adder/subtracter. The former, if employed, requires a memory of substantial capacity, and the latter requires a circuit of large scale so that the increase of costs is inevitable in both cases.

The divisional-pulse compensation circuit of the invention is a very simple circuit which can be realized by incorporating a memory having a data capacity of several bytes. The computation of division-rate of driving pulse duration can be performed by this simple and low-cost circuit. Furthermore, by combining this method with the head history compensating control, the print-quality can be further improved.

As before-described, FIG. 36(a) shows a model of typical thermal-head driving pulse which consists of main driving pulse Tm and other compensation pulses such as Δt1. In order to control these pulses, data for all of the heating elements are stored in the controller.

For instance, if the line thermal-head is comprised of 320 heating-elements or dots, 320 main driving pulse data (in this case, Tm corresponds to the main driving pulse), 320 Δt1 compensation pulse data, and other compensation pulse data, in addition to the previous line data to conduct the control according to the past printing-data, are stored in the controller as shown in FIG. 36(b).

The minimum compensation time is determined by the product of data-transfer speed times the number of data. Thus, if data for 320 dots are transferred at a speed of 4 MHz, the minimum compensation time is (¼ MHz)×320=80 micro-seconds. If data for 640 dots are transferred at the same speed, it is 160 micro-seconds. Since fine compensation can not be performed at a speed of 160 micro-seconds, so that a reduction of printing speed is substantially necessary in this case.

When the printing speed is reduced, finer compensation is no longer necessary so that the memory for the compensation data is not required. Therefore, the printing is possible by providing only a memory for 320 main driving pulse, 320 compensating data memory, and a past line-data memory, instead of providing 640 main driving-pulse data memory.

This means that printing by a thermal-head with a large number of heating elements can be controlled by providing only a memory for the main driving pulse, memory for compensating data, and a memory for the past line-data by switching the regions in these memories.

In this case, a part of the compensating data memory and the past driving-data memory is momentarily converted into the main driving pulse memory, the compensating data memory, or the past driving-data memory in order to control the driving pulse, and by this fine printing data compensation can be attained without sacrificing the printing speed.

For an instance, as shown by the difference between FIGS. 36(b) and 36(c), the part not requiring fine compensation any more can be utilized as a part of memory for the main driving pulse.

Embodiment-10

A part of the printer motor control means of the invention is now explained in the following. FIG. 39 shows a construction of the controller, wherein 451 is a counter of which counting is settable. This counter outputs a carry or a borrow from the output 461 whenever count-up or count-down is conducted, and the timing of this is utilized as the normal motor switching timing.

The chopping mode driving is then explained next. 455 is a register to set the driving mode, and the number of chopping are stored as an information. According to this chopping number information, the chopping count number is stored in register 452.

For instance, when an information telling that the number of chopping is four is stored in the driving mode setting register 455, the count stored in counter 451 is bit-shifted, and a quarter of its value is set to the motor switching timing.

This value is set at the comparing value side of comparator 453 by means of chopping control block 454. When the count at the counter 451 comes up to the comparison value of comparator 453, a timing signal to switch the motor which is in a chopping condition is outputted from comparator 453.

Since the timing signal to ON/OFF switching of chopping state is fed-back to chopping control block 454, a succeeding timing signal to ON/OFF switching is set again in the comparison side of comparator 453.

For example, when a normal motor switching timing is set at a binary code of (1000), and the chopping count is set at (100), the first comparison value to comparator 453 would be (10) after a normal driving state is ended, and the counter reading becomes (10) so that the motor is turned OFF until the next output is outputted from comparator 453.

After an ON/OFF switch timing signal is inputted in chopping control block 454, the second comparison value is set at (10+10). By this setting the count becomes (10+10), so that the motor is turned ON until an output is outputted from comparator 453.

Figure 40:
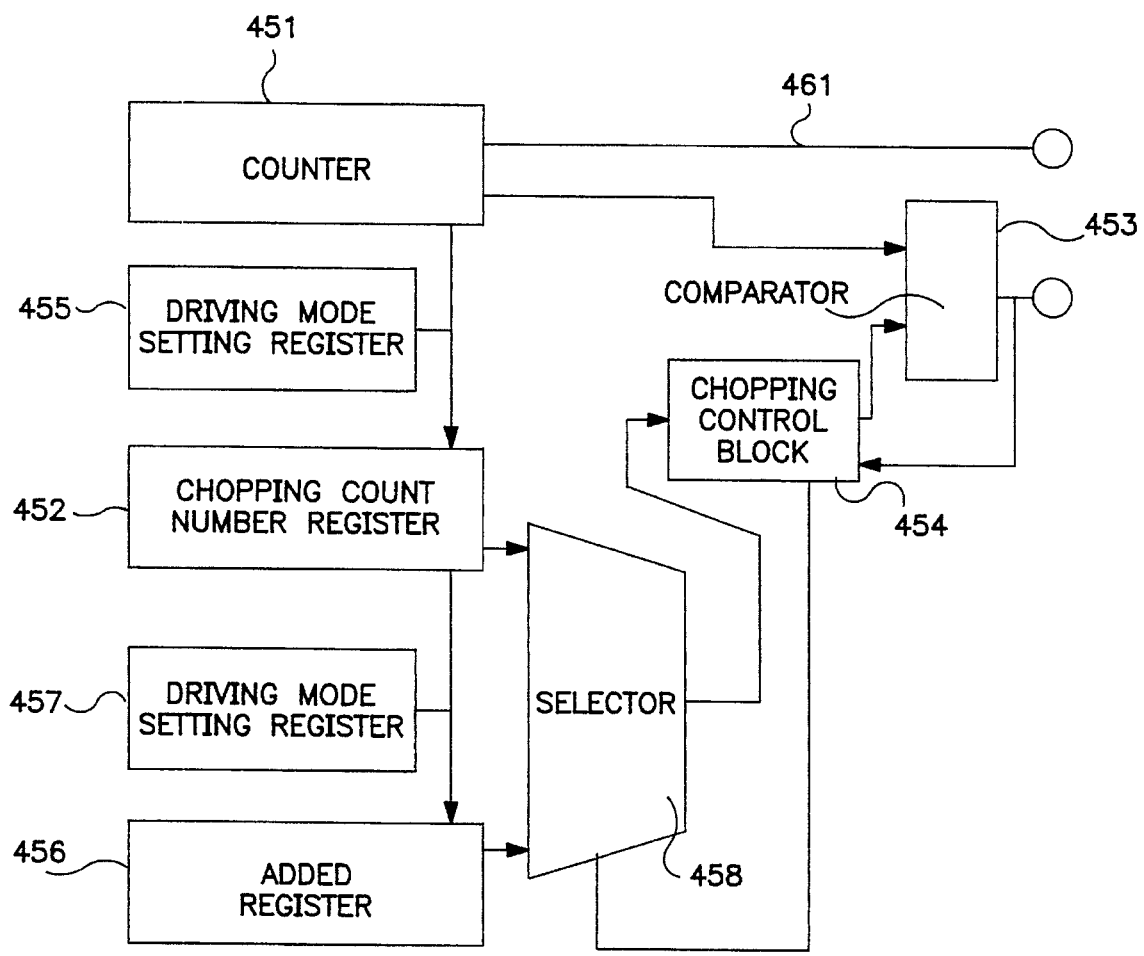
FIG. 40 is a printer-motor driving circuit of another embodiment of the invention.

Furthermore, by adding a register 456 as shown in FIG. 40, the ON/OFF ratio can be set at an arbitrary value. Like the case shown in FIG. 39, the ON or OFF time of the chopping count is set and this is stored in added register 456.

The chopping control block 454 selects either register 452 or 456, and this is set at the comparison value side of comparator 453. In addition to the above, 457 is a driving mode setting register, and 458 is a selector.

Thus a circuit using only one counter of a large circuit scale can be realized. So far, a case where a register is used to make the motor switching time variable has been explained, however, a fixed register can also be used here.

Embodiment-11

A thermal-head driving pulse duration processor constituting a part of the printer driving data control means of the invention is now explained below by referring the attached drawings.

Figure 41:
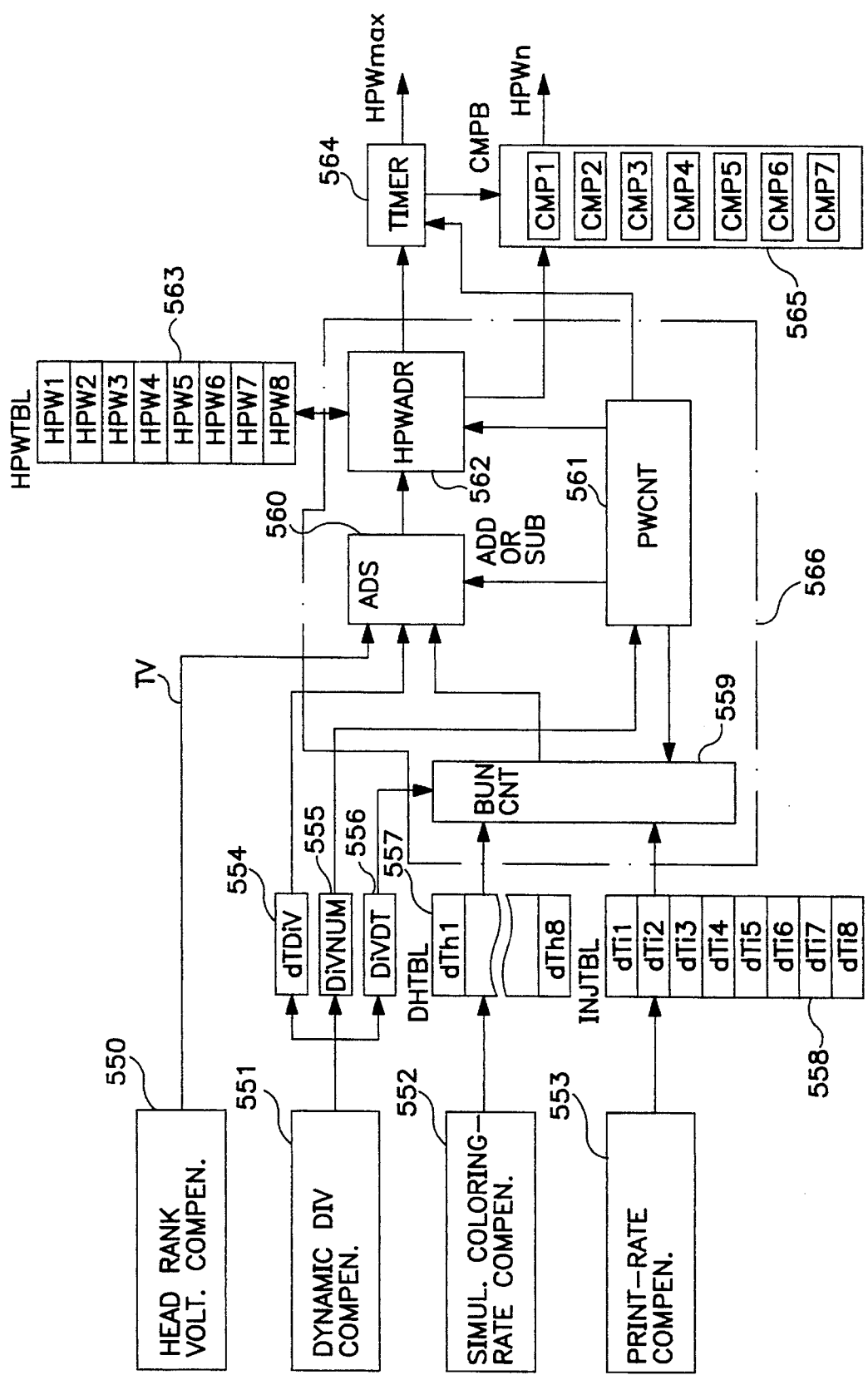
FIG. 41 is a block diagram showing the fundamental construction of the driving pulse duration processing circuit of an embodiment of the invention.

FIG. 41 is a block diagram showing a fundamental construction of the thermal-head driving pulse duration processor which is shown in claims 14 and 15. In FIG. 41, 560 is a head-rank voltage compensator to determine the driving pulse duration proper to the head-resistance rank and printer voltage.

551 is a dynamic division compensator by which a dynamic division compensation process is carried out. 552 is a simultaneous coloring rate compensator to carry out a simultaneous coloring rate compensation, 554 is a division drive compensating pulse duration (dTDIV) derived by dynamic division compensation process.

555 is a divisional driving number data (DIVNUM) derived by the dynamic divisional compensation process 556 is a divisional information data (DIVDT) derived by the dynamic divisional compensation process, 557 is a simultaneous coloring-rate compensating duration table (DHTBL) derived by the simultaneous coloring compensation, and 558 is a printing-rate compensating duration table (INJTBL) derived by the printing-rate compensation process.

Since before-mentioned head-rank and voltage compensator 550 can be realized according to Embodiment-4, before-mentioned dynamic divisional compensator 551 can be realized by Embodiment-8, and before-mentioned simultaneous coloring compensator 552 can be realized according to Embodiment-6.

Furthermore, since said printing-rate compensator 553 can be realized according to Embodiment-7, and since Embodiments 4, 6, 7, and 8 proved that before-mentioned 554 to 558 are derivable by operating before-mentioned 550 to 553, the explanations to those shown-above are omitted here.

559 is a division controller (BUNCNT) to add the simultaneous coloring rate compensating values, dThn, in a simultaneously driven group, and to derive the minimum printing rate compensating duration, dTin, within the simultaneously driven group. 560 is adder/subtracter, 561 is a pulse-duration process controller which determines the order of the driving pulse-duration calculation process, 563 is a driving-pulse duration table (HPWTBL) for each of the physical blocks (strobe) of thermal-head, 562 is a pulse duration address controller (HPWADR) to store data in HPWTBL 563 and to determine the loading address for the data from HPWTBL 563.

564 is a timer counter which sets a head-driving pulse duration, and puts out a head-drive permission signal during down-counting the set pulse-duration, and puts out a head drive prohibiting signal when the count became zero. 565 is a comparator (CMPB) comprised of comparators (CMP1 to 7) which compare the count of timer-counter 564 and the set values, and puts out a head-drive prohibiting signal when these values make a coincidence with the set values. 566 is a pulse duration calculating circuit comprised of said BUNCNT 559 to HPWADR 562.

The driving-pulse-duration calculating process conducted in the head-driving-data control process of the invention is to apply compensation processes determined by considering both the internal and external factors to the head-driving pulse duration.

Thus, the proper compensations derived by dynamic divisional compensation, simultaneous coloring-rate compensation, printing-rate compensation, and other compensations are added to the driving pulse duration determined by considering both the environmental and physical conditions such as the temperature, head resistance rank, printer voltage.

When plural driving pulse durations of different values have to be simultaneously counted for every strobe, for instance, when divisional driving up to eighth has to be employed, a timer counter has to be provided for each strobe, that is, eight timer counters have to be conventionally provided.

However, the driving pulse duration calculation process of the present invention can be realized by using only one timer counter (timer counter 564) and seven comparators (comparator 565), realizing a substantially simplified circuit construction.

As shown in FIG. 41, by operating head-rank and voltage compensator 550, the proper driving pulse duration Tv compensated against various external factors can be derived. Then, dT-DIV 554 obtained by dynamic divisional compensator 551 and driving group sums of dT-h1 to dT-h8 obtained by simultaneous coloring-rate compensator 552 are added to Tv, and dT-i1 to dT-i8 obtained by printing rate compensator 553 has to be subtracted from Tv for each strobe.

Since the timer counter is commonly used in this case, the result of printing-rate compensator operation has to be further corrected by the subtraction parameters. The subtraction parameter for Tv is derived by determining the strobe having a minimum printing-rate compensation value among the simultaneously driven strobes first, and only this is used as the subtraction parameter, and as for the other parameters, differences in compensation values from the minimum printing-rate compensation value determined for other strobes are used.

Figure 42:
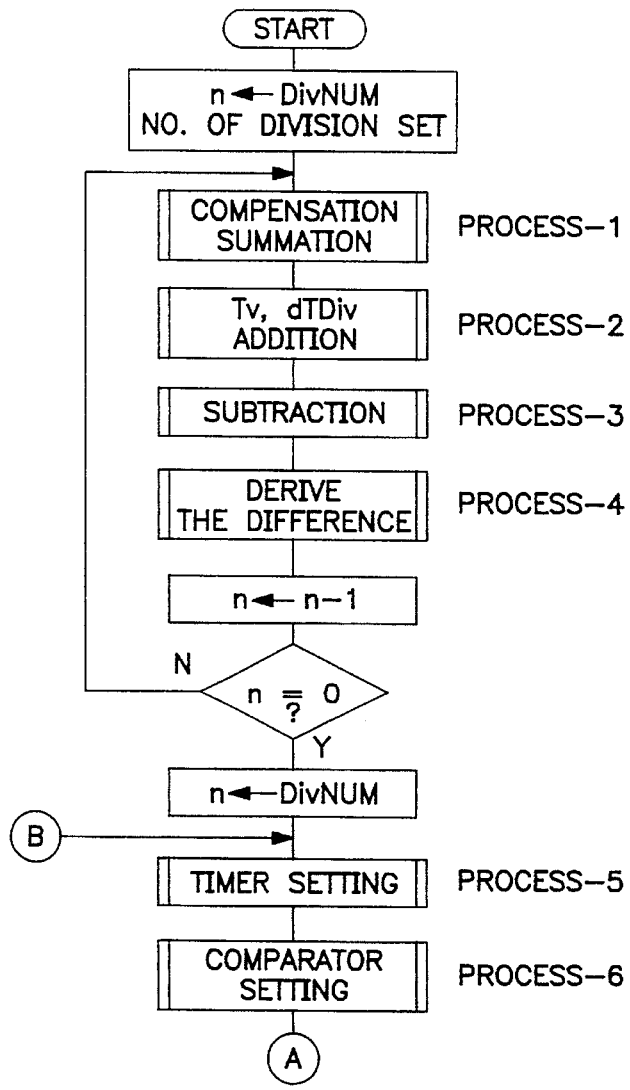
FIG. 42 is a flow-chart showing the pulse duration processing procedures.
Figure 43:
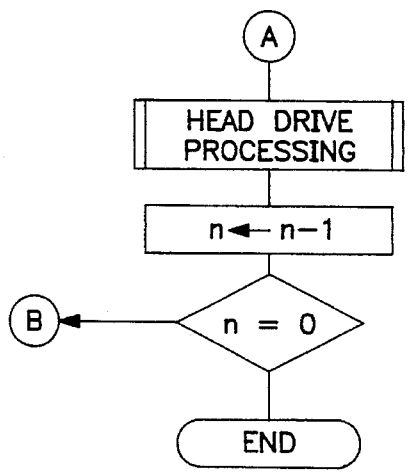
FIG. 43 is a flow-chart showing the pulse duration processing procedures.

The process-flow of the driving-pulse duration calculation is now explained below by referring FIGS. 42 and 43 which are flow-chart thereof.

The simultaneous coloring-rate compensation values of the simultaneously driven group are added first according to the content of divisional information data DIVDT 555 (Process-1).

Then, the strobe having a minimum printing-rate compensation value among the simultaneously driven strobes is determined, and Tv and dT-DIV are added only for the strobe (Process-2).

Then, the subtraction of the printing-rate compensation duration is performed only for the strobe having the minimum printing-rate (Process-3).

For the other strobes in the simultaneously driven group strobes, the differences between the printing-rate compensation duration and the printing-rate compensation duration for the strobe having the minimum printing-rate are determined (Process-4), and Process-1 to Process-4 are repeated for the number of divisions.

By the above-shown processes, HPWTBL 563 shown in FIG. 41 according to the contents of each strobe can be prepared. After the preparation of HPWTBL 563, the head driving processes such as the driving-data transfer to the head and the printing conducted under the head driving permission signal, are performed by setting the driving pulse duration of the strobe having the minimum printing-rate among the simultaneously driven groups derived by Process-3, that is, the maximum driving pulse duration, into timer-counter 564 (Process-5).

In addition to the above, the contents of HPWTBL 563 of the other strobes within the simultaneously driven groups are set in CMPB 565 (Process-6). Thereafter, Process-5 to Process-6 are repeated for the number of divisions.

Figure 44:
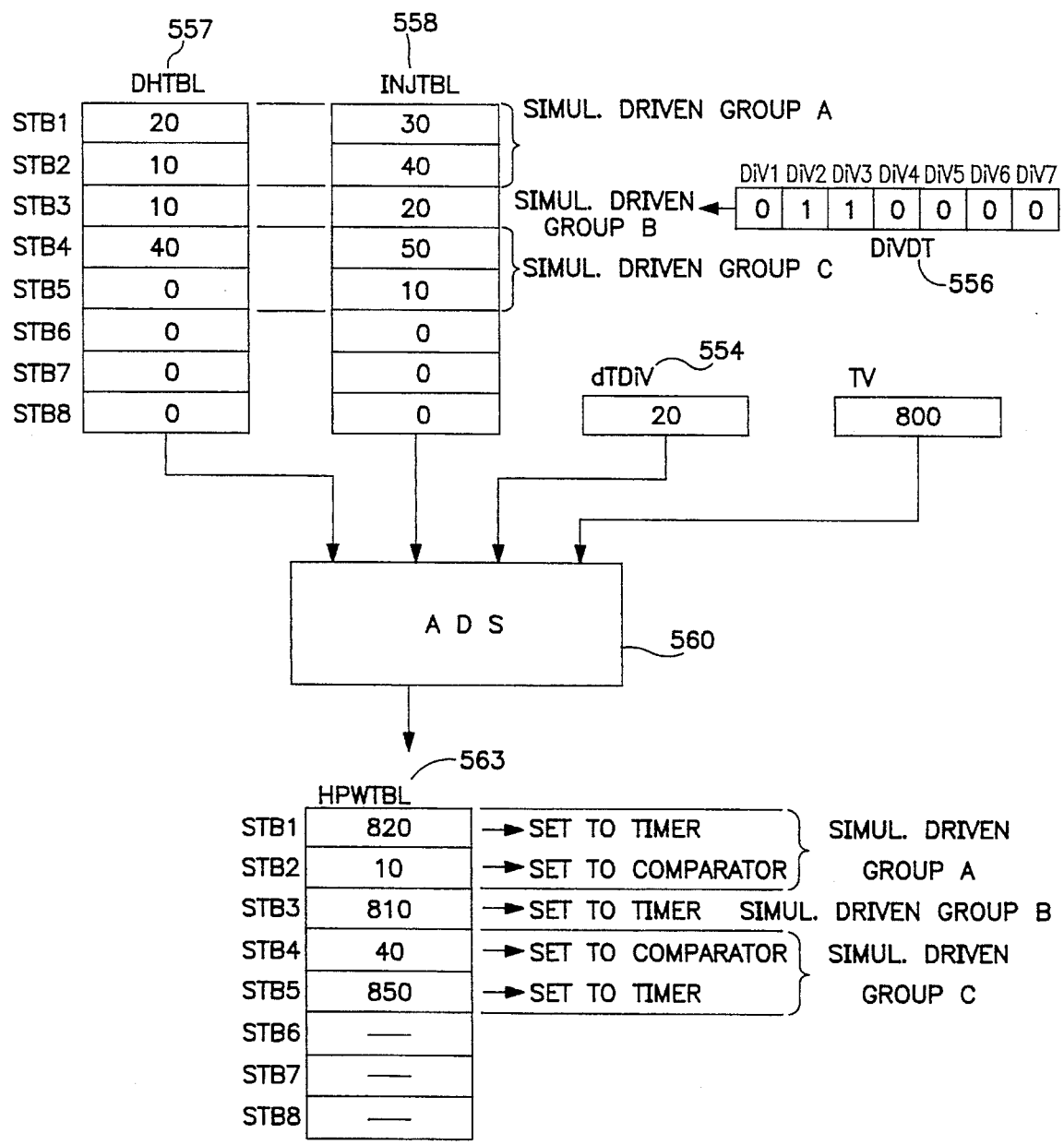
FIG. 44 is a schematic diagram showing a concrete operation of the driving pulse duration processing.

Now, a more concrete example of the thermal-head shown in FIG. 32, print pattern, and the result of dynamic divisional process, is considered here. As shown in FIG. 44, DHTBL 557, INJTBL 558, DIVDT 556, and dT-DIV 554 are prepared, and the value of the driving pulse duration Tv is set at 800 in this case. When the head-driving process is performed according to HPWTBL 563 prepared by the pulse duration calculator 566, the driving permission signal transmitted to each strobe, shown in FIG. 45 can be obtained so that the duration for each strobe is optimized according to various operating conditions.

Figure 45:
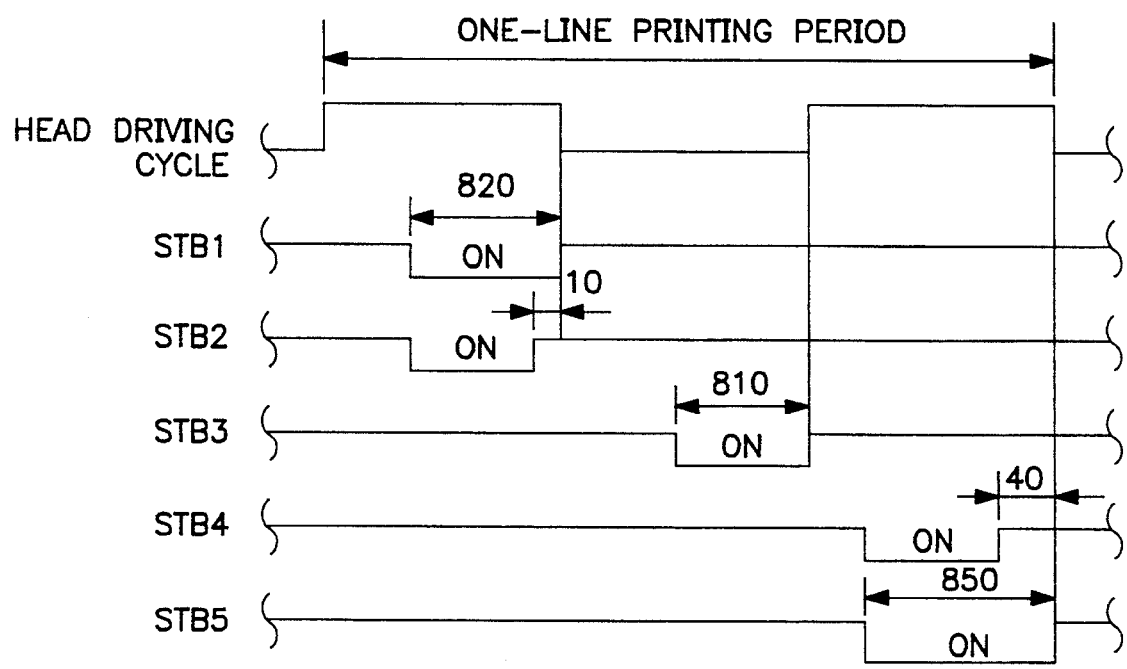
FIG. 45 is a schematic diagram showing a pertinent head driving for every strobe, attained by the driving pulse duration processing.

Moreover, in FIG. 45, the driving permission time of STB1 is counted by timer-counter 564 which is a down-counter, and the driving permission time of STB2 is turned into the driving permission state at the starting of timer-counter 564, and STB2 becomes a driving prohibiting condition at the point where the count of timer-counter 564 coincided with the count of comparator (CMPB 56). This means that the driving permission time of STB2 is shorter by the time set in the comparator of STB2.

Likewise, because of the time set in the timer counter of STB5, STB4 is shorter by the time set in the comparator of STB4 within the other simultaneously driven groups.

As above-explained, the printer controller of the present invention is equipped with a timer-counter (timer-counter 564) to count the driving pulse duration, and a comparator (CMPB 565) to compare the driving pulse durations.

Thus, the driving pulse duration determined according to the internal factors such as the temperature, head resistance rank, printer voltage, etc., is additionally compensated by various external factors such as the dynamic divisional compensation, simultaneous coloring-rate compensation, and printing-rate compensation. Thus, the printer driving pulse duration is properly compensated for the changes of the environmental and operational conditions, and the high-print quality can be secured always.

In order to supply different driving pulse duration to each of the strobe, in this case eight strobes, only one timer-counter and seven comparators are provided, and the circuit of this construction is capable to perform the operation attainable by a conventional circuit provided with eight timer-counters, so that the circuit can be simplified and the device cost can be substantially reduced.

Embodiment-12

The operation of the driving-data control means and motor control means of the present invention is now explained in the following.

Figure 46:
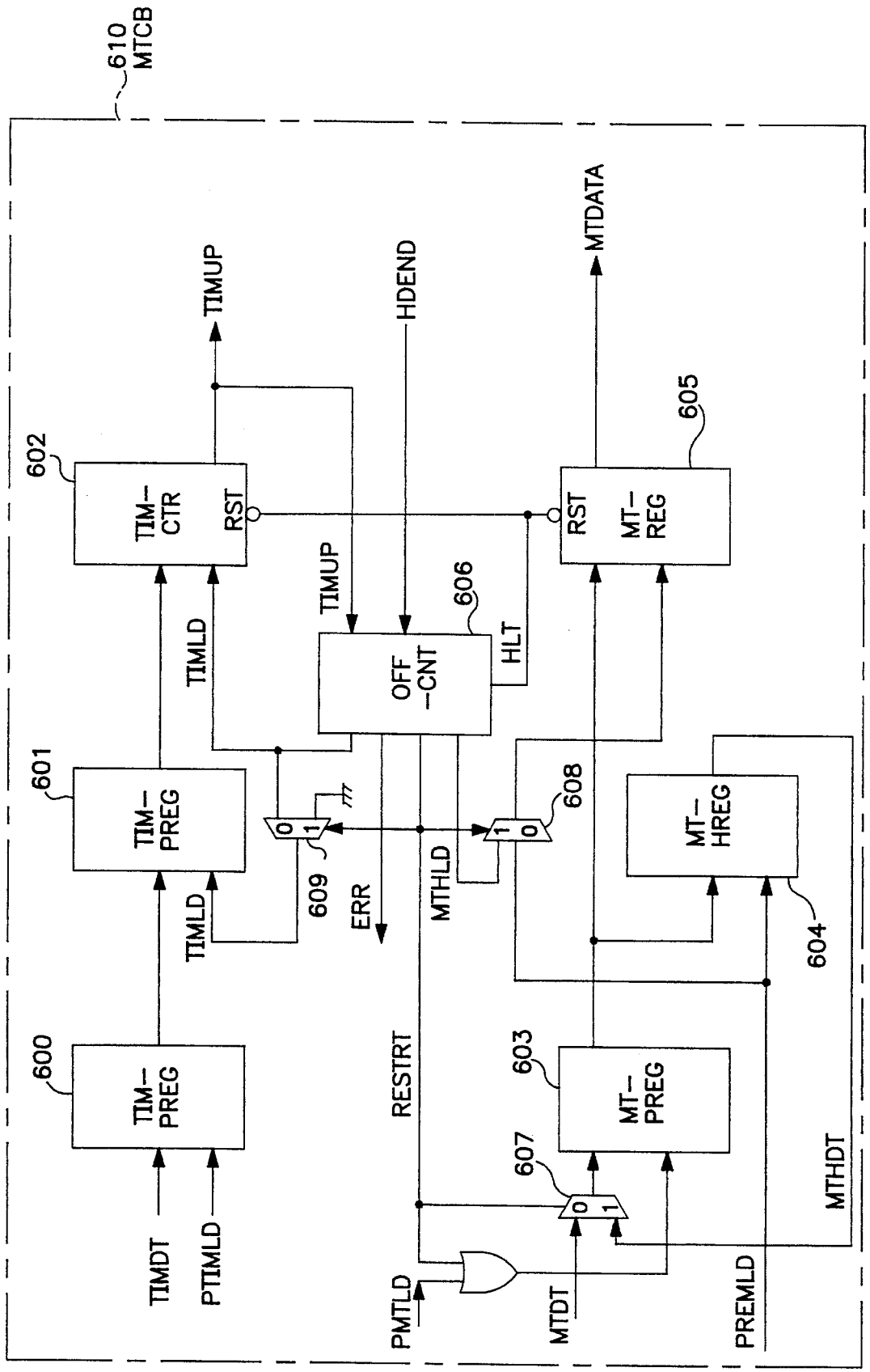
FIG. 46 is a block diagram showing a fundamental motor controller circuit developed to control the motor in synchronous with the head driving pulse duration processing.

FIG. 46 is a block diagram showing the synchronous process between the motor-drive control and the head driving-data control. In FIG. 46, 610 is a motor control circuit (MTCB) to control the motor in synchronous with the head driving process, 600 to 608 are main constituting elements of MTCB 610.

600 is a register (TIM-PREG) to pre-latch the timer counts of motor driving period (hereinafter this is abbreviated as timer counts), 601 is a register (TIM-REG) to hold the current timer counts, 602 is a timer-counter (TIM-CTR) to count the timer counts, 603 is a register (MT-PREG) to pre-latch the motor driving data (hereinafter this is abbreviated as motor-data), 604 is a register (MT-GREG) to hold the current motor-data, 605 is a register (MT-REG) to output motor-data to the motor, and 606 is a cut-off controller (OFF-CNT) OFF-CNT 606 initiates a standby condition by signaling TIM-CTR 602 and MT-REG 605 and cuts off the motor, and keeps its standby condition until the driving process is ended.

607 is a selector to switch the succeeding motor-data MTDT and the current motor-data MTHDT according to the control signal RESTRT transmitted from OFF-CNT 606, 608 is a selector to switch the load signal of motor-data MTHDT according to the control-signal RESTRT transmitted from OFF-CNT 606, 609 is a selector to select the transmission of control signal TIMLD received from OFF-CNT 606 to both TIM-REG 601 and TIM-CTR 602 or only to TIM-CTR 602.

The above-mentioned MTCB 610 is to conduct the motor-drive control in synchronous with the thermal-head driving-data control process. By employing this motor drive control, processes such as shown next is possible. For instance, when the head driving-data control process is not completed within the current motor driving period because of the delay transferring the driving data from the host system, the motor driving is cut-off and the motor is set at a standby condition, and restarts the motor after the completion of the motor drive-data process is informed.

This control is most effective when this is applied to stepping motors since the stepping motor can be stopped and fixed at the cut-off position and no power is consumed in there. At the restarting of the stopped motor, the motor-data and the timer counts supplied right before the motor cut-off are given to the motor first, and the motor is restarted by supplying the next motor-data and timer counts.

Figure 47:
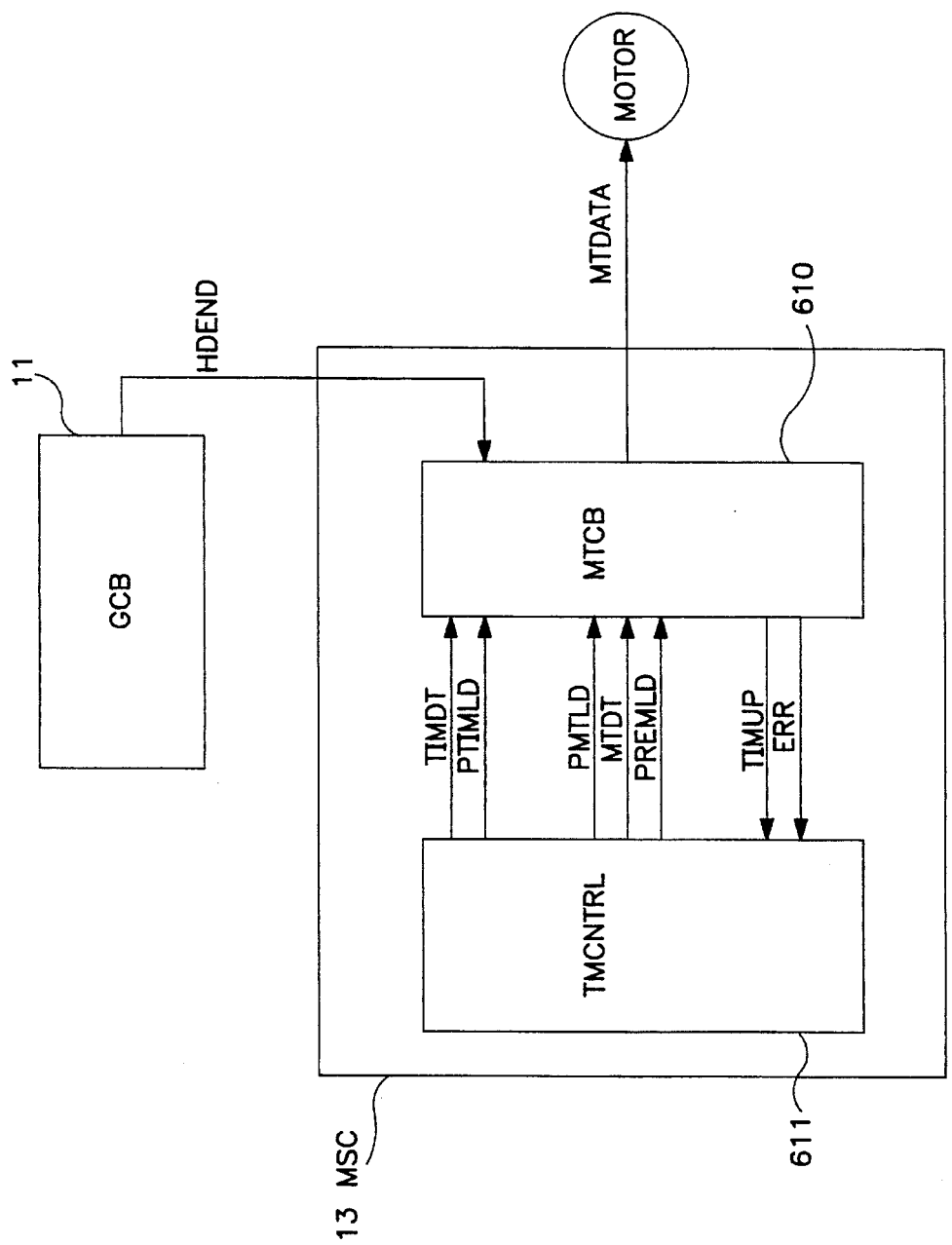
FIG. 47 is a schematic diagram showing the relationship between the input and the output signal of the motor controller circuit.

The fundamental operation of MTCB 610 is now explained next by referring FIGS. 47, 48, and 49. FIG. 47 is to show the relationship between the input/output data and the signal lines of MTCB 61, 11 is an overall controller (GCB) which controls the order of entire operations of the controllers explained in Embodiment-1, 13 is a motor and sensor controller (MSC) which outputs the motor-data and switch timing, signal, and conducts the input/output processes of motor and sensors. 611 is a main constituting element of MSC 13, and is a timer controller (TM-CNTRL) to control the timer operation.

In FIG. 47, MTCB 610 receive various data and load signals shown next from TMCNTRL 611 i.e., the timer-counts data TIMDT to be set in TIM-CTR 602 which counts the motor driving period and the load signal PTIMLD to set the timer-counts data TIMDT in TIM-PREG 600, and the motor data MTDT and the load signal PMTLD to be set in MT-PRG 603 in order to pre-latch the motor-data MTDT, and the load signal PREMLD to set the data pre-latched in MT-PREG 603 into MT-HREG 604 holding the current motor-data and in MT-REG 605 which outputs motor-data to the motor.

Moreover, the load signal PREMLD is inputted in synchronous to the timing to switch the motor driving period, that is, in synchronous to the time-up of TIM-CTR 602 which counts the timer counts.

Furthermore, MTCB 610 outputs the time-up informing signal TIMUP of TIM-CTR 602 which counts the timer counts of motor driving period, and an error signal ERR informing that the motor is stopped and is in a standby condition when the head driving data control processing is not completed within the motor driving period. In addition to the above, when the head driving data control process is completed, a signal to inform the process completion HDEND is inputted from GCB 11 to MTCB 610.

By using the timing chart shown in FIG. 48, the detailed operation of MTCB 610 is illustrated below.

Figure 48:
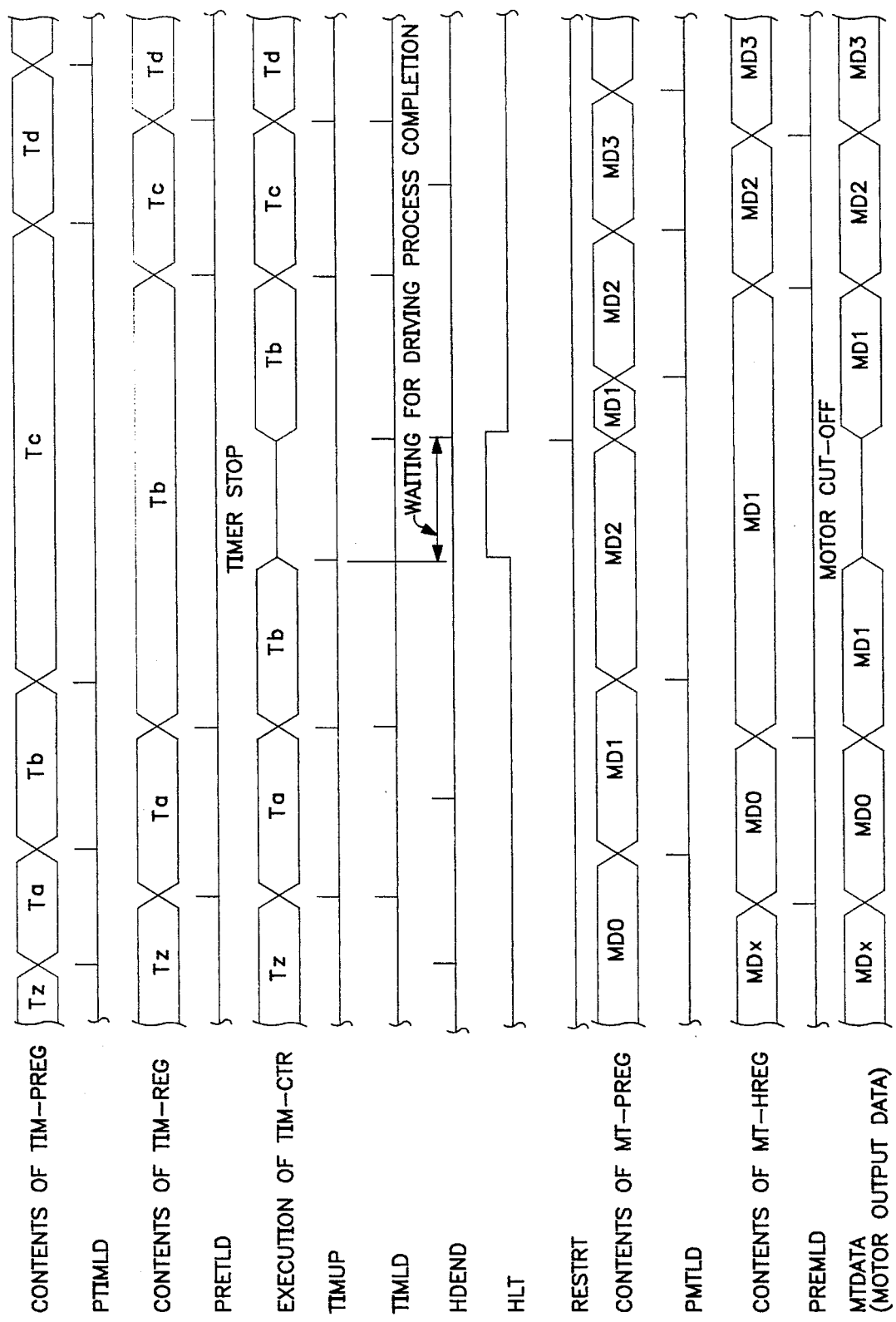
FIG. 48 is a timing-chart illustrating the operation of the motor driving circuit.

In FIG. 48 the timer-counts data TIMDT is loaded (pre-latched) into TIM-PREG 600 by the PTIMLD signal, and the motor-data MTDT is loaded (pre-latched) into MT-PREG 600 by the PMTLD signal.

At the time of normal operation, in synchronous with the time-up informing signal TIMUP of TIM-CTR 602, the load signal TIMLD of the timer counts data TIMDT is inputted into both TIM-REG 601 and TIM-CTR 602, and by this, the timer counts data latched in TIM-PREG 600 is loaded, and the motor-load signal PREMLD is inputted into both MT-HREG 604 and MT-REG 605, and by this, the motor data pre-latched in MT-PREG 603 is loaded.

When the signal (HDEND) informing the completion of head driving process is inputted before the time-up of TIM-CTR 602, as above described, the pre-latch data of the timer counts data and the motor-data are inputted during the count of current timer counts. Therefore, the counting of timer counts is started by the data pre-latched at the time of time-up, and the motor is driven by the new mode-data, and these processes are repeated thereafter.

When the signal (HDRND) informing the completion of head driving process is not inputted before the time-up of TIM-CTR 602, the HTL signal outputted from OFF-CNT 606 becomes ON, and TIM-CTR 602 and MT-REG 605 are reset, and the timer operation is stopped, and the motor driving becomes a cut-off state.

Moreover, ERR signal is transmitted to TMCNTRL 611, and the inputs of PTIMLD, PMTLD, and PREMLD are suspended. When a HDEND signal is inputted into OFF-CNT 606 at this condition, HLT is turned OFF, and by the RESTRT signal, the timer stop and motor-cutoff are released. Furthermore, the contents of MT-HREG 604 is loaded into REG 605, so that the timer operation is commenced on the time before the operation stop and the motor driving on the previous motor data is commenced.

Figure 49:
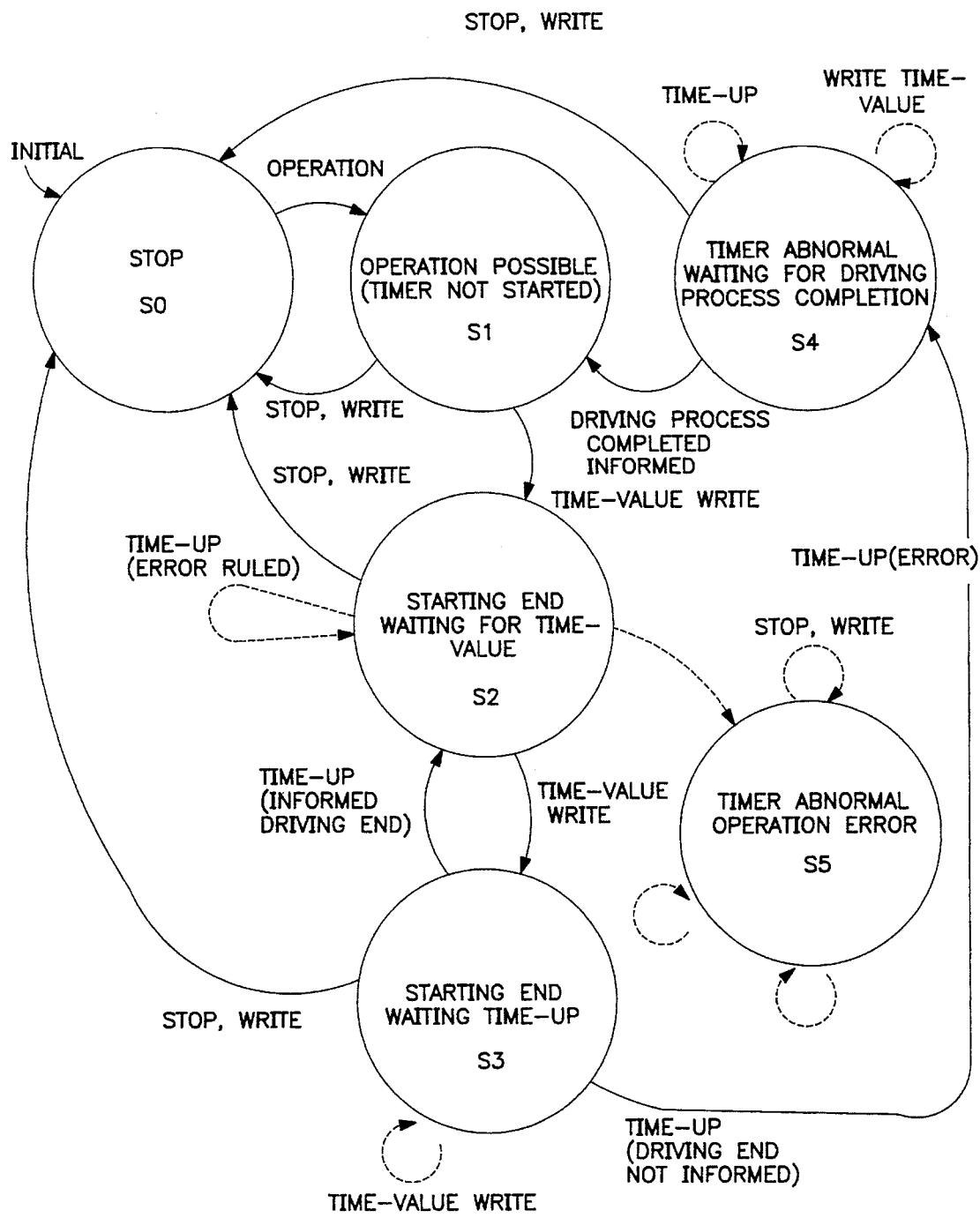
FIG. 49 is a diagram showing the transitions of the timer controller.

FIG. 49 shows a transition diagram explaining the transition takes place in the timer controller (TMCNTRL) which controls the timer operation shown in FIG. 47, wherein S0 represents a condition of stop, S1 is a condition where the timer-counter is operable but the counting operation of timer-counts is not started yet, S2 is a condition where the timer-counts is written and the timer counter is operating, and S3 is a condition where the timer counts is in a pre-latched condition by a timer counts further written after S2, and at this state, the further writing of timer counts is prohibited until the time-up of the currently executing timer counts.

Moreover, S4 is a condition where the timer and the motor driving are stopped and waiting for the signal informing the completion of head-drive process when the driving data control process is not completed within the motor driving period, and S5 is an error condition where the counting operation of timer counts is impossible when the succeeding timer counts is not written in the state of S2.

As above-described, the printer controller of the invention consists of: register TIM-PREG 600 to pre-latch the timer counts of motor driving period, register TIM-REG 601 to hold the current timer counts, a timer-counter TIM-CTR 602 to count the timer counts, register MT-PREG 603 to pre-latch the driving-data supplied to the motor, register MT-HREG 604 to hold the current motor-data, register MT-REG 605 to output the motor-data to the motor, cut-off controller OFF-CNT 606 which stops the operation of timer-counter TIM-CTR 602, cuts off the motor by clearing the motor-data output register, and holds a standby condition until the completion of the driving process, when the driving process to conduct the succeeding print is not completed within the current motor-driving period, and timer controller TMCN-TRL 611 by which the input/output timing control of the load signal to set the timer counts of the motor-driving period and the timer counts in register TIM-PREG 600, load signal to set the mode-data into register MT-PREG 603 in order to pre-latch said motor-data, load signal to set said pre-latched data in the register MT-HREG 604 holding the current motor-data and the register MT-REG 605 outputting said mode-data, signal to inform the time-up of said timer-counter, and the error signal informing that the motor-driving is stopped and is in a standby condition when the head-driving data control process is not completed within the motor-driving period.

By the above-explained circuit construction, the motor operation is momentarily cut off and brought into a standby condition when the head driving data control process is not completed within the current motor driving period due to the delay of driving data transfer from the host system, for instance, and the motor driving operation is resumed after the completion of the head driving data control process.

Therefore, the motor driving control can be synchronized with the head driving data control process, and at the same time, the motor-data and the timer counts supplied before the motor cutoff are supplied before the motor starting, and the motor operation is restarted by the succeedingly supplied motor data and the timer counts. Therefore, no dislocation of printed dots is possible despite the momentarily stoppage of the motor operation, maintaining high-quality printing operation.

Embodiment-13

An analog-signal determining circuit which constitutes a part of the thermal-head driving-data control mean of the invention is now explained in next by referring the attached drawings.

Figure 50:
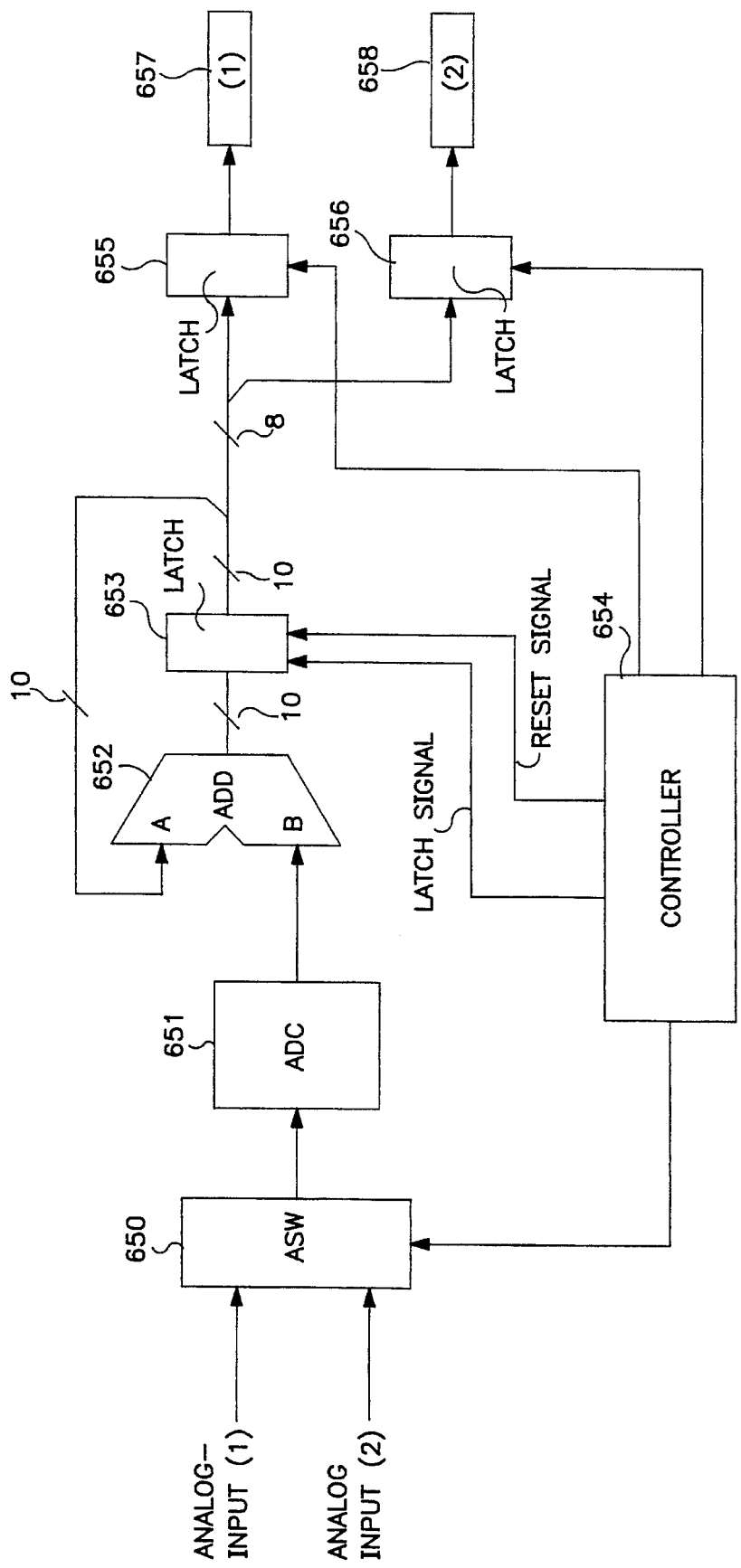
FIG. 50 is a circuit to determine the analog signal of the printer.

FIG. 50 shows a construction of embodiment of the invention, wherein 650 is an analog switch to select an analog-signal input, 651 is an analog/digital converter, or A/D converter, to convert the analog-signal outputted from analog-switch 650 into a digital-signal, 652 is an adder to add the input data from AD converter 651 to the input data from later-explained data-holding circuit 653, 653 is a data-holding circuit to hold the data outputted from the adder 652, 654 is a circuit to control the AD converter which controls data-holding circuits 655 and 656 which hold the data outputted from analog-switch 650, data-holding circuit 653, and the data outputted from data-holding circuit 653, 657 is a memory to store the digital signal converted from an analog input signal-(1), and 658 is a memory to store the digital signal converted from an analog input signal-(2).

Figure 51:
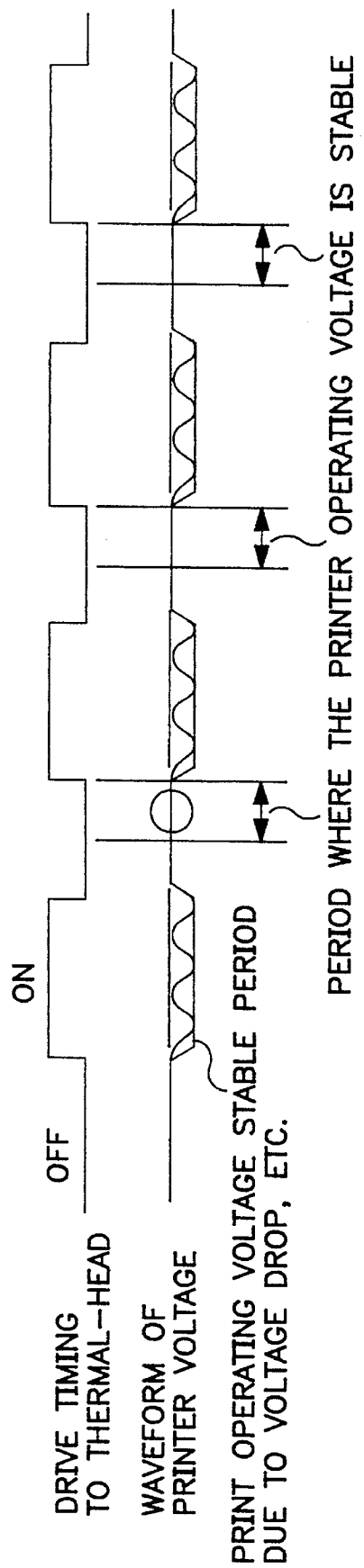
FIG. 51 shows a relationship between the drive timing and the timing to confirm its AD conversion.
Figure 52:
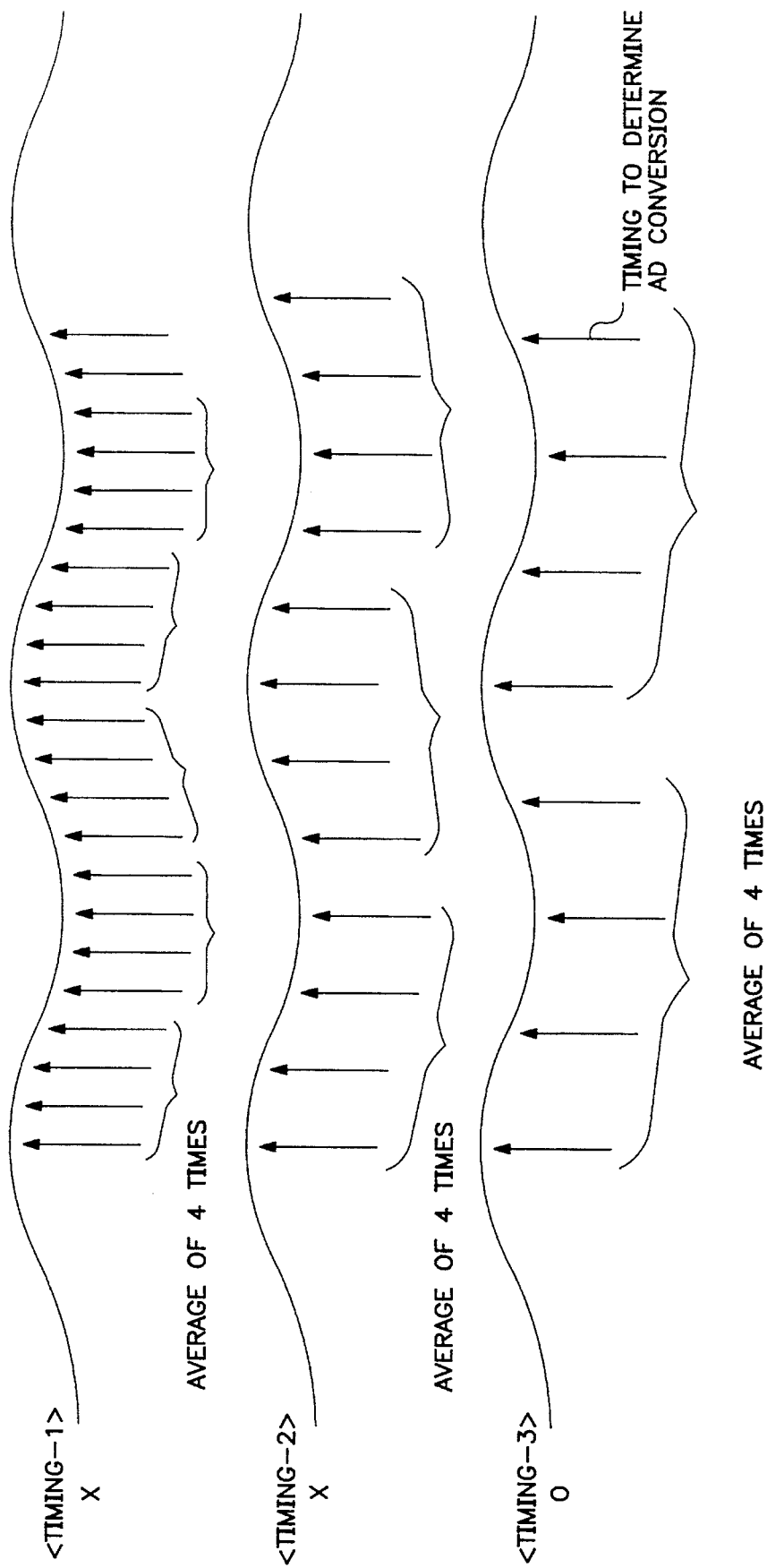
FIG. 52 shows a relationship between the pulsating current waveform and the timing in confirming the AD conversion conducted in the printer.

The operation of the above-constructed analog-signal determining circuit is explained below by referring FIG. 50 showing a circuit construction. FIG. 51 shows a relationship between the thermal-head drive timing and the timing of AD conversion determination, and FIG. 52 shows a relationship between the pulsative waveform and the timing to determine the AD conversion.

First, the analog input-(1) is selected by means of analog-switch 650, and this is transferred to AD converter 651. The AD converted signal converted by AD converter 651 is then transferred to the input-B of adder 652, and the output of data-holding circuit 653 (initial value is zero) is transferred to the input-A of adder 652.

Then, an adding operation (A+B) is conducted in adder 652, and the result of this is transferred again to the input-A of adder 652. Then the analog input-(1) is again selected by using analog-switch 650, and is transferred to AD converter 651.

The AD converted signal converted by AD converter 651 is then transferred to the input-B of adder 652 in order to conduct another adding operation in adder 652, and the result of this is transferred to the input-A of adder 652.

By repeating this process for the remaining two operations, the result of the four addition operations of AD converted value of the analog input-(1) is stored in data-holding circuit 653.

Ignoring the lower two bits of this, this result is then transferred to memory 657. Therefore, the data transferred to memory 657 is an average of four AD converted values of the analog input-(1).

In the second step, the analog input-(2) is selected by means of analog-switch 650, and this is transferred to AD converter 651, and by means of the before-mentioned processes, an average of four AD converted values of the analog input-(2) is stored in memory 658.

In this case, if the analog input were an information of printer operating voltage or such, and if the AD conversion of this were conducted while the printer operating voltage is changing, an AD converted value of this of very low accuracy would be obtained.

This could happen because of high power-consumption of the operating thermal-head, and this is possible with general-purpose power supplies.

In this embodiment, the AD conversion is conducted when the printer supply voltage is within a stable region shown in FIG. 51. Since a fair amount of pulsating voltage variation can exist even in a stable printer operating region, the timing to determine the AD conversion is made variable in order to escape from the effects of such.

Figure 53:
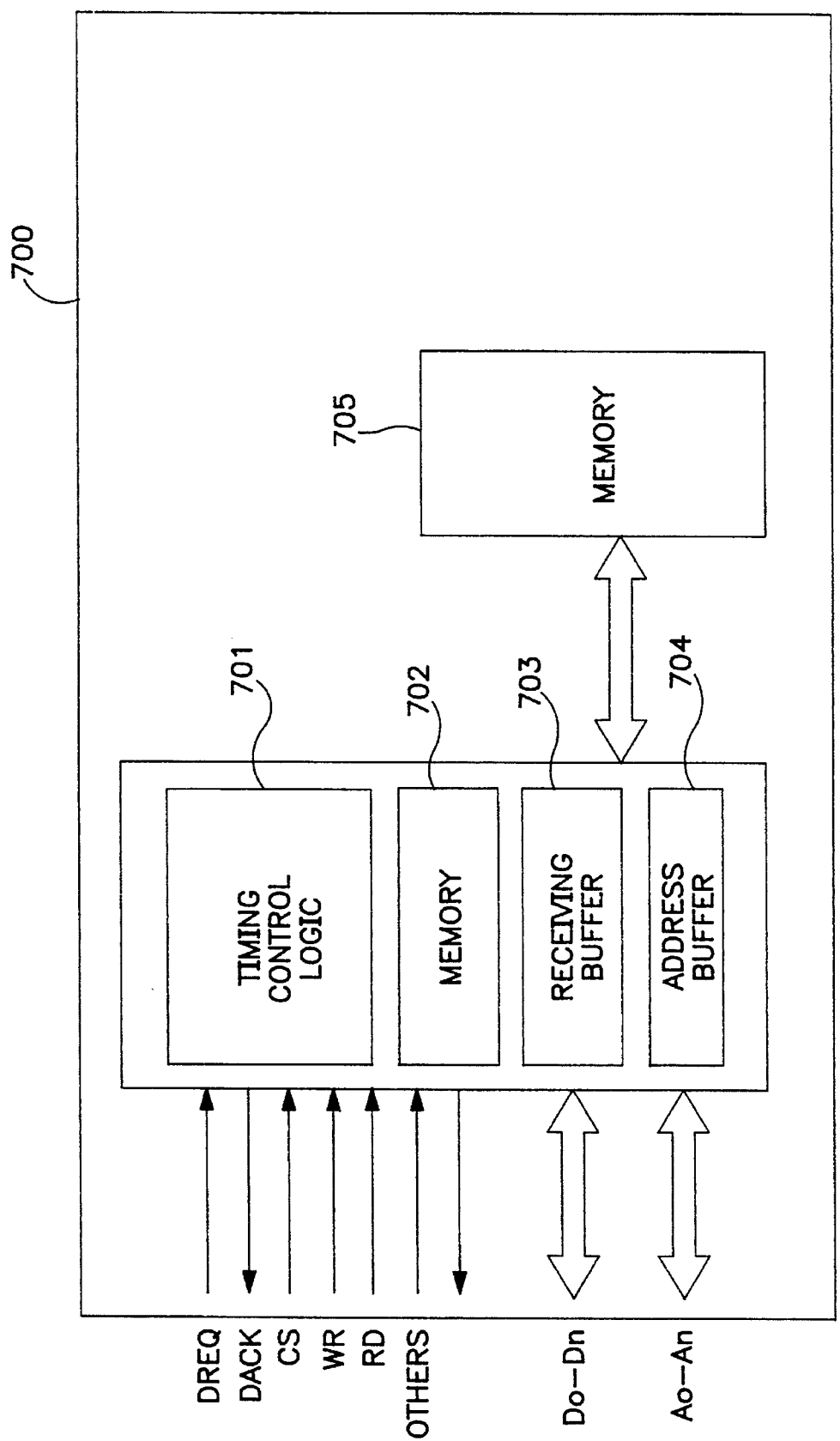
FIG. 53 shows a construction of high-speed data receiving circuit of the printer.

As shown in FIG. 53, the AD conversion is so adjusted that the AD conversion can be determined at the timing-3 which is synchronized with the pulsative voltage. The control in this case is performed by AD conversion control circuit 654.

Since the timing-1 and timing-2 are not synchronized with the pulsative voltage, a fair amount of the conversion error caused by the pulsative components are added to the result of AD conversion, yielding a very poor performance of AD conversion.

In this embodiment, the number of analog inputs is not limited to two, nor the number of averaging operations of AD converted values is not limited to four. For instance, after conducting the reading of six times, the result can be averaged excluding the maximum and the minimum values. In this case, the timing interval to determine the AD conversion shown in FIG. 52 has to be altered in order to match with this method.

According to the embodiment of the invention, since the timing of analog signal determination is macroscopically set at the stable printer-operating voltage range shown in FIG. 51, that is, the timing is set in a range without voltage variations, and since the analog signal is determined microvariations, and since the analog signal is determined microscopically at the timing-3 shown in FIG. 52 or at the timing synchronized with the pulsating voltage, highly accurate AD conversion can be obtained.

Therefore, by utilizing an inputted analog-signal as an information necessary to compensate the printer voltage, a substantial improvement of print quality can be obtained. Moreover, in conducting the error judgment utilizing an inputted analog signal, a substantially improved accuracy of error judgment can be obtained. Furthermore, when an inputted analog signal is utilized as an information necessary to conduct temperature compensation of the printer, a still improved print quality can be obtained.

Embodiment-14

A high-speed data receiving circuit which constitutes a part of the printer-signal receiving controller of the invention is now explained in the following be referring the attached drawings.

Figure 54A:
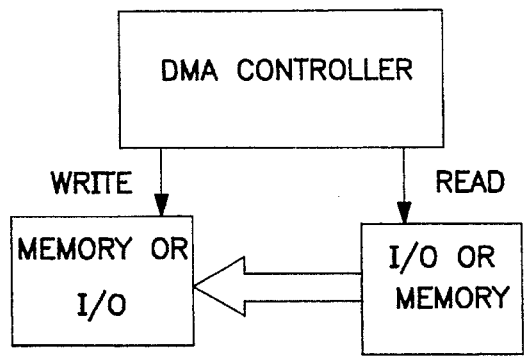
FIGS. 54(a) and 54(b) are schematic diagrams to show the generally employed DMA transfer processes.
Figure 54B:
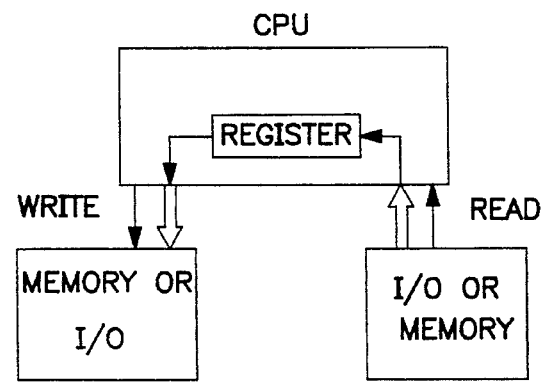

More of the IC (DMA controller) employing a new data transfer system called direct-memory-access (hereafter called DMA) developed for high-speed data processing is employed recently in the image processing field. This system can be explained briefly by referring FIG. 54(a) showing a DMA transfer system, and FIG. 54(b) showing a conventional data-transfer system.

Figure 55:
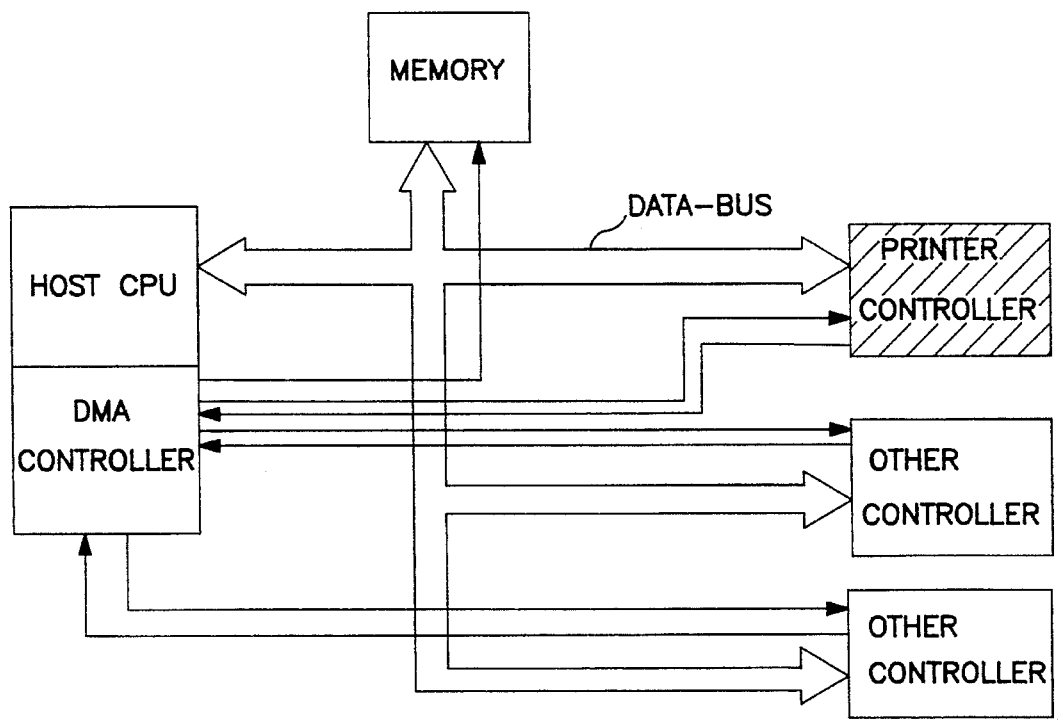
FIG. 55 shows a system construction of the invention.

By using the DMA transfer system, direct data transfer from memory to I/O, or from I/O to memory is possible without incorporating the data into CPU. Therefore, the data transfer can be performed in an about one-half of the conventional data transfer time. FIG. 55 shows a system construction of printer controller incorporating a high-speed data receiving circuit.

FIG. 53 shows an embodiment of the invention, where 700 is a printer drive controller, 701 is a timing control logic, 702 is a memory to set a control condition in said timing control logic 701, 703 is a buffer to receive a signal such as a control data or printing data, 704 is an address-buffer which specifies the addresses necessary to write or read the control data or printing data, and 705 is a memory to apply various compensations necessary to drive the printer.

The timing control logic 701 issues a DMA request signal (hereinafter this is called DREG) which is a signal to request DMA data-transfer, and receives the DMA acknowledge signals (DACK), chip-select signals (CS), write signals (WR), and the read signals (RD) also.

The operation of thus constructed high-speed data receiving circuit is now explained by referring FIG. 53 showing a circuit construction. FIG. 54(a) shows a simplified DMA transfer system and FIG. 55 shows a system construction. The high-speed data receiving circuit of the present invention is equipped with five systems to receive the printing data transmitted from the host.

The first system among these, issues a DREG signal, and upon receiving a DACK signal after that, it selects receiving buffer 703 regardless the address on A0 to An, and writes the printing data on D0 to Dn into receiving buffer 703. In this case, the system is provided with a single transferring system wherein handshakes are performed at every one byte or one word by using the DREG, DACK, and WR signals.

The second system puts out a DREG signal, and upon receiving a DACK signal after this, selects receiving buffer 703 regardless the address on A0 to An, and writes the printing data on D0 to Dn into receiving buffer 703. In this case, the system is provided with a block transferring system wherein handshakes are performed at every several bytes or several words.

The third system puts out a DREG signal, and upon receiving a DACK signal after this, it selects receiving buffer 703 regardless the address on A0 to An, and writes the printing data on D0 to Dn into receiving buffer 703. In this case, the system is provided with a burst transferring system, so that the system keeps receiving the data under the command of WR signal until the DREG signal is released. This system is effective when the host is equipped with a DMA master function.

The fourth system is a system which is highly effective to a host having no master functions, and this is provided with a system which issues a DREQ signal, and after this, lets the receiving buffer 703 be selected by the CS signal and the address on A0 to An, and the printing data be written in there by the WR signal.

The last system is a system which is highly effective to a host having no master functions also, and is provided with a system which issues a DREQ signal, and after that, let the receiving buffer 705 be directly selected by the CS signal and the address on A0 to An, and the printing data is written in there by the WR signal.

In the before-mentioned first to the fourth systems, the data transfer from receiving buffer 703 to memory 705 is automatically carried out.

The above-described is the high-speed data receiving system of the invention, and is a highly versatile system. Furthermore, since a function to select the release timing of DREQ signal and a function to designate the active level of the DREQ.DACK signal is built-in there, and this is comparable to any DMA master controller.

However, the control conditions obtained by the before-mentioned designation or selecting conditions have to be set in memory 702 in advance.

Thus, comparing those with the cases where Centronix or RS-232C which is commonly employed in printer communication systems, is employed, a substantial reduction of the time to receive the data can be obtained by using this system, thus a substantial increase of printing speed can be realized, in addition to the attainment of a substantial reduction of load to the host computer in data transfer operations.
Embodiment-15

Figure 58:
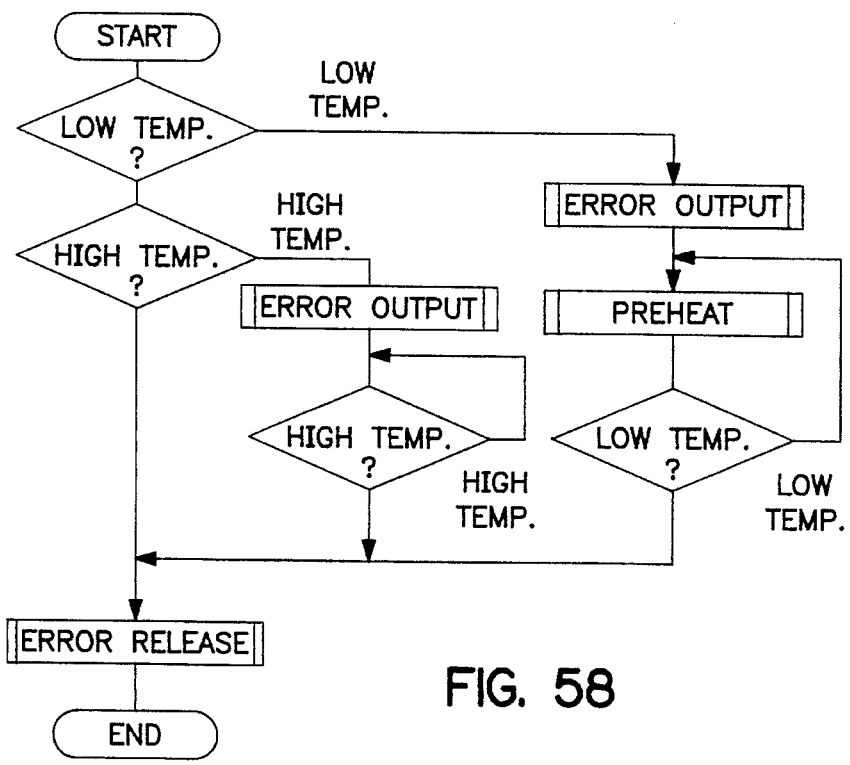
FIG. 58 shows a flow-chart of the printer operation.

A preheat controller which constitutes a part of the printer driving-data control means of the invention is now explained below by referring the attached drawings. FIG. 58 shows a fundamental process sequence of the fundamental preheat controller. When the temperature information is analyzed by the error process mean, and the temperature is found to be out of the proper operating temperature range, the error process mean puts out an error signal.

When the temperature is within a low operating temperature range, it determines if it is in a high operating temperature range in next. If the temperature is found to be within a high operating temperature range, the error signal is cancelled, and the normal printing operation is commenced. The error signal cancellation in this case, means the release of error signal output which is later-explained.

If the detected temperature is out of the normal high operating temperature range, an error signal is outputted, and this is transmitted to the host computer and the others, and the printer is left for natural cooling while the temperature is monitored. If the temperature is at a low temperature out of the normal low operating temperature range, an error signal is outputted, and the preheat is positively applied to the thermal-head.

Figure 56:
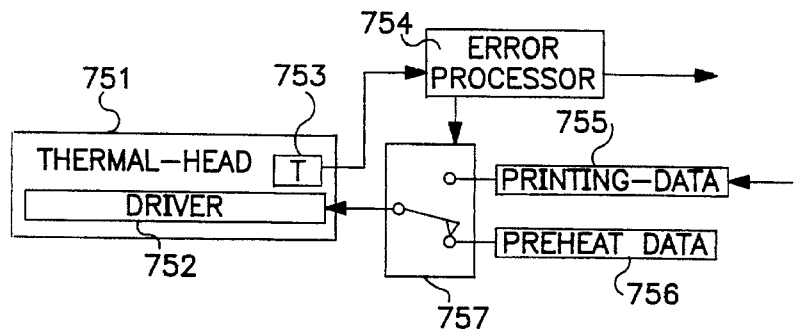
FIG. 56 shows a circuit to preheat the printer of an embodiment of the invention.

The operation at a low temperature is now explained by referring FIG. 56 wherein 751 is a thermal-head on which a temperature sensor such as thermister 753 and thermal-head driver 752 are mounted. The output of temperature sensor 753 is transmitted to error processor 754, and the switching between printing-data output circuit 755 and preheat-data output circuit 756 are performed by selector 757. If the temperature is out of the low operating temperature range, preheat data 756 is selected, and the preheat data is transferred.

Figure 57:
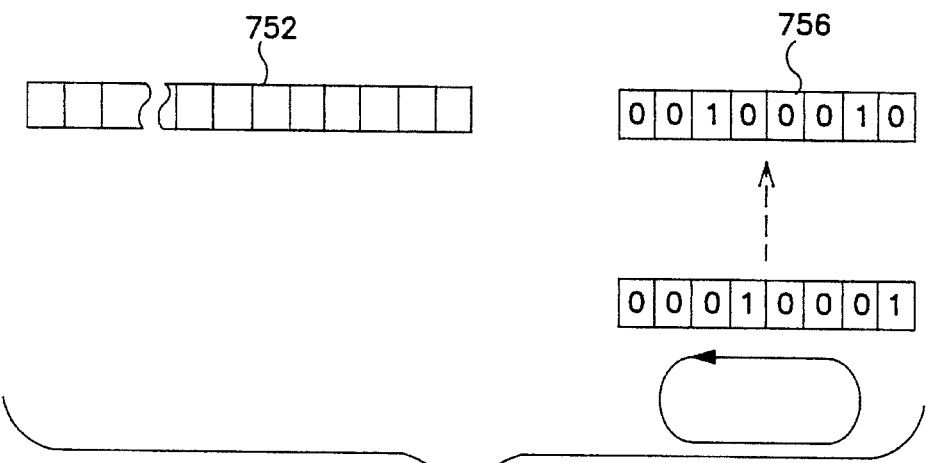
FIG. 57 shows transitions of the preheat data of printer.

The fundamental preheat data outputted from preheat data output circuit 756 is of a one-byte construction in order to realize an equal coloring data interval. In an example shown in FIG. 57, or (00010001), 1 is allocated for the coloring data and 0 is for non-coloring data. If the number of driver elements of thermal-head driver 752 is 320, a data of 320/8=40 bytes have to be transferred. Upon completion of these data transfer, one-line drive can be conducted.

Since this is a preheat operation without feeding the paper, this preheating operation is repeated until the temperature comes up to the proper operating range.

The driving data for the second line which is (001000010) can be obtained by rotating the fundamental preheat data by one bit, and 40 bytes of this data is again transferred. By repeating this operation using only the fundamental preheat data, preheat can be applied uniformly over the entire head.

Though the explanation of this embodiment has been made on the fixed fundamental preheat data so far, an externally programmable data can also be used as well. At the time of data transfer after the second preheat operation, one-line data transfer can be accomplished by inputting only the highest bit of the fundamental preheat data, and the one-line data for the operation after the second can be accomplished by inputting the bits which are one lower than the previously inputted bit data. This operation may be repeated until this operation is returned to the highest bit after reaching the lowest bit in order to complete one-bit transfer. Moreover, when the data transfer of thermal-head is started from the lowest bit side, the data input should be started from the lowest bit.

That is, the preheat controller of this invention is provided with;

a mean to output printing-data to thermal-head;

a mean to output a fundamental preheat data of one byte in order to attain an equal coloring data interval;

a selection mean to select the outputs of printing data and preheat data output, and to output the data to the thermal-head; and an error processing mean connected to a temperature sensor to control said selection mean; wherein;

said error processing mean transmits an error signal if the temperature is out of the proper operating temperature range, and if it is in a low temperature range, selects said fundamental preheat data output, and inputs this repeatedly to construct one-line preheat data, and conducts a drive of one-line.

In order to perform data input for the next line, said fundamental preheat data is rotated by one bit, and this is repeatedly inputted to prepare one-line preheat data before a one-line drive is performed. If the temperature is brought into a proper operating temperature range, the error condition is released and the normal operating condition is resumed.

Embodiment 16

An embodiment of the printer incorporating the printer controller of the invention is now explained in next.

Figure 59:
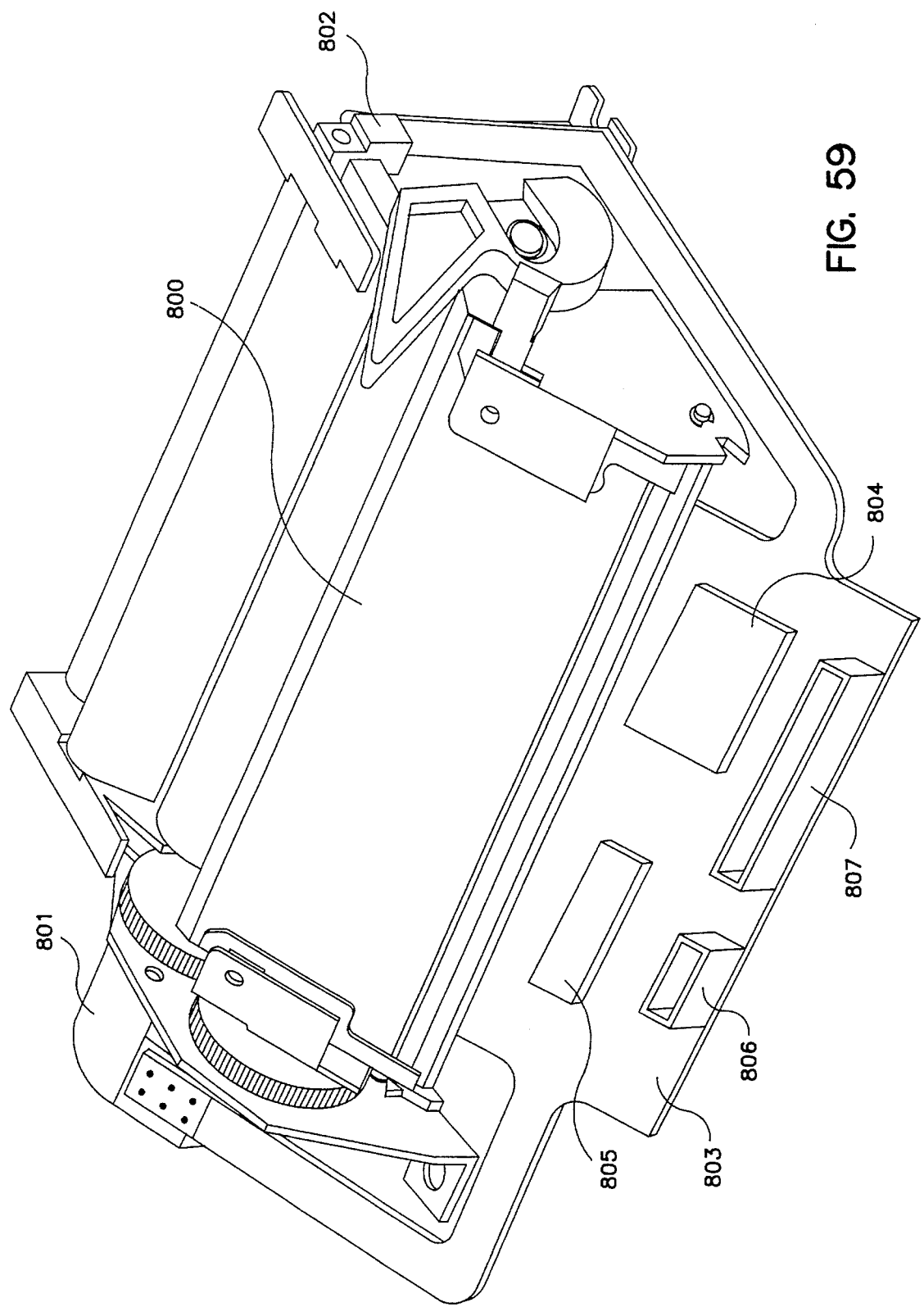
FIG. 59 shows an external view of thermal printer integrated with the controller.

FIG. 59 shows an external view of the printer of the invention, wherein 800 is a thermal-head, 801 is a motor for paper feeding, and the paper is fed by a driven platen roller which is not shown.

802 is a switch to detect the up-down of head, differentiating the down-condition where the thermal-head 800 is pressed against the platen roller through paper to be printed from the up-condition where the thermal-head is released from the platen when paper has to be inserted in between the paper and when the printer is not used for a lone time.

803 is a printed circuit-board, on which a printer controller 804, IC 805 to drive the paper-feed motor, and other elements are mounted and a circuit pattern to connect these is printed, and the terminals to be solder-connected to thermal-head 800, paper-deed motor 801, and head up-down sensor switch 802 are printed thereon also.

On printed circuit board 803, connector 806 to accept the external power supply terminal, and connector 807 for interface are also mounted.

Printer controller 804 incorporated in the thus constructed printer is the one explained in the section of Embodiment-1. Although the wiring to the electric components is performed on a circuit-board in this embodiment, wirings for each component can be done individually as a matter of course, and at that time, the part incorporating printer controller 804 can be connected to the other components by means of connectors.

Although those are not shown in this embodiment, printers such as a serial printer incorporating a carriage motor for moving the printer head, the one with a paper-end detector, and the one with optional parts to be connected externally such as an auto-paper-cutter, can also be constructed in the same way.

As above described, the printer controller of the invention can be constructed by mounting at least a controller to control the driving-data to be transmitted to a thermal-head, controller to control the paper-feed motor, receiver controller to receive the head driving data transmitted from a host system, a total controller to control the order of the process executions of said controllers, a memory necessary to control said thermal-head and motor, means to detect the external temperature and printer supply-voltage in order to control said thermal-head, a clock generator to generate a clock necessary to control said controllers and total controller, and a mean to transfer various data and signals between said controllers, total controller, and a memory on the circuit board to which power is supplied.

The circuit construction of this controller is so simple that it can be implemented into a form of one-chip controller IC. Thus, by using this one-chip controller, the controller circuit and the system design work incorporating controller circuit and the system design work incorporating the printer can be substantially simplified. Moreover, the utility of the printed circuit board can also be substantially improved because a substantial reduction of the number of externally placed devices and components can be obtained.

As above-explained, an embodiment of the invention, i.e., the printer controller and the printer incorporating this, consists of:

a host-interface mean to receive communication data transmitted from the system including the host computer;

a receiver control mean to which the output of host interface is inputted through a data-bus in order to control the printer thermal-head communication data;

a driving-data control mean to control the driving data to be transmitted to the thermal-head in accordance with the external temperature and the printer supply voltage;

a motor control mean to control the paper-feed motor according to the output of the host interface means;

a total control mean to control said receiver control mean, driving data control mean, and motor control mean connected to the host-interface mean through a data-bus, by means of dedicated control lines;

a memory to store at least one of the control procedures of those control means; and a printer interface to output various signals necessary to drive various objects to be controlled such as thermal-head, motor, and sensors.

Thus, a substantial reduction of the load to the host system can be obtained, and printers of higher functions, size and cost reduction of the device incorporating this printer, can be realized.

We claim:

1. A printer controller comprising:

host-interface means for receiving communication data from a system including a host-computer;

receiving control means for receiving the output of said host interface means through a data bus and controlling head communication data transferred to a printer thermal-head;

driving-data control means for controlling activating data to be transmitted to said thermal-head according to a temperature signal and a printer supply voltage;

motor control means for receiving the output of said host-interface means through a data-bus and controlling a paper-feed motor of the printer;

total control means connected to said host-interface means through said data-bus, for controlling said receiving control means, driving-data control means, and motor-control means through respective dedicated control lines;

memory means for storing the control procedures of at least one of said receiving control means, driving-data control means, motor control means, and said total control means; and printer interface means for receiving the outputs of said driving data control means and motor control means and outputting the activating data to said thermal-head to control printings performed by said thermal-head mid signals necessary to drive components in the printer;

wherein said printer controller is controlled by said host computer.

2. A printer controller according to claim 1 wherein said driving-data control means comprises:

processing means for assigning a weighting factor to each dot according to past coloring data of the dots contiguous to the dot to be driven, and to execute processing operations according to said weighting factors; and driving duration control means for storing plural threshold values and plural driving durations according to said plural threshold values, comparing the output of said processing means and said plural threshold values, and determining a driving duration according to the driving duration selected from said stored driving durations;

wherein at least one of said weighting factors and said driving durations is rewritable by a signal from said host computer.

3. A printer controller according to claim 1 wherein said driving-data control means comprises;

analog/digital converting means for converting an analog voltage value derived from a thermal head temperature into a digital value;

first memory means for storing conversion factors applied to the output of said analog/digital converting means, the conversion factors corresponding to temperature sections within the printer operating temperature range;

second memory means for storing analog/digital converted values determined at the center of printer operating temperature range;

comparison means for comparing the analog/digital converted values of the current temperature derived by said analog/digital converting means to the analog/digital converted values derived from said second memory;

adding/subtraction means for selecting either an addition or a subtraction operation in accordance with the output of said comparison means, and for performing either an addition or a subtraction operation between said analog/digital converted values stored in said second memory and said analog/digital converted values stored in said first memory; and counter means for counting the number of either addition or subtraction operations at said adding/subtraction means; wherein the temperature of said thermal-head is derived from the output of said counter means.

4. A printer controller according to claim 1 wherein said driving-data control means comprises:

memory means for storing proportion coefficients indicating the relationship between the operating temperature of the thermal-head and the driving duration determined for every rank of head resistance which is proportional to the variation of the heating elements of the thermal-head;

data-holding means for holding the thermal-head driving duration determined at the center of the printer operating temperature range;

data-selecting means for selecting the data stored in said memory means according to the current head resistance rank; and adding/subtraction means for selecting either an addition or a subtraction operation according to the current temperature information, and performing either an addition or a subtraction operation between the data selected by said data-selecting means and the data stored in said data-holding means; wherein the thermal-head driving duration is controlled according to the resistance rank of said thermal-head.

5. A printer controller according to claim 4 wherein said driving-data control means comprises;

analog/digital converting means for converting an analog voltage value derived from a thermal-head temperature into a digital value;

first memory means for storing conversion factors applied to the output of said analog/digital converting means, the conversion factors corresponding to temperature sections within the printer operating temperature range;

second memory means for storing analog/digital converted values determined at the center of printer operating temperature range;

comparison means for comparing the analog-digital converted values of the current temperature obtained by said analog/digital converting means to the analog/digital converted values derived from said second memory means;

adding/subtraction means for selecting either an addition or a subtraction operation, and for performing either an addition or a subtraction operation between said analog/digital converted values stored in said second memory and said analog/digital converted values stored in said first memory; and counter means for counting the number of either addition or subtraction operations;

wherein the current temperature information is determined by the output of said counter means.

6. A printer controller according to claim 1 wherein said driving-data control means comprises:

analog/digital converting means for converting the voltage applied to a thermal-head into a digital value;

first memory means for storing analog/digital converted values output from said analog/digital converting means, representing the resolution of voltage compensation;

data-selecting means for selecting the data outputted from said first memory;

second memory means for storing analog/digital converted values determined by the reference voltage of the thermal-head;

data-holding means for holding said data in said second memory;

addition/subtraction means for conducting either an addition or a subtraction between the data from said data-holding means and the data from said data-selecting means;

comparison means for comparing the data from said analog/digital converting means and the data from said data holding means, and to control the operation conducted in said addition/subtraction means;

driving-duration setting means for setting the driving duration at the thermal-head supply voltage according to the output of said data comparison means;

wherein the thermal-head driving duration is controlled in accordance with the voltage applied to said thermal head.

7. A printer controller according to claim 1 wherein said driving-data control means comprises;
- counter means for counting the number of driven dots in a unit of a physical block of the thermal-head;
- dot number selecting means for determining the number of simultaneously driven dots in a unit of a physical block from the output of said counter means;
- past-data counting means for counting both the number of accumulatively driven dots and the number of accumulatively blank dots in the past;
- driving duration compensating means for compensating the driving duration according to the outputs of said dot-number selecting means and said past-data counting means.

8. A printer controller according to claim 1 wherein said driving-data control means comprises;
- memory means for counting the number of driven dots and storing the numbers into a memory of having a predetermined bit range;
- dot-number selecting means for selecting the contents of said memory means within said predetermined bit range in order to determine the number of simultaneously driven dots within said thermal-head;
- time holding means for holding plural compensation-times in order to compensate the driving pulse duration in accordance with the number of simultaneously driven dots determined by said dot-number selecting means;
- compensation time selecting means for selecting a compensation time from the plural compensation time values stored in said time holding means in accordance with the output of said dot-number selecting means;
- reference value holding means for holding reference values of the driving pulse durations when said thermal-head is driven by a reference driving voltage;
- adding means for adding the output of said compensation time selecting means and the reference value held in said reference value holding means; and
- driving duration compensation means for compensating the driving pulse duration in accordance with the output of said adding means.

9. A printer controller according to claim 1 wherein said driving-data control means comprises;
- memory means for counting the number of driven dots and storing the numbers into a memory of predetermined bit range;
- first selecting means for selecting the contents stored in said memory means at a predetermined number of upper continuous bits within a predetermined bit range,
- second selecting means for selecting said contents stored in said memory at a predetermined number of remaining lower bits within said predetermined bit range;
- first adding means for adding the output of said second selecting means and the result of an internally carried out computation;
- second adding means for adding the output of said first selecting means and the carry of said first adding means;
- setting means for setting the number of maximum simultaneously drivable dots arbitrarily;
- comparison means for comparing the value set by said setting means and the output of said second adding means;
- a table for holding the driving pulse duration compensation data in accordance with the number of divisional drives of said thermal-head; and
- divisional driving means for driving a thermal-head by dividing said thermal-head into a number of physical blocks in accordance with the output of said comparison means in order to make the number of driven dots less than the maximum number of simultaneously drivable dots set by said setting means; wherein
- said driving pulse duration is compensated by selecting a driving pulse duration compensation data stored in said table in accordance with the number of blocks divided by said divisional driving means.

10. A printer controller according to claim 1 wherein said driving-data control means comprises;
- first memory means for setting a division-rate of driving pulse duration of a thermal-head;
- second memory means for setting a total driving period of said thermal-head;
- third memory means for storing the data stored in said second memory means after the data are subjected to a bit-shift control;
- fourth memory means for setting a printing period;
- fifth memory means for storing driving durations of a thermal-head compensated by division-rates;
- first data selecting circuit for selectively outputting the data from said third memory and the data from said fifth memory;
- addition/subtraction circuit for conducting either an addition or a subtraction operation between the data from said first data selecting circuit and the data from a data holding circuit;
- second data selecting circuit for selectively outputting the data from said addition/subtraction circuit, data from said fourth memory means, and data from said first data selecting circuit into said data holding circuit; and
- data-distributing circuit for distributing the data from said data-holding circuit to said fifth memory, wherein the driving pulse of thermal-head is divided into several pulses, and the division-rate of said driving pulse is set.

11. A printer controller according to claim 10 wherein a divided driving pulse of said thermal-head consists of a main driving pulse and a compensation pulse, the printer controller further comprising:
- memory means for said main driving pulse for storing said main driving pulses;
- memory means for storing compensation data; and
- memory means for storing the past line-data necessary to prepare said compensation pulse in order to conduct past-data compensation processing; wherein
- a part of said memory means for storing the compensation data and a part of said memory means for storing the past line-data are convertible into memory means for storing said main driving pulse, memory means for storing compensation data, and a memory means for storing past line-data served for dots in different locations.

12. A printer controller according to claim 1 wherein said motor control means comprises:
- driving mode setting means for storing chopping numbers as information;
- memory means for setting a the chopping count value according to said chopping numbers stored in said driving mode setting means;

a counter;

chopping control means for outputting counts according to the output of said counter; and comparison means for comparing the counts of said chopping control means and the counts of said counter;

wherein a chopping drive of a motor is performed by utilizing the output of said comparison means as a timing signal to switch the motor in a chopping condition, and at the same time, by inputting the output of said comparison means into said chopping control means.

13. A printer controller according to claim 1 wherein said driving-data control means comprises;

analog signal input means;

analog/digital converting means for converting an analog signal from said analog input means into a digital signal;

data holding means for setting the values of said inputted digital signal;

adding means for adding the data from said analog/digital converting means to the data from said data holding means; and timing means for inputting the output of said adding means into said data-holding means and at the same time, for synchronizing the timing of said analog/digital converting means with a varying supply voltage.

14. A printer controller comprising;

thermal-head resistance-rank compensation means for controlling a thermal-head driving duration in accordance with the rank of the thermal-head resistance;

voltage compensation means for controlling the driving duration of the thermal-head in accordance with the voltage applied to said thermal-head;

counter means for counting the number of driven dots in a unit of a physical block of the thermal-head;

dot number selecting means for determining the number of simultaneously driven dots in a unit of a physical block of the thermal-head from the output of said counter means;

past-data counting means for counting the number of accumulated driven dots and the number of non-driven dots in the past;

printing-rate compensation means provided with a driving duration compensation means to compensate the driving pulse duration in accordance with the output of said past-data counting means and the output of said dot number selecting means;

means for arbitrarily setting the maximum number of simultaneously drivable dots in said thermal-head;

comparison means for comparing the value set by said setting means and the output of said dot-number selecting means;

a table to hold the driving pulse duration compensation data proportional to the number of divisions of said thermal-head;

simultaneous coloring-rate compensation means for compensating the driving pulse duration by selecting a driving pulse duration compensation-data stored in said table in accordance with the number of divided blocks by said divisional driving means;

controller means for controlling the order of processing of each means including said head-resistance rank compensation means, voltage compensation means, printing-rate compensation means, and said simultaneous coloring-rate compensation means, and deriving the head driving durations; and timer counter means for counting the head driving pulse duration outputted from said controller.

15. A printer controller comprising:

first driving pulse compensation value generating means which includes a thermal-head resistance-rank compensation means for controlling a thermal-head driving duration in accordance with the rank of thermal-head resistances, and a voltage compensation means for controlling the driving duration of a thermal-head in accordance with the voltage applied to said thermal-head;

counter means for counting the number of driven dots in a unit of a physical block of the thermal-head;

dot number selecting means for determining the number of simultaneously driven dots in a unit of a physical block of the thermal-head from the output of said counter means;

setting means for arbitrarily setting the maximum number of simultaneously drivable dots in said thermal-head;

comparison means for comparing the value set by said setting means and the output of said dot-number selecting means;

second driving pulse compensation value generating means for outputting driving pulse duration compensation data in accordance with the number of divisional driving of said thermal-head;

dynamic divisional compensation means having a divisional driving means for dividing the physical block of said thermal-head into several groups in accordance with the output of said comparison means in order to make the number of simultaneously driven dots less than the maximum number of simultaneously drivable dots set by said setting means;

simultaneous-coloring-rate compensation means including a third driving-pulse compensation-value generating means for outputting the head driving-pulse duration compensation-data in accordance with the output of said dot-number selecting means;

past-data counting means for counting the number of accumulated driven dots and the number of accumulated blank dots in the past;

printing-rate compensation means including a third driving-pulse compensation-value generating means for compensating the driving-pulse duration in accordance with the output of said past-data counting means and the output of said dot-number selecting means;

processor means for processing the driving pulse duration for every physical block of said thermal-head in accordance with the outputs of said first, second, and third driving pulse compensation-value generating means;

timer counter means for counting the maximum driving pulse duration outputted from said processor means and outputting a head driving permission signal, and comparator means for comparing the value determined by the difference information of the driving-pulse compensation value between the physical blocks which are simultaneously driven within said group division said value determined for every physical block, and the counts of said timer counter means, and generating a prohibiting signal prohibiting said head driving permission signal, if the determined value matches said counts.

16. A printer controller comprising:

first register means for pre-latching timer counts of a motor driving period;

timer counter means for counting said timer counts and generating a time-up signal at the end of said motor driving period;

second register means for pre-latching a driving data provided to said motor;

third register means for outputting said driving data to said motor;

fourth register means for holding current timer counts;

fifth register means for holding current driving-data;

cut-off controller means for stopping said timer counter means, and for clearing said third register means in order to cut-off said motor, and bring said motor into a standby condition, if the driving process to perform a succeeding printing is not completed within a current motor driving period;

timer controller means for controlling input/output timing signals, including a timer count of a motor driving period, a load signal to set the timer indication of the motor driving period in said first register means, driving data, a load signal to be set at said second register means in order to pre-latch said driving data therein, a load signal to be set at the third register means which outputs said driving data prelatched in said second register means, a time-up informing signal of said timer-counter means, and an error signal indicating that the drive of the motor is stopped and is brought in a standby condition when the head driving-data control processing is not completed within the motor driving period;

wherein the motor driving can be restarted after completion of said driving process, by the driving timer indication stored before said cut-off of the motor in said fourth register means and the motor-data stored before said motor cut-off in said fifth register means.

17. A printer incorporating a printer controller comprising:

host-interface means for receiving communication data from a system including a host-computer;

receiving control means for receiving the output of said host-interface means through a data-bus in order to control head driving data provided to a printer thermal head;

driving data control means for controlling the driving data to be transmitted to said thermal-head of said printer by the output of said receiving control means, according to an external temperature and a printer supply voltage;

motor control means for controlling a paper-feed motor of said printer by inputting the output of said host-interface means through a data-bus;

total control means connected to said host-interface means through said data bus for controlling said receiving control means, driving-data control means, and motor control means, through a respective dedicated control line;

memory means for storing control procedures of at least one of said receiving control means, driving-data control means, motor control means, and said total control means; and printer interface means for outputting signals necessary to drive components to be controlled in said printer, by inputting the outputs of said driving data control means and said motor control means;

wherein said printer is controlled by said host-computer.

* * * * *

UNITED STATES PATENT AND TRADEMARK OFFICE
CERTIFICATE OF CORRECTION

PATENT NO. : 5,588,092
DATED : December 24, 1996
INVENTOR(S) : Komiya et al.

It is certified that error appears in the above-indentified patent and that said Letters Patent is hereby corrected as shown below:

Column 37, line 9, delete "mid" and insert --and--.

Column 41, line 25, between the words "mean" and "and" insert a comma--,--.

Signed and Sealed this

Eighth Day of July, 1997

Attest:

BRUCE LEHMAN

Attesting Officer

Commissioner of Patents and Trademarks